(12) United States Patent
Kuang et al.

(10) Patent No.: US 12,495,465 B2
(45) Date of Patent: Dec. 9, 2025

(54) COMMUNICATION METHOD AND DEVICE

(71) Applicant: Huawei Technologies Co., Ltd., Guangdong (CN)

(72) Inventors: Yiru Kuang, Beijing (CN); Yifan Xue, Beijing (CN); Lixia Xue, Beijing (CN); Haibo Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 372 days.

(21) Appl. No.: 18/246,641

(22) PCT Filed: Aug. 3, 2021

(86) PCT No.: PCT/CN2021/110381
§ 371 (c)(1),
(2) Date: Mar. 24, 2023

(87) PCT Pub. No.: WO2022/062685
PCT Pub. Date: Mar. 31, 2022

(65) Prior Publication Data
US 2023/0371118 A1  Nov. 16, 2023

(30) Foreign Application Priority Data

Sep. 27, 2020  (CN) .......................... 202011032366.9
Nov. 6, 2020  (CN) .......................... 202011231197.1

(51) Int. Cl.
*H04W 76/28* (2018.01)
*H04W 52/02* (2009.01)

(52) U.S. Cl.
CPC ....... *H04W 76/28* (2018.02); *H04W 52/0216* (2013.01)

(58) Field of Classification Search
None
See application file for complete search history.

(56) References Cited

U.S. PATENT DOCUMENTS

2020/0045768 A1  2/2020  He et al.
2020/0275375 A1*  8/2020  Liu ................... H04W 52/0216
(Continued)

OTHER PUBLICATIONS

3GPP TSG-RAN WG1 #100bis-e e-Meeting,R1-2002555,"Remaining issues for PDCCH-based power saving channel design", Qualcomm Incorporated,Apr. 20-24, 2020,total 8 pages.
(Continued)

*Primary Examiner* — Walter J Divito
(74) *Attorney, Agent, or Firm* — WOMBLE BOND DICKINSON (US) LLP

(57) ABSTRACT

This disclosure relates to a communication method and a device. When a terminal device determines not to monitor DCP on a first DCP monitoring occasion, the terminal device wakes up on a first group of carriers within first DRX on duration associated with the first DCP monitoring occasion, and wakes up or sleeps on a second group of carriers within second DRX on duration associated with the first DCP monitoring occasion. The first group of carriers includes one or more carriers configured for the terminal device, a first DRX configuration is applied to the first group of carriers, the first DRX on duration corresponds to the first DRX configuration, the second group of carriers includes one or more carriers configured for the terminal device, a second DRX configuration is applied to the second group of carriers, and the second DRX on duration corresponds to the second DRX configuration.

18 Claims, 9 Drawing Sheets

(56) References Cited

U.S. PATENT DOCUMENTS

2021/0051589 A1* 2/2021 Nam ................ H04W 52/0235
2023/0060961 A1* 3/2023 Kaikkonen ........... H04W 76/15

OTHER PUBLICATIONS

3GPP TSG-RAN2 Meeting #109-e, R2-2000345, "Introduction of secondary DRX group" Ericsson et al.,Feb. 14, 2022,total 5 pages.
3GPP TS 38.321 V15.9.0 (Jul. 2020) 3rd Generation Partnership-Project; Technical Specification Group Radio Access Network;NR;Medium Access Control (MAC) protocol specification(Release 15),total 78 pages.
3GPP TSG-RAN WG2 Meeting #109 electronic Elbonia,R2-2001482,"Further discussions on DRX group", Qualcomm Inc et al.,Feb. 24-Mar. 6, 2020,total 3 pages.
3GPP TSG RAN WG1 #100e-Meeting, R1-2000337,"Maintenance of PDCCH-based power saving signal" vivo,Feb. 24-Mar. 6, 2020,total 18 pages.
3GPP TSG RAN Meeting #89-e RP-202032,"Moderator's summary for email discussion [89E][29] [R17_secondary_DRX]" Moderator,Sep. 14-Sep. 18, 2020,total 11 pages.
3GPP TSG-RAN2 Meeting #108 Reno,USA,R2-1915292,"Email report [107bis#49][NR TEI16] cDRX enhancement for CA", Ericsson, Nov. 18-22, 2019, total 20 pages.
3GPP TSG-RAN WG2 Meeting #110-e Electronic,R2-2004642,"Remaining issues for DCP",vivo, Jun. 1-Jun. 12, 2020,total 7 pages.

* cited by examiner

COMMUNICATION METHOD AND DEVICE

CROSS-REFERENCE TO RELATED APPLICATIONS

This application is a National Stage of International Patent Application No. PCT/CN2021/110381, filed on Aug. 3, 2021, which claims priority to Chinese Patent Application No. 202011032366.9, filed on Sep. 27, 2020 and Chinese Patent Application No. 202011231197.1, filed on Nov. 6, 2020. All of the aforementioned applications are hereby incorporated by reference in their entireties.

TECHNICAL FIELD

This disclosure relates to the field of communication technologies, and in particular, to a communication method and a device.

BACKGROUND

In the 5th generation (5G) mobile communication technology, user equipment (UE) needs to further reduce power consumption. Therefore, another indication signal is introduced in a current discontinuous reception (DRX) mechanism, and the indication signal is a physical downlink control channel wake-up signal (PDCCH-WUS). The indication signal can indicate whether the UE needs to wake up or whether the UE can sleep in a subsequent DRX "active time". The PDCCH-WUS is also referred to as downlink control information with cyclic redundancy check scrambled by a power saving radio network temporary identity (PS-RNTI) (DCP) in the standard, and a signal form of the DCP may be DCI. Currently, it is stipulated that, when a monitoring occasion arrives, if all DCP monitoring occasions (DCP occasions) included in the current monitoring occasion are within a DRX active time, the UE does not perform monitoring on the current monitoring occasion, and the UE wakes up by default within on duration in a DRX cycle associated with the current monitoring occasion; or if at least one DCP monitoring occasion included in the current monitoring occasion is within a DRX non-active time, the UE performs monitoring on the DCP monitoring occasion within the DRX non-active time. One monitoring occasion may include one or more DCP monitoring occasions (DCP occasions).

Currently, UE in a radio resource control (RRC) connected mode may support two DRX configurations. However, currently, the two DRX configuration technologies are not used in combination with a wake-up signal, which affects flexibility of a base station configuration. In addition, the two DRX configurations are introduced to save functions, and the wake-up signal is also introduced to reduce power consumption. If the two DRX configurations and the wake-up signal cannot be combined, a purpose of further reducing power consumption of the UE cannot be achieved.

SUMMARY

Embodiments of this disclosure provide a communication method and a device, to reduce power consumption of UE.

According to a first aspect, a first communication method may be performed by a terminal device, or may be performed by a chip system, and the chip system can implement functions of the terminal device. A first group of carriers and a second group of carriers are configured for the terminal device. The first group of carriers belongs to FR1, the first group of carriers includes one or more carriers configured for the terminal device, a first DRX configuration is applied to the first group of carriers, and first DRX on duration corresponds to the first DRX configuration. The second group of carriers belongs to FR2, the second group of carriers includes one or more carriers configured for the terminal device, a second DRX configuration is applied to the second group of carriers, and second DRX on duration corresponds to the second DRX configuration. The method includes: When a time domain position of a first DCP monitoring occasion is within a first DRX active time, the terminal device determines not to monitor DCP on the first DCP monitoring occasion, where the first DCP monitoring occasion is configured on the first group of carriers; and the terminal device wakes up on the first group of carriers within the first DRX on duration associated with the first DCP monitoring occasion, and the terminal device wakes up or sleeps on the second group of carriers according to a first rule within the second DRX on duration associated with the first DCP monitoring occasion, where the first DRX on duration corresponds to the first DRX configuration, the second DRX on duration corresponds to the second DRX configuration, and the first rule is a preset rule, or the first rule is a rule configured by using configuration information from a network device; or when a time domain position of a first DCP monitoring occasion is not or is partially within a first DRX active time, the terminal device determines to monitor DCP on the first DCP monitoring occasion, and then the terminal device monitors the DCP on the first DCP monitoring occasion; and based on an indication of DCP obtained through monitoring, the terminal device sleeps or wakes up on the first group of carriers within the first DRX on duration, and sleeps or wakes up on the second group of carriers within the second DRX on duration.

In an embodiment of this disclosure, two DRX configuration technologies can be used in combination with a wake-up signal, to further reduce power consumption of the terminal device. In addition, behavior of the terminal device in the case of combination is specified. For example, a monitoring status on the DCP monitoring occasion corresponding to the first group of carriers by the terminal device is applicable to both the first group of carriers and is also applicable to the second group of carriers. In this way, the terminal device only needs to monitor the DCP on the first group of carriers, and does not need to monitor the DCP on the second group of carriers. This reduces power consumption of monitoring the DCP by the terminal device. In addition, a monitoring status on one group of carriers by the terminal device can be applied to two groups of carriers, so that both groups of carriers can use a DCP mechanism, and power consumption of the terminal device on the two groups of carriers can be further reduced.

According to one embodiment, the terminal device determines whether to monitor DCP on the first DCP monitoring occasion; and when the terminal device determines not to monitor the DCP on the first DCP monitoring occasion, the terminal device wakes up on the first group of carriers within the first discontinuous reception DRX on duration associated with the first DCP monitoring occasion, and the terminal device wakes up or sleeps on the second group of carriers within the second DRX on duration associated with the first DCP monitoring occasion, where the first group of carriers includes one or more carriers configured for the terminal device, the first DRX configuration is applied to the first group of carriers, the first DRX on duration corresponds to the first DRX configuration, the second group of carriers includes one or more carriers configured for the terminal device, the second DRX configuration is applied to the second group of carriers, and the second DRX on duration corresponds to the second DRX configuration.

In an embodiment of this disclosure, the two DRX configuration technologies can be used in combination with the wake-up signal, and the behavior of the terminal device in the case of combination is specified. For example, the monitoring status on the DCP monitoring occasion corresponding to the first group of carriers by the terminal device is applicable to the first group of carriers and is also applicable to the second group of carriers. In this way, the terminal device only needs to monitor the DCP on the first group of carriers, and does not need to monitor the DCP on the second group of carriers. This reduces power consumption of monitoring the DCP by the terminal device. In addition, a monitoring status on one group of carriers by the terminal device can be applied to two groups of carriers, so that both groups of carriers can use a DCP mechanism, and power consumption of the terminal device on the two groups of carriers can be further reduced.

In an embodiment, the first DCP monitoring occasion is configured on the first group of carriers.

On the network device, a DCP monitoring occasion may not need to be configured for the second group of carriers, the terminal device only needs to perform monitoring on a DCP monitoring occasion on the first group of carriers, and a monitoring result can be applied to the two groups of carriers. In this way, the two groups of carriers can use the DCP mechanism, to reduce power consumption of the terminal device. In addition, the terminal device does not need to monitor the DCP on the second group of carriers, to further reduce power consumption of monitoring the DCP by the terminal device.

In an embodiment, the first DRX on duration is located after the first DCP monitoring occasion in time domain.

On the first group of carriers, one or more DRX cycles that are located after the first DCP monitoring occasion in time domain may be associated with the first DCP monitoring occasion. Specific DRX cycles associated with the first DCP monitoring occasion may be specified in a protocol, or may be configured by the network device. If the first DCP monitoring occasion is associated with a plurality of DRX cycles, the plurality of DRX cycles may be consecutive or inconsecutive in time domain. The first DRX on duration may include on duration in all or a part of the DRX cycles associated with the first DCP monitoring occasion on the first DRX configuration, or the first DRX on duration may include on duration in all or a part of the DRX cycles associated with the first DCP monitoring occasion on the first group of carriers.

In an embodiment, that the terminal device determines whether to monitor DCP on the first DCP monitoring occasion includes:

when a time domain position of the first DCP monitoring occasion is within a first DRX active time, the terminal device determines not to monitor the DCP on the first DCP monitoring occasion; or when a time domain position of the first DCP monitoring occasion is not or is partially within a first DRX active time, the terminal device determines to monitor the DCP on the first DCP monitoring occasion, where the first DRX active time is a DRX active time corresponding to the first DRX configuration; or when a maximum quantity of sizes of DCI that can be monitored is greater than or equal to a quantity of sizes of DCI that need to be monitored by the terminal device, the terminal device determines to monitor the DCP on the first DCP monitoring occasion; or when a maximum quantity of sizes of DCI that can be monitored is less than a quantity of sizes of DCI that need to be monitored by the terminal device, the terminal device determines not to monitor the DCP on the first DCP monitoring occasion; or when a time domain position of the first DCP monitoring occasion is within a first DRX active time, and a maximum quantity of sizes of DCI that can be monitored is greater than or equal to a quantity of sizes of DCI that need to be monitored by the terminal device, the terminal device determines to monitor the DCP on the first DCP monitoring occasion; or when a time domain position of the first DCP monitoring occasion is within a first DRX active time, and a maximum quantity of sizes of DCI that can be monitored is less than a quantity of sizes of DCI that need to be monitored by the terminal device, the terminal device determines not to monitor the DCP on the first DCP monitoring occasion, where the first DRX active time is a DRX active time corresponding to the first DRX configuration.

The terminal device may determine whether to monitor the DCP on the first DCP monitoring occasion in different determining manners. For example, the terminal device may perform determining based on a time domain position of the first DCP monitoring occasion. This determining manner is easy to implement for the terminal device, and is also conducive to compatibility with an existing technology. Alternatively, the terminal device may perform determining based on a DCI size budget. This determining manner is relatively simple and reasonable. Alternatively, the terminal device may perform determining in combination with the two determining manners, so that a determining result can be more accurate. This embodiment of this disclosure provides a plurality of determining manners. A determining manner to be selected may be determined by the terminal device, or may be configured by the network device, or may be configured by default, or may be specified in a protocol, or the like.

In an embodiment, the terminal device receives configuration information from the network device. The configuration information is used to configure that when the terminal device does not perform monitoring on a first DCP monitoring occasion, the terminal device wakes up or sleeps within the second DRX on duration associated with the first DCP monitoring occasion.

If the terminal device does not perform monitoring on a DCP monitoring occasion on the first group of carriers, whether the terminal device wakes up or sleeps in the DRX on duration associated with the DCP monitoring occasion may be a default rule, may be specified in a protocol, or may be configured by the network device. If that is configured by the network device, the network device may perform configuration based on a service transmission status of the terminal device on the second group of carriers, so that sleep or wake-up of the terminal device on the second group of carriers better meets a service requirement of the terminal device.

In an embodiment, when the terminal device determines to monitor the DCP on the first DCP monitoring occasion, the terminal device monitors the DCP on the first DCP monitoring occasion; and the terminal device sleeps or wakes up on the first group of carriers within the first DRX on duration and sleeps or wakes up on the second group of carriers within the second DRX on duration based on a monitoring status of the DCP.

If the terminal device performs monitoring on the first DCP monitoring occasion, the terminal device sleeps or wakes up on the two groups of carriers based on the indication of the DCP obtained through monitoring on the first DCP monitoring occasion. In other words, a monitoring result of the terminal device on the first DCP monitoring occasion can guide behavior of the terminal device on the two groups of carriers, to simplify a DCP monitoring process of the terminal device, and reduce power consumption.

In an embodiment, when the terminal device receives first DCP from the network device on the first DCP monitoring occasion, and the first DCP indicates sleep, the terminal device sleeps on the first group of carriers within the first DRX on duration, and the terminal device sleeps on the second group of carriers within the second DRX on duration; or when the terminal device does not receive DCP from the network device on the first DCP monitoring occasion, the terminal device sleeps on the first group of carriers within the first DRX on duration, and the terminal device sleeps on the second group of carriers within the second DRX on duration.

In an embodiment, when the terminal device receives first DCP from the network device on the first DCP monitoring occasion, and the first DCP indicates wake-up, the terminal device wakes up on the first group of carriers within the first DRX on duration, and the terminal device wakes up on the second group of carriers within the second DRX on duration; or when the terminal device receives first DCP from the network device on the first DCP monitoring occasion, the terminal device wakes up on the first group of carriers within the first DRX on duration, and the terminal device wakes up on the second group of carriers within the second DRX on duration.

In an embodiment, the terminal device receives, on the first DCP monitoring occasion, first DCP from the network device, where the first DCP includes first indication information and second indication information; and when the first indication information indicates wake-up and the second indication information indicates wake-up, the terminal device wakes up on the first group of carriers within the first DRX on duration, and the terminal device wakes up on the second group of carriers within the second DRX on duration; or when the first indication information indicates sleep and the second indication information indicates sleep, the terminal device sleeps on the first group of carriers within the first DRX on duration, and the terminal device sleeps on the second group of carriers within the second DRX on duration; or when the first indication information indicates wake-up and the second indication information indicates sleep, the terminal device wakes up on the first group of carriers within the first DRX on duration, and the terminal device sleeps on the second group of carriers within the second DRX on duration; or when the first indication information indicates sleep and the second indication information indicates wake-up, the terminal device sleeps on the first group of carriers within the first DRX on duration, and the terminal device wakes up on the second group of carriers within the second DRX on duration.

In an embodiment, the terminal device skips starting and restarting a first DRX on duration timer at a start moment of the first DRX on duration. The first DRX on duration timer corresponds to the first DRX configuration.

In an embodiment, the terminal device starts or restarts the first DRX on duration timer at the start moment of the first DRX on duration. The first DRX on duration timer corresponds to the first DRX configuration.

In an embodiment, the terminal device skips starting and restarting a second DRX on duration timer at a start moment of the second DRX on duration. The second DRX on duration timer corresponds to the second DRX configuration.

In an embodiment, the terminal device starts or restarts the second DRX on duration timer at the start moment of the second DRX on duration. The second DRX on duration timer corresponds to the second DRX configuration.

According to the foregoing solution, an implementation in which the terminal device wakes up or sleeps in DRX on duration is provided.

In an embodiment, a frequency range to which the first group of carriers belongs is different from a frequency range to which the second group of carriers belongs; or a frequency corresponding to a frequency range to which the second group of carriers belongs is greater than a frequency corresponding to a frequency range to which the first group of carriers belongs; or a length of a DRX active time corresponding to the first group of carriers is greater than or equal to a length of a DRX active time corresponding to the second group of carriers.

For example, the two groups of carriers configured for the terminal device belong to different frequency ranges, so that the terminal device can work in a larger frequency range. For example, a frequency of the first group of carriers belongs to FR1, and a frequency of the second group of carriers belongs to FR2. Because the frequency of the second group of carriers is greater than the frequency of the first group of carriers, power consumption of the terminal device is higher when the terminal device works on the second group of carriers. Therefore, in this embodiment of this disclosure, the terminal device only needs to monitor the DCP on the first group of carriers, and does not need to monitor the DCP on the second group of carriers. This saves power consumption caused when the terminal device works on the second group of carriers. In addition, the network device may send DCI on the first group of carriers, and the DCI is used to schedule data on the second group of carriers. Therefore, the terminal device may need to receive scheduling information for the second group of carriers on the first group of carriers. Therefore, the length of the DRX active time corresponding to the first group of carriers may be greater than or equal to the length of the DRX active time corresponding to the second group of carriers. In an embodiment, the DRX active time corresponding to the first group of carriers may cover the DRX active time corresponding to the second group of carriers, so that the terminal device can receive, within the DRX active time of the first group of carriers, the scheduling information corresponding to the second group of carriers, thereby reducing a probability that the terminal device cannot receive data or send data on the second group of carriers because the terminal device cannot receive the scheduling information, and reducing a service transmission delay.

According to a second aspect, a second communication method may be performed by a terminal device, or may be performed by a chip system, and the chip system can implement functions of the terminal device. When the terminal device determines not to monitor DCP on a first DCP monitoring occasion, the terminal device determines whether to monitor the DCP on a second DCP monitoring occasion, where the first DCP monitoring occasion is configured on a first group of carriers, the second DCP monitoring occasion is configured on a second group of carriers, the first group of carriers includes one or more carriers configured for the terminal device, a first DRX configuration is applied to the first group of carriers, the second group of carriers includes one or more carriers configured for the terminal device, and a second DRX configuration is applied to the second group of carriers; and when the terminal device determines to monitor the DCP on the second DCP monitoring occasion, the terminal device monitors the DCP on the second DCP monitoring occasion, and sleeps or wakes up on the second group of carriers based on a monitoring status of the DCP within second DRX on duration associated with the second DCP monitoring occasion. The second DRX on duration corresponds to the second DRX configuration.

In an embodiment of this disclosure, two DRX configuration technologies can be used in combination with a wake-up signal, and behavior of the terminal device in the case of combination is specified. For example, UE preferentially monitors a first DCP monitoring occasion. If the UE can monitor the first DCP monitoring occasion, the UE does not need to monitor a second DCP monitoring occasion, to reduce power consumption caused when the UE monitors a DCP monitoring occasion. If the UE cannot monitor the first DCP monitoring occasion, the UE may further determine whether the UE can monitor the second DCP monitoring occasion, so that behavior of the UE is performed as indicated by a monitoring result as much as possible, to better meet a requirement of a network device. In this embodiment of this disclosure, the network device may configure the second DCP monitoring occasion for the second group of carriers, so that the network device has stronger control over the behavior of the UE on the second group of carriers, and scheduling flexibility of the network device is also improved.

In an embodiment, the terminal device determines whether to monitor the DCP on the first DCP monitoring occasion.

In an embodiment, when the terminal device determines not to monitor the DCP on the second DCP monitoring occasion, the terminal device wakes up on the second group of carriers within the second DRX on duration.

If the terminal device does not monitor the DCP on the second DCP monitoring occasion, the behavior of the terminal device on the second group of carriers may be default, or may be specified in a protocol. For example, the terminal device may wake up on the second group of carriers within the second DRX on duration, to perform service transmission. Alternatively, the terminal device may sleep on the second group of carriers within the second DRX on duration, to reduce power consumption of the terminal device.

In an embodiment, when the terminal device determines to monitor the DCP on the first DCP monitoring occasion, the terminal device sleeps or wakes up on the first group of carriers within first DRX on duration associated with the first DCP monitoring occasion, and sleeps or wakes up on the second group of carriers within the second DRX on duration, based on a monitoring status of the DCP. The first DRX on duration corresponds to the first DRX configuration.

In an embodiment, when the terminal device determines to monitor the DCP on the first DCP monitoring occasion, the terminal device skips monitoring on the second group of carriers on the second DCP monitoring occasion.

If the terminal device can monitor the DCP on the first DCP monitoring occasion, the terminal device may determine behavior on the first group of carriers and determine behavior on the second group of carriers based on an indication of DCP obtained through monitoring on the first DCP monitoring occasion. In this case, the terminal device does not need to perform monitoring on the second DCP monitoring occasion, thereby reducing power consumption of monitoring the DCP by the terminal device.

In an embodiment, when the terminal device determines not to monitor the DCP on the first DCP monitoring occasion, the terminal device wakes up on the first group of carriers within the first DRX on duration associated with the first DCP monitoring occasion. The first DRX on duration corresponds to the first DRX configuration.

If the terminal device does not monitor the DCP on the first DCP monitoring occasion, behavior of the terminal device on the first group of carriers may be default, or may be specified in a protocol. For example, the terminal device wakes up within the first DRX on duration, to perform service transmission. For another example, the terminal device may alternatively sleep within the first DRX on duration, to reduce power consumption of the terminal device.

In an embodiment, when a time domain position of the first DCP monitoring occasion is within a first DRX active time, the terminal device determines not to monitor the DCP on the first DCP monitoring occasion; or when a time domain position of the first DCP monitoring occasion is not or is partially within a first DRX active time, the terminal device determines to monitor the DCP on the first DCP monitoring occasion, where the first DRX active time is a DRX active time corresponding to the first DRX configuration; or when a maximum quantity of sizes of DCI that can be monitored is greater than or equal to a quantity of sizes of DCI that need to be monitored by the terminal device, the terminal device determines to monitor the DCP on the first DCP monitoring occasion; or when a maximum quantity of sizes of DCI that can be monitored is less than a quantity of sizes of DCI that need to be monitored by the terminal device, the terminal device determines not to monitor the DCP on the first DCP monitoring occasion; or when a time domain position of the first DCP monitoring occasion is within a first DRX active time, and a maximum quantity of sizes of DCI that can be monitored is greater than or equal to a quantity of sizes of DCI that need to be monitored by the terminal device, the terminal device determines to monitor the DCP on the first DCP monitoring occasion; or when a time domain position of the first DCP monitoring occasion is within a first DRX active time, and a maximum quantity of sizes of DCI that can be monitored is less than a quantity of sizes of DCI that need to be monitored by the terminal device, the terminal device determines not to monitor the DCP on the first DCP monitoring occasion. The first DRX active time is a DRX active time corresponding to the first DRX configuration.

The terminal device may determine whether to monitor the DCP on the first DCP monitoring occasion in different determining manners. For example, the terminal device may perform determining based on a time domain position of the first DCP monitoring occasion. This determining manner is easy to implement for the terminal device, and is also conducive to compatibility with an existing technology. Alternatively, the terminal device may perform determining based on a DCI size budget. This determining manner is relatively simple and reasonable. Alternatively, the terminal device may perform determining in combination with the two determining manners, so that a determining result can be more accurate. This embodiment of this disclosure provides a plurality of determining manners. A determining manner to be selected may be determined by the terminal device, or may be configured by the network device, or may be configured by default, or may be specified in a protocol, or the like.

In an embodiment, when a time domain position of the second DCP monitoring occasion is within a second DRX active time, the terminal device determines not to monitor the DCP on the second DCP monitoring occasion; or when a time domain position of the second DCP monitoring occasion is not or is partially within a second DRX active time, the terminal device determines to monitor the DCP on the first DCP monitoring occasion, where the second DRX active time is a DRX active time corresponding to the second DRX configuration; or when the maximum quantity of sizes of DCI that can be monitored is greater than or equal to the quantity of sizes of DCI that need to be monitored by the terminal device, the terminal device determines to monitor the DCP on the second DCP monitoring occasion; or when the maximum quantity of sizes of DCI that can be monitored is less than the quantity of sizes of DCI that need to be monitored by the terminal device, the terminal device determines not to monitor the DCP on the second DCP monitoring occasion; or when a time domain position of the second DCP monitoring occasion is within a second DRX active time, and the maximum quantity of sizes of DCI that can be monitored is greater than or equal to the quantity of sizes of DCI that need to be monitored by the terminal device, the terminal device determines to monitor the DCP on the second DCP monitoring occasion; or when a time domain position of the second DCP monitoring occasion is within a second DRX active time, and the maximum quantity of sizes of DCI that can be monitored is less than the quantity of sizes of DCI that need to be monitored by the terminal device, the terminal device determines not to monitor the DCP on the second DCP monitoring occasion.

The terminal device may determine whether to monitor the DCP on the second DCP monitoring occasion in different determining manners. For example, the terminal device may perform determining based on a time domain position of the second DCP monitoring occasion. This determining manner is easy to implement for the terminal device, and is also conducive to compatibility with an existing technology. Alternatively, the terminal device may perform determining based on a DCI size budget. This determining manner is relatively simple and reasonable. Alternatively, the terminal device may perform determining in combination with the two determining manners, so that a determining result can be more accurate. This embodiment of this disclosure provides a plurality of determining manners. A determining manner to be selected may be determined by the terminal device, or may be configured by the network device, or may be configured by default, or may be specified in a protocol, or the like.

In an embodiment, when the time domain position of the first DCP monitoring occasion is within the first DRX active time, and the time domain position of the second DCP monitoring occasion is not or partially within the second DRX active time, the terminal device determines not to monitor the DCP on the first DCP monitoring occasion, and determines to monitor the DCP on the second DCP monitoring occasion.

According to a third aspect, a third communication method may be performed by a terminal device, or may be performed by a chip system, and the chip system can implement functions of the terminal device. The method includes: The terminal device receives, on a first carrier, DCI from a network device, where the first carrier belongs to a first group of carriers, the first group of carriers includes one or more carriers configured for the terminal device, and a first DRX configuration is applied to the first group of carriers; and the terminal device determines, based on second indication information included in the DCI, to sleep or wake up on a second group of carriers within second DRX on duration associated with the DCI, where the second DRX on duration corresponds to a second DRX configuration, the second DRX configuration is applied to the second group of carriers, the second group of carriers includes one or more carriers configured for the terminal device, and when a value of a second field included in the DCI is a first value, the second field is used to indicate that the DCI includes the second indication information.

In an embodiment of this disclosure, the two DRX configuration technologies can be used in combination with a wake-up signal. In addition, in this embodiment of this disclosure, DCP does not need to be configured, but a function of the DCP is implemented by using common DCI, and therefore, a quantity of sizes of DCI that need to be monitored by UE is reduced, or UE can monitor more DCI sizes, which also simplifies implementation of the network device and the UE. In addition, the network device may indicate, by using corresponding indication information, the UE to wake up or sleep on a carrier group. This improves flexibility of an indication manner, better meets a service transmission requirement of the UE, and also increases scheduling flexibility of the network device. In addition, in this embodiment of this disclosure, it is also avoided that the UE wakes up on the second group of carriers within the second DRX on duration in a default manner, so that power consumption of the UE can be reduced.

In an embodiment, when the value of the second field is a second value, the second field is used to indicate that the DCI does not include the second indication information.

If the DCI is used to implement the function of the DCP, the second field whose value is the first value may be used to indicate that the DCI further includes the second indication information. If the DCI is not used to implement the function of the DCP, the value of the second field may not be the first value, for example, may be a common value. In this case, the terminal device can determine, based on the value of the second field, whether the DCI includes the second indication information, the indication is relatively clear, and other indication information does not need to be additionally added. This helps to be compatible with the existing technology.

In an embodiment, the second field includes one or more of the following fields: an FDRA field, an MCS field, an NDI field, an RV field, a HARQ process number field, an antenna port field, or a demodulation reference signal sequence initialization field.

The second field may include one or more of the foregoing fields, or the second field may include another field in addition to the foregoing fields, or the second field may not include the foregoing fields, but include another field. The another field is, for example, another existing field, included in the DCI, other than the foregoing fields, or may be a newly added field in the DCI.

In an embodiment, the terminal device determines, based on first indication information included in the DCI, to sleep or wake up on the first group of carriers within first DRX on duration associated with the DCI. The first DRX on duration corresponds to the first DRX configuration, and when the value of the second field is the first value, the second field is further used to indicate that the DCI includes the first indication information.

If the value of the second field is the first value, the DCI may further include the first indication information, or if the value of the second field is not the first value, the DCI does not include the first indication information. In this implementation, the network device separately indicates sleep or wake-up of the two groups of carriers by using the second indication information and the first indication information, so that behavior of the UE is clearer and more meets a service requirement.

In an embodiment,
the terminal device sleeps or wakes up on the first group of carriers within first DRX on duration associated with the DCI, where the first DRX on duration corresponds to the first DRX configuration; or
that the terminal device determines, based on second indication information included in the DCI, to sleep or wake up on a second group of carriers within second DRX on duration associated with the DCI includes: When the terminal device determines not to monitor the DCP on the first group of carriers, the terminal device determines, based on the second indication information included in the DCI, to sleep or wake up on the second group of carriers within the second DRX on duration associated with the DCI; and
the terminal device sleeps or wakes up on the first group of carriers within first DRX on duration associated with the DCI, where the first DRX on duration corresponds to the first DRX configuration.

The DCI may not indicate behavior of the UE on the first group of carriers. In this case, by default (or specified in a protocol), the UE wakes up on the first group of carriers within the first DRX on duration associated with the DCI. If the second indication information indicates that the UE wakes up on the second group of carriers within the second DRX on duration, and the network device needs to schedule, on the first group of carriers, data transmission of the UE on the second group of carriers, the UE cannot receive scheduling information from the network device if the UE sleeps on the first group of carriers within the first DRX on duration, and therefore data transmission cannot be performed on the second group of carriers. Therefore, by default (or specified in a protocol), the UE sleeps on the first group of carriers within the first DRX on duration, to reduce a probability that the UE misses the scheduling information and reduce a service transmission delay. Alternatively, by default (or specified in a protocol), the UE sleeps on the first group of carriers within the first DRX on duration associated with the DCI. In this manner, power consumption of the UE can be reduced.

According to a fourth aspect, a fourth communication method may be performed by a network device, or may be performed by a chip system, and the chip system can implement functions of the network device. For example, the network device is an access network device. For example, the access network device is a base station. The method includes: The network device sends DCI to a terminal device on a first carrier. The first carrier belongs to a first group of carriers, the first group of carriers includes one or more carriers configured for the terminal device, and a first DRX configuration is applied to the first group of carriers. When a value of a second field included in the DCI is a first value, the second field is used to indicate that the DCI includes second indication information. The second indication information is used to indicate to sleep or wake up on a second group of carriers within second DRX on duration associated with the DCI. The second DRX on duration corresponds to a second DRX configuration, the second DRX configuration is applied to the second group of carriers, and the second group of carriers includes one or more carriers configured for the terminal device.

In an embodiment, when the value of the second field is a second value, the second field is used to indicate that the DCI does not include the second indication information.

In an embodiment, the second field includes one or more of the following fields: an FDRA field, an MCS field, an NDI field, an RV field, a HARQ process number field, an antenna port field, or a demodulation reference signal sequence initialization field.

In an embodiment, when the value of the second field is the first value, the second field is further used to indicate that the DCI includes first indication information. The first indication information is used to indicate to sleep or wake up on the first group of carriers within first DRX on duration associated with the DCI, and the first DRX on duration corresponds to the first DRX configuration.

For technical effects brought by the fourth aspect or the optional implementations of the fourth aspect, refer to the descriptions of the technical effects of the third aspect or the corresponding implementations.

According to a fifth aspect, a fifth communication method may be performed by a terminal device, or may be performed by a chip system, and the chip system can implement functions of the terminal device. The terminal device receives second DCI on a first carrier. The first carrier belongs to a first group of carriers, and the second DCI is used to schedule data on a second group of carriers. A first DRX configuration is applied to the first group of carriers, and a second DRX configuration is applied to the second group of carriers. The first group of carriers includes one or more carriers configured for the terminal device, and the second group of carriers includes one or more carriers configured for the terminal device. The terminal device starts or restarts a second DRX inactivity timer, and sets duration of the second DRX inactivity timer to duration of a DRX inactivity timer configured in the second DRX configuration.

In an embodiment of this disclosure, the two DRX configuration technologies can be used in combination with a cross-carrier scheduling technology. When cross-carrier scheduling is implemented, UE can receive, on the first group of carriers, DCI that is from a network device and that is used to schedule data on the second group of carriers. In addition, the UE can also receive data or send data on the second group of carriers, so that the cross-carrier scheduling technology can be implemented under the background of the two DRX configuration technologies. In addition, in this embodiment of this disclosure, duration of a first DRX inactivity timer corresponding to the first group of carriers may be set to different duration based on different cases, so that the duration of the first DRX inactivity timer better meets a current service transmission requirement, and power consumption of the UE is further reduced.

In an embodiment, the terminal device starts or restarts the second DRX inactivity timer on a first time domain symbol after the second DCI is completely received.

The time domain symbol is, for example, an orthogonal frequency division multiplexing (orthogonal frequency division multiplexing, OFDM) symbol.

In an embodiment, the second DCI includes second indication information, and the second indication information is used to indicate to start or restart the second DRX inactivity timer.

The second indication information may be carried by using an existing field in the second DCI. For example, if the existing field included in the second DCI has a reserved bit, the second indication information may be carried by using the reserved bit. Alternatively, one or more bits may be added to the second DCI to carry the second indication information. An indication is performed by using the second DCI, so that the UE is more aware of behavior of the UE.

In an embodiment, after that the terminal device receives second DCI on a first carrier, the method further includes: The terminal device starts or restarts the first DRX inactivity timer, and sets the duration of the first DRX inactivity timer to duration of a DRX inactivity timer configured in the first DRX configuration, or sets the duration of the first DRX inactivity timer to the duration of the DRX inactivity timer configured in the second DRX configuration. The first DRX inactivity timer corresponds to the first DRX configuration.

Because there is data transmission on the second group of carriers, and the second DCI is used for cross-carrier scheduling, the network device may subsequently schedule the data on the second group of carriers in a cross-carrier scheduling manner. In addition, the network device may schedule, on the first group of carriers, data on the first group of carriers. Therefore, a DRX active time of the UE on the first group of carriers can be prolonged to receive DCI used for scheduling data. The UE needs to prolong the DRX active time of the UE on the first group of carriers in an implementation of using the first DRX inactive timer. For example, the UE may set the duration of the first DRX inactivity timer to original duration of the first DRX inactivity timer, namely, the duration of the DRX inactivity timer configured in the first DRX configuration. This setting manner is relatively simple, and is also a setting that can be easily implemented by the UE. For another example, that the UE may alternatively set the duration of the first DRX inactivity timer to the duration of the DRX inactivity timer configured in the second DRX configuration may be understood as: The UE sets the duration of the first DRX inactivity timer to the duration of the second DRX inactivity timer. If this manner is used, the duration of the DRX active time of the UE on the first group of carriers may be consistent with the duration of the DRX active time of the UE on the second group of carriers. The UE can receive, on the first group of carriers, the DCI used for scheduling the data on the second group of carriers, and does not consume excessive power due to excessively long DRX active time on the first group of carriers.

In an embodiment, when the terminal device sets the duration of the first DRX inactivity timer to the duration of the DRX inactivity timer configured in the second DRX configuration, the method further includes: Before the terminal device restarts the first DRX inactivity timer, the terminal device determines that the first DRX inactivity timer is in a running state, and determines that remaining duration of the first DRX inactivity timer is shorter than duration of the DRX inactivity timer configured in the second DRX configuration.

The UE may not need to start or restart the first DRX inactivity timer in any case, but may first determine whether to start or restart the first DRX inactivity timer. For example, before the UE starts or restarts the first DRX inactivity timer, if the first DRX inactivity timer is in a running state, the UE may determine a value relationship between the remaining duration of the first DRX inactivity timer and the duration of the DRX inactivity timer configured in the second DRX configuration. If the remaining duration of the first DRX inactivity timer is shorter than the duration of the DRX inactivity timer configured in the second DRX configuration, the UE may set the duration of the first DRX inactivity timer to the duration of the DRX inactivity timer configured in the second DRX configuration. Alternatively, if the remaining duration of the first DRX inactivity timer is longer than or equal to the duration of the DRX inactivity timer configured in the second DRX configuration, the UE may not need to restart the first DRX inactivity timer. In this way, the duration of the first DRX inactivity timer avoids to be varied, and processing complexity of the UE is reduced.

In an embodiment, before the terminal device starts or restarts the first DRX inactivity timer, and sets the duration of the first DRX inactivity timer to the duration of the DRX inactivity timer configured in the first DRX configuration, the method further includes: The terminal device receives first DCI on the first group of carriers. The first DCI is used to schedule the data on the first group of carriers.

If the UE receives the first DCI on the first group of carriers before starting or restarting the first DRX inactivity timer, and the first DCI is used to schedule the UE to receive data or send data on the first group of carriers, the UE may set the duration of the first DRX inactivity timer to the duration of the DRX inactivity timer configured in the first DRX configuration, to meet a requirement of the UE for receiving data or sending data on the first group of carriers. The scheduling requirement of receiving, by the UE, data corresponding to the first group of carriers on the first group of carriers can also be met.

In an embodiment, the second DCI includes first indication information, and the first indication information is used to indicate to start or restart the first DRX inactivity timer.

Whether the UE needs to start the first DRX inactivity timer or not may be specified by default, or may be specified in a protocol, or may be indicated by the network device. For example, the second DCI may include the first indication information, and the first indication information may indicate to start or restart the first DRX inactivity timer. An indication is performed by using the second DCI, so that the UE is more aware of behavior of the UE.

In an embodiment, the first indication information is further used to indicate to set timing duration of the first DRX inactivity timer to the duration of the DRX inactivity timer configured in the first DRX configuration, or indicate to set timing duration of the first DRX inactivity timer to the duration of the DRX inactivity timer configured in the second DRX configuration.

If the second DCI includes the first indication information, in addition to indicating the UE to start or restart the first DRX inactivity timer, the first indication information may further indicate how to set the duration of the first DRX inactivity timer. Therefore, the UE does not need to determine, by itself, how to set the duration of the first DRX inactivity timer. This simplifies implementation of the UE.

In an embodiment, the terminal device prolongs an end moment of the DRX active time of the terminal device on the first group of carriers to be the same as an end moment of the DRX active time of the terminal device on the second group of carriers.

The UE needs to prolong the DRX active time of the UE on the first group of carriers in an implementation of using the first DRX inactivity timer, or in another implementation of not using the first DRX inactivity timer, but directly prolonging the end moment of the DRX active time on the first group of carriers, for example, the end moment of the DRX active time of the UE on the first group of carriers is prolonged to be the same as the end moment of the DRX active time of the UE on the second group of carriers. If this manner is used, the duration of the DRX active time of the UE on the first group of carriers is consistent with the duration of the DRX active time of the UE on the second group of carriers. The UE can receive, on the first group of carriers, the DCI used for scheduling the data on the second group of carriers, and does not consume excessive power due to excessively long DRX active time on the first group of carriers. In addition, in this manner, a first DRX inactivity timer does not need to be used, thereby reducing power consumption caused when the UE maintains the first DRX inactivity timer.

In an embodiment, the second DCI is used to indicate new transmission of downlink data or new transmission of uplink data.

According to a sixth aspect, a communication apparatus may include modules configured to perform the method according to any one of the first aspect or the optional implementations of the first aspect. For example, the communication apparatus includes a transceiver unit and a processing unit. Optionally, the communication apparatus may further include a storage unit.

According to a seventh aspect, a communication apparatus may include modules configured to perform the method according to any one of the second aspect or the optional implementations of the second aspect. For example, the communication apparatus includes a transceiver unit and a processing unit. Optionally, the communication apparatus may further include a storage unit.

According to an eighth aspect, a communication apparatus may include modules configured to perform the method according to any one of the third aspect or the optional implementations of the third aspect. For example, the communication apparatus includes a transceiver unit and a processing unit. Optionally, the communication apparatus may further include a storage unit.

According to a ninth aspect, a communication apparatus may include modules configured to perform the method according to any one of the fourth aspect or the optional implementations of the fourth aspect. For example, the communication apparatus includes a transceiver unit and a processing unit. Optionally, the communication apparatus may further include a storage unit.

According to a tenth aspect, a communication apparatus may include modules configured to perform the method according to any one of the fifth aspect or the optional implementations of the fifth aspect. For example, the communication apparatus includes a transceiver unit and a processing unit. Optionally, the communication apparatus may further include a storage unit.

According to an eleventh aspect, a chip system includes one or more processors and includes a communication interface. The processor is coupled to the communication interface, and is configured to implement the method according to any one of the foregoing aspects. Optionally, the chip system may further include a memory. For example, the processor may read and execute a software program stored in the memory, to implement the method according to any one of the foregoing aspects.

According to a twelfth aspect, a first communication system includes the communication apparatus according to the sixth aspect or the chip system according to the eleventh aspect (which is configured to implement the method according to any one of the first aspect or the optional implementations of the first aspect).

According to a thirteenth aspect, a second communication system includes the communication apparatus according to the seventh aspect or the chip system according to the eleventh aspect (which is configured to implement the method according to any one of the second aspect or the optional implementations of the second aspect).

According to a fourteenth aspect, a third communication system includes the communication apparatus according to the eighth aspect or the chip system according to the eleventh aspect (which is configured to implement the method according to any one of the third aspect or the optional implementations of the third aspect), and the communication apparatus according to the ninth aspect or the chip system according to the eleventh aspect (which is configured to implement the method according to any one of the fourth aspect or the optional implementations of the fourth aspect).

According to a fifteenth aspect, a fourth communication system includes the communication apparatus according to the tenth aspect or the chip system according to the eleventh aspect (which is configured to implement the method according to any one of the fifth aspect or the optional implementations of the fifth aspect).

According to a sixteenth aspect, a computer-readable storage medium is configured to store a computer program, and when the computer program is run on a computer, the computer is enabled to perform the method according to any one of the foregoing aspects.

According to a seventeenth aspect, a computer program product including instructions is configured to store a computer program, and when the computer program is run on a computer, the computer is enabled to perform the method according to any one of the foregoing aspects.

DESCRIPTION OF EMBODIMENTS

Figure 1:
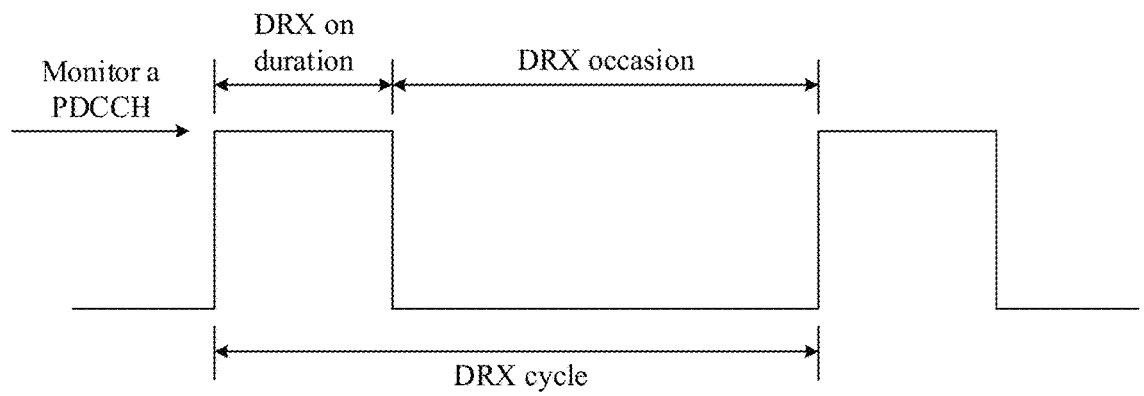
FIG. 1 is a schematic diagram of a DRX mechanism.

To make objectives, technical solution, and advantages of embodiments of this disclosure clearer, the following further describes embodiments of this disclosure in detail with reference to the accompanying drawings.

The following describes some terms in embodiments of this disclosure, to facilitate understanding of a person skilled in the art.

In embodiment of this disclosure, a terminal device is a device with a wireless transceiver function, and may be a fixed device, a mobile device, a handheld device, a wearable device, an in-vehicle device, or a wireless apparatus (for example, a communication module or a chip system) built in the foregoing device. The terminal device is configured to connect a person, an object, a machine, and the like, and may be widely used in various scenarios, for example, including but not limited to the following scenarios: cellular communication, device-to-device (D2D) communication, vehicle to everything (V2X), machine-to-machine/machine-type communications (M2M/MTC), internet of things (IoT), virtual reality (VR), augmented reality (AR), industrial control, self driving, telemedicine, smart grid, smart home, smart office, smart wear, smart transportation, smart city, an uncrewed aerial vehicle, and a robot. The terminal device may sometimes be referred to as UE, a terminal, an access station, a UE station, a remote station, a wireless communication device, a user apparatus, or the like. For ease of description, an example in which the terminal device is UE is used for description in this embodiment of this disclosure.

In embodiment of this disclosure, a network device includes, for example, an access network device and/or a core network device. The access network device is a device with a wireless transceiver function, and is configured to communicate with the terminal device. The access network device includes but is not limited to a base station (BTS, NodeB, eNodeB/eNB, or gNodeB/gNB) and a transmission reception point (TRP) in a communication system, a base station that is subsequently evolved in a 3rd generation partnership project (3GPP), and an access node, a wireless relay node, a wireless backhaul node, and the like in a Wi-Fi system. The base station may be a macro base station, a micro base station, a pico base station, a small cell, a relay station, or the like. A plurality of base stations may support a network of a same access technology mentioned above, or may support a network of different access technologies mentioned above. The base station may include one or more co-site or non-co-site transmission reception points. Alternatively, the network device may be a radio controller, a central unit (CU), and/or a distributed unit (DU) in a cloud radio access network (CRAN) scenario. Alternatively, the network device may be a server, a wearable device, an in-vehicle device, or the like. For example, a network device in a vehicle to everything (V2X) technology may be a road side unit (RSU). The following provides descriptions by using an example in which the access network device is a base station. A plurality of network devices in the communication system may be base stations of a same type, or may be base stations of different types. The base station may communicate with a terminal device, or may communicate with a terminal device via a relay station. The terminal device may communicate with a plurality of base stations in different access technologies. The core network device is configured to implement functions such as mobility management, data processing, session management, policy and charging. Names of devices that implement a core network function in systems of different access technologies may be different. This is not limited in this disclosure. A 5G system is used as an example. The core network device may include, for example, an access and mobility management function (AMF), a session management function (SMF), and a user plane function (UPF). A 4G system is as an example. The core network device may include a mobility management entity, and the like.

In embodiments of this disclosure, an apparatus configured to implement a function of a network device may be a network device, or may be an apparatus, for example, a chip system, that can support the network device in implementing the function. The apparatus may be installed in the network device. The technical solutions provided in embodiments of this disclosure are described by using an example in which the apparatus configured to implement the function of the network device is the network device.

In addition, because embodiments of this disclosure relate more to an access network device, the following "network device" refers to the access network device unless otherwise specified.

In embodiments of this disclosure, unless otherwise specified, a quantity of nouns represents "singular nouns or plural nouns", namely, "one or more". "At least one" means one or more, and "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" usually indicates an "or" relationship between the associated objects. For example, A/B indicates A or B. The term "at least one of the following items (pieces)" or an expression similar to the term indicates any combination of the items, and includes a single item (piece) or any combination of a plurality of items (pieces). For example, at least one item (piece) of a, b, or c may represent: a, b, c, a and b, a and c, b and c, or a, b, and c, where a, b, and c may be singular or plural.

In addition, unless otherwise stated, in embodiments of this disclosure, ordinal numbers such as "first" and "second" are intended to distinguish between a plurality of objects, but are not intended to limit sizes, content, orders, time sequences, priorities, importance degrees, or the like of the plurality of objects. For example, first DCI and second DCI may be the same DCI, or may be different DCI. In addition, this name does not indicate that the two pieces of DCI have different time lengths, sending sequences, content, priorities, or importance degrees.

To better understand technical solutions in embodiments of this disclosure, the following describes some technical features in embodiments of this disclosure.

1. DRX

A 5G new radio (NR) technology inherits a discontinuous reception (DRX) mechanism in a long term evolution (LTE) technology. The DRX mechanism is mainly introduced to reduce power consumption. A DRX cycle configured by a base station for UE may be a long DRX cycle or a short DRX cycle, where the long DRX cycle is a default configuration, and the short DRX cycle is an optional configuration. If one UE is configured with a long DRX cycle but not a short DRX cycle, the UE uses the long DRX cycle or the short DRX cycle at the same time, that is, the UE does not use both DRX cycles at the same time. The UE starts a DRX short cycle timer (drx-ShortCycleTimer) when using the short DRX cycle. When the drx-ShortCycleTimer expires, the UE implicitly switches to use the long DRX cycle. A unit of the drx-ShortCycleTimer is a quantity of short DRX cycles.

The DRX cycle consists of an "On Duration" part and an "Opportunity for DRX" part. Within the "On Duration", the UE monitors and receives a PDCCH. Within the "Opportunity for DRX", the UE may not monitor or receive the PDCCH, to reduce power consumption. For this, refer to FIG. 1. Monitoring and receiving a PDCCH may be understood as monitoring and receiving DCI carried on the PDCCH. The DRX mechanism includes a drx-onDurationTimer. When each DRX cycle starts (that is, the On Duration of each DRX cycle starts), the UE needs to start the drx-onDurationTimer. When the drx-onDurationTimer expires, it indicates that the "On Duration" expires, and in this case, the UE enters the "Opportunity for DRX" in the DRX cycle.

The DRX mechanism further includes a DRX inactivity timer (drx-InactivityTimer). When the UE receives a PDCCH used to indicate data initial transmission, because the UE is likely to continue to be scheduled by the base station in a subsequent time, the UE needs to enable the drx-InactivityTimer. During a running time of the drx-InactivityTimer, the UE needs to monitor and receive the PDCCH.

The DRX mechanism further includes a DRX retransmission timer (drx-RetransmissionTimer). The drx-RetransmissionTimer is divided into an uplink drx-RetransmissionTimer and a downlink drx-RetransmissionTimer. Because the base station may schedule retransmission of the UE within a running time of the drx-RetransmissionTimer, the UE needs to monitor and receive the PDCCH within the running time of the drx-RetransmissionTimer.

In conclusion, the UE needs to monitor and receive a PDCCH in a running process of the drx-onDurationTimer, the drx-InactivityTimer, the uplink drx-RetransmissionTimer, and the downlink drx-RetransmissionTimer. Therefore, running times of these timers are considered as a DRX "active time", and the UE needs to wake up to prepare to receive signaling or data in the DRX active time. In addition to the running times of all the foregoing timers, if none of the foregoing timers runs at a specified moment, the UE may not need to monitor and receive the PDCCH at this moment, and this moment is referred to as a DRX "sleep time". Within the DRX sleep time, the UE may sleep. Generally, power consumption of the UE in the DRX active time is higher than that in the DRX sleep time. It should be noted that, in some functions other than the DRX mechanism, it may also be limited that the UE needs to be in an "active time" or a "sleep time" in some cases. The functions and the DRX mechanism are not conflict, but are in a union set relationship. Therefore, whether the UE is actually in the "active time" or the "sleep time" needs to be determined based on each function of the UE as a whole.

2. Carrier Aggregation (CA) and Cross-Carrier Scheduling (Cross-Carrier Scheduling)

In a carrier aggregation technology, a plurality of (for example, two or more) component carriers (CCs) may be aggregated, to achieve an effect of increasing transmission bandwidth and improving uplink and downlink transmission rates. In a carrier aggregation scenario, a plurality of CCs include one primary carrier and one or more secondary carriers. The primary carrier is a carrier on which a primary cell (PCell) operates, and the secondary carrier is a carrier on which a secondary cell (SCell) operates. After UE accesses a network, the UE keeps communication on the primary carrier under a base station, and the base station may add one or more secondary carriers for the UE according to a service situation.

A frequency range of a 5G NR includes FR1 and FR2. FR1 is generally referred to as a 5G sub-6 GHz (lower than 6 GHz) frequency band, and FR2 is a frequency band greater than or equal to 6 GHz, for example, a 5G millimeter-wave frequency band. One carrier configured for the UE may belong to an FR1 frequency band or an FR2 frequency band. Therefore, an FR1+FR2 CA scenario exists, that is, at least one FR2 CC and an FR1 CC are used for carrier aggregation.

In CA scenarios, co-carrier scheduling and cross-carrier scheduling are available. The base station schedules, by sending DCI on a PDCCH, the UE to receive data or send data, to be specific, indicates, in the DCI, a physical downlink shared channel (physical downlink shared channel, PDSCH) used for scheduling data receiving, or a physical uplink shared channel (physical uplink shared channel, PUSCH) used for scheduling data sending. If a carrier for receiving the DCI and a carrier for receiving (or sending) data are a same carrier, co-carrier scheduling is performed. If a carrier for receiving the DCI and a carrier for receiving (or sending) data are different carriers, cross-carrier scheduling is performed. For the FR1+FR2 CA scenario, cross-carrier scheduling from FR1 to FR2 may be performed, that is, DCI is received on an FR1 carrier, and the DCI is scheduled to receive data or send data on an FR2 carrier.

3. Wake-Up Signal

Figure 2:
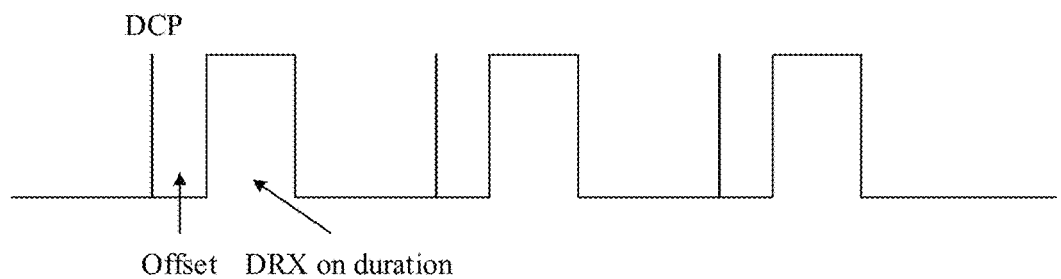
FIG. 2 is a schematic diagram of a time domain position of DCP.

In the 5G technology, power consumption of UE needs to be further reduced. For a current DRX mechanism, the UE needs to monitor and receive a PDCCH in a DRX active time. However, in many cases, the UE cannot actually monitor, in the DRX active time, the PDCCH used for scheduling the UE. In this case, power consumption for monitoring the PDCCH by the UE is wasted. Therefore, it is proposed to introduce an indication signal (PDCCH-WUS) that is also referred to as a wake-up signal. The indication signal can indicate, based on the current DRX mechanism, whether the UE needs to wake up or sleep in a subsequent DRX active time. The PDCCH-WUS is also referred to as DCP in the standard, and a signal form of the DCP may be DCI. A time domain position of the DCP may be a position that is one offset (offset) before "On Duration" in a DRX cycle. For this, refer to FIG. 2. A bold vertical line in FIG. 2 represents the DCP. In a carrier aggregation scenario, a DCP is configured only on a primary carrier, but wake-up or sleep indicated by the DCP may be performed on all carriers participating in carrier aggregation.

It should be noted that in embodiments of this disclosure, when a supplementary uplink (supplementary uplink, SUL) is not considered, the two concepts of "carrier" and "cell" may be considered as a same concept, and the two concepts may be interchanged. For example, a primary carrier may also be referred to as a primary serving cell, or may also be referred to as a primary cell. A secondary carrier may also be referred to as a secondary serving cell, or may also be referred to as a secondary cell.

4. Two Groups of DRX

Figure 3:
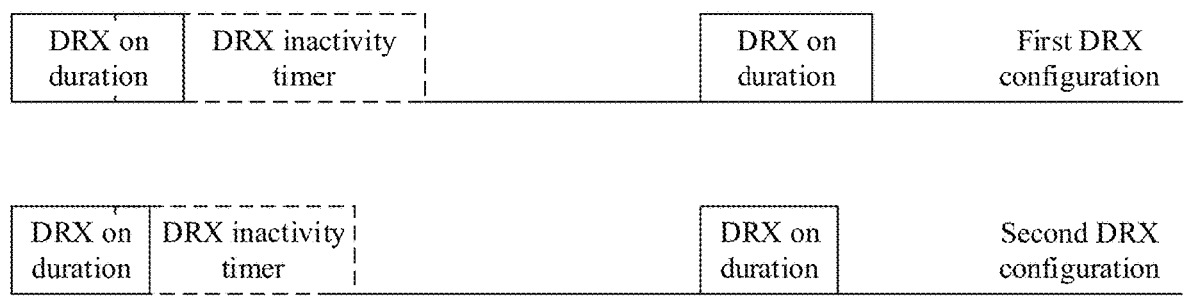
FIG. 3 is a schematic diagram of two DRX configurations.

Currently, UE in an RRC connected mode may support two DRX configurations. All carriers using a first DRX configuration belong to one frequency range (frequency range, FR), for example, FR1, and all carriers using a second DRX configuration belong to another frequency range, for example, FR2. The first DRX configuration may be considered as a primary (primary) configuration, and the second DRX configuration may be considered as a secondary (secondary) configuration. Compared with that in the first DRX configuration, a drx-onDurationTimer with shorter timing duration and a drx-InactivityTimer with shorter timing duration may be configured in the second DRX configuration. For example, refer to FIG. 3. In FIG. 3, a dotted box indicates duration of a DRX inactivity timer. Two DRX configurations may be understood as being maintained and operated separately. Carriers belonging to a first frequency range jointly use the first DRX configuration, to maintain a drx-onDurationTimer 1 and a drx-InactivityTimer 1. Carriers belonging to a second frequency range jointly use the second DRX configuration, to maintain a drx-onDuration-Timer 2 and a drx-InactivityTimer 2. Optionally, parameters, other than the drx-onDurationTimer and the drx-Inactivity-Timer, configured in the first DRX configuration may be the same as corresponding parameters configured in the second DRX configuration. For example, the carriers belonging to the first frequency range jointly use the first DRX configuration to maintain a drx-RetransmissionTimer 1, and the carriers belonging to the first frequency range jointly use the second DRX configuration to maintain a drx-RetransmissionTimer 2. Duration of the drx-RetransmissionTimer 1 and duration of the drx-RetransmissionTimer 2 may be the same.

Currently, the foregoing technologies such as cross-carrier scheduling, wake-up signal, and two DRX configurations are separately used, and these technologies are not combined for use. For example, a combination of the two DRX configurations and the wake-up signal or a combination of the two DRX configurations and the cross-carrier scheduling is not supported currently, and this affects flexibility of a base station configuration. In addition, the two DRX configurations are mainly used to reduce power consumption of the UE on a carrier (for example, FR2) corresponding to the second DRX configuration, and the cross-carrier scheduling or the wake-up signal is helpful for reducing the power consumption of the UE. If the two DRX configurations can be combined with these techniques for use, the power consumption of the UE can be further reduced.

In view of this, the technical solutions in embodiments of this disclosure are provided. In embodiments of this disclosure, the two DRX configuration technologies can be used in combination with the wake-up signal, and behavior of a terminal device in the case of combination is specified. For example, a monitoring status on a DCP monitoring occasion corresponding to a first group of carriers by the terminal device is applicable to the first group of carriers and is also applicable to a second group of carriers. In this way, the terminal device only needs to monitor DCP on the first group of carriers, and does not need to monitor the DCP on the second group of carriers. This reduces power consumption of monitoring the DCP by the terminal device, and also increases scheduling flexibility of a network device. In addition, a monitoring status on one group of carriers by the terminal device can be applied to two groups of carriers, so that both groups of carriers can use a DCP mechanism, and power consumption of the terminal device on the two groups of carriers can be further reduced.

The technical solutions provided in embodiments of this disclosure may be applied to a 4G system, for example, an LTE system, or may be applied to a 5G system, for example, an NR system, or may be applied to a next-generation mobile communication system or another similar communication system. This is not specifically limited. For example, when a terminal device (for example, a smartphone, a smart watch, or a smart band) has an energy-saving requirement, for example, if a battery level of a mobile phone is already lower than 20%, the mobile phone has a very strong requirement for power consumption reduction. In this case, after a method according to embodiments of this disclosure is used, power consumption of the terminal device can be further reduced, that is, consumed battery power is reduced, and a standby time of the terminal device is prolonged.

Figure 4:
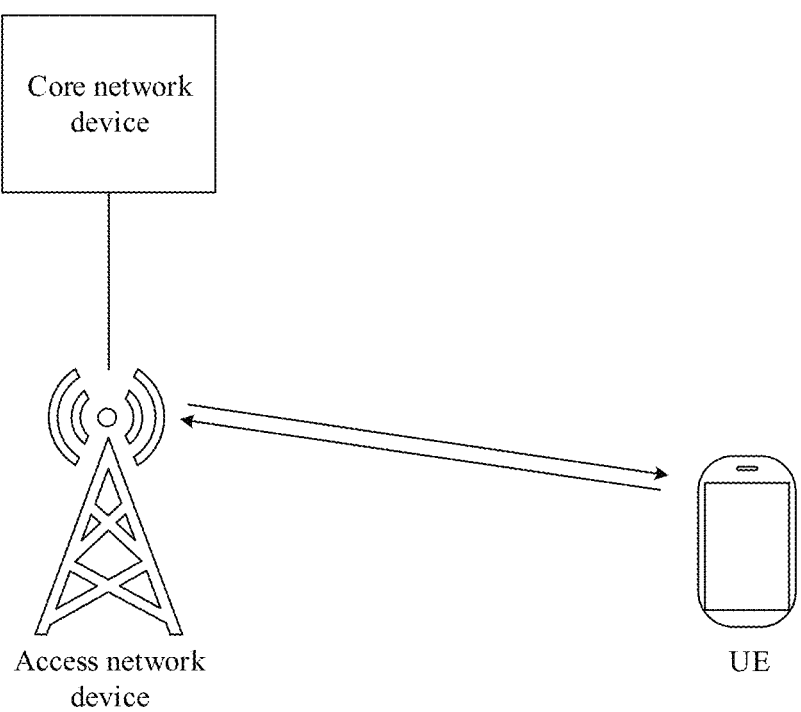
FIG. 4 is a schematic diagram of an application scenario according to an embodiment of this disclosure.

FIG. 4 shows an application scenario according to an embodiment of this disclosure. In FIG. 4, an access network device, a core network device, and UE are included. The access network device may configure one or more carriers for the UE. The access network device works, for example, in an evolved universal mobile telecommunications system terrestrial radio access (E-UTRA) system, or in an NR system, or in a next-generation communication system or another communication system. The access network device is, for example, a base station. The access network device corresponds to different devices in different systems. For example, the access network device may correspond to an eNB in a 4G system, and correspond to an access network device, for example, a gNB, in a 5G system. Certainly, the technical solutions provided in embodiments of this disclosure may also be applied to a future mobile communication system. Therefore, the access network device in FIG. 4 may also correspond to a network device in the future mobile communication system. FIG. 4 shows an example in which the access network device is the base station. Actually, with reference to the foregoing descriptions, the access network device may alternatively be a device such as an RSU. In addition, for example, the UE in FIG. 4 is a mobile phone. Actually, it can be learned from the foregoing description of the UE that the UE in this embodiment of this disclosure is not limited to the mobile phone.

In addition, for ease of description, an example in which each embodiment to be described in the following is applied to an architecture shown in FIG. 4 is used. For example, a network device described in the following embodiments is, for example, the access network device in the network architecture shown in FIG. 4, and UE described in the following embodiments may be the UE in the network architecture shown in FIG. 4.

With reference to the accompanying drawings, the following describes the method provided in embodiments of this disclosure. In the accompanying drawings corresponding to the embodiments of this disclosure, all operations represented by dotted lines are optional operations.

Figure 5:
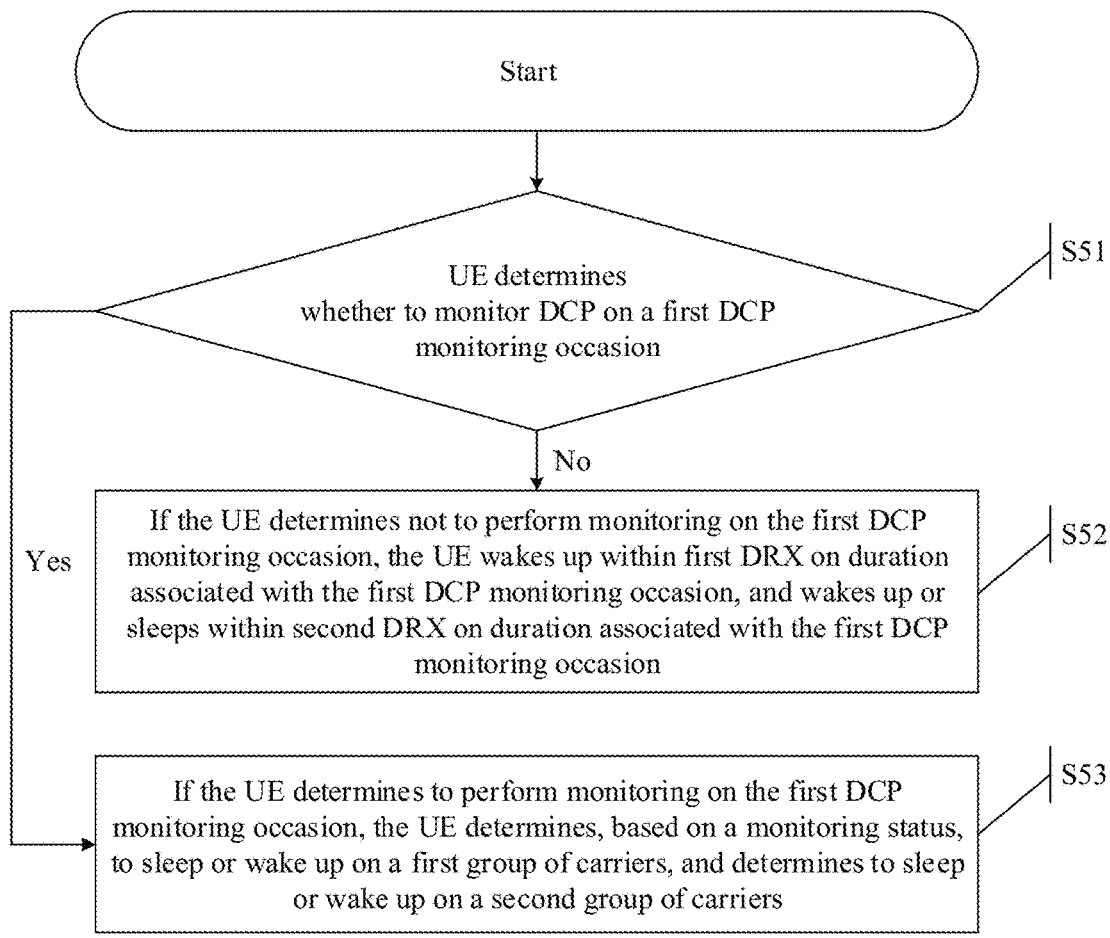
FIG. 5 is a flowchart of a first communication method according to an embodiment of this disclosure.

FIG. 5 is a flowchart of a first communication method according to an embodiment of this disclosure.

S51: UE determines whether to monitor DCP on a first DCP monitoring occasion, or UE determines whether to perform monitoring on the first DCP monitoring occasion.

For example, if a network device sends a first DRX configuration and a second DRX configuration to the UE, it is equivalent that the UE is configured with the first DRX configuration and the second DRX configuration. For example, the network device may send the first DRX configuration and the second DRX configuration to the UE by using one message, or the network device may separately send the first DRX configuration and the second DRX configuration to the UE by using different messages. The first DRX configuration is applied to a first group of carriers, and the second DRX configuration is applied to a second group of carriers. The first group of carriers includes one or more carriers configured for the UE, and the second group of carriers also includes one or more carriers configured for the UE. A DRX cycle, a DRX on duration timer, a DRX inactivity timer, a DRX retransmission timer, and the like may be configured in the first DRX configuration. A DRX cycle, a DRX inactivity timer, a DRX retransmission timer, and the like may also be configured in the second DRX configuration. The first DRX configuration and the second DRX configuration are different DRX configurations. For example, the DRX on duration timer configured in the first DRX configuration is different from the DRX on duration timer configured in the second DRX configuration. For example, duration (or referred to as timing duration) of the DRX on duration timer configured in the first DRX configuration is different from duration of the DRX on duration timer configured in the second DRX configuration. For another example, the DRX inactivity timer configured in the first DRX configuration is different from the DRX inactivity timer configured in the second DRX configuration. For example, duration (or referred to as timing duration) of the DRX inactivity timer configured in the first DRX configuration is different from duration of the DRX inactivity timer configured in the second DRX configuration. Content other than the DRX on duration timer and the DRX inactivity timer, for example, the DRX cycle or the DRX retransmission timer, configured in the first DRX configuration and the second DRX configuration may be the same or different.

For example, the first group of carriers belongs to a first frequency range, the second group of carriers belongs to a second frequency range, and the first frequency range and the second frequency range may be different frequency ranges. In an optional implementation, for example, a frequency in the second frequency range is greater than a frequency in the first frequency range. This may be understood as that a minimum frequency included in the second frequency range is greater than a maximum frequency included in the first frequency range. For example, the first frequency range is FR1, and the second frequency range is FR2. Actually, when the network device configures a carrier for the UE, the network device may not distinguish a group to which the carrier belongs. In other words, concepts of "a first group" and "a second group" may not exist. Herein, a description manner such as "a first group of carriers" and "a second group of carriers" is used to distinguish carriers that use different DRX configurations.

The first DCP monitoring occasion is a DCP monitoring occasion configured on the first group of carriers, and the first DRX configuration is applied to the first DCP monitoring occasion. In the first DRX configuration, if there are a plurality of pieces of On Duration, a DCP monitoring occasion may accordingly occur a plurality of times. For example, a DCP monitoring occasion may occur once before each DRX cycle starts. In this case, the first DCP monitoring occasion is, for example, a current monitoring occasion for the UE. For example, the first DCP monitoring occasion is located before On Duration of one DRX cycle in the first DRX configuration starts, or the first DCP monitoring occasion is located before On Duration of one DRX cycle on the first group of carriers starts. The first DCP monitoring occasion may include one or more DCP monitoring occasions. It may be understood that one DCP monitoring occasion may include one or more DCP monitoring occasions, and the first DCP monitoring occasion is one DCP monitoring occasion.

In an embodiment of this disclosure, the network device may send the DCP on a first carrier, where the first carrier belongs to the first group of carriers. For example, if the network device configures DCP for one or more carriers included in the first group of carriers, the first carrier includes the one or more carriers. For another example, if a primary carrier configured by the network device for the UE belongs to the first group of carriers, the network device may configure the DCP for the primary carrier, and the first carrier is the primary carrier of the UE. The network device may send the DCP on the primary carrier, and does not need to configure the DCP on another carrier, to reduce transmission overheads. If the UE needs to perform monitoring on the first group of carriers, the UE may perform monitoring on all carriers included in the first group of carriers. Alternatively, carriers on which the network device sends the DCP may be preconfigured, and the UE only needs to perform monitoring on these carriers. However, the network device does not configure the DCP for the second group of carriers. Therefore, the network device does not need to send the DCP on the second group of carriers, and the UE does not need to monitor the DCP on the second group of carriers.

The UE needs to determine whether to perform monitoring on the first DCP monitoring occasion. There are a plurality of determining manners, which are described in the following by using examples.

In a first determining manner, it is determined based on a time domain position of the first DCP monitoring occasion.

For example, the UE determines whether the time domain position of the first DCP monitoring occasion is within a first DRX active time. If the time domain position of the first DCP monitoring occasion is within the first DRX active time, it indicates that the UE may have data transmission on the first group of carriers on the first DCP monitoring occasion (for example, the UE needs to receive or send data on the first group of carriers). In this case, the UE may not perform monitoring on the first DCP monitoring occasion, but may wake up on the first group of carriers within DRX on duration associated with the first DCP monitoring occasion.

Alternatively, if all time domain positions corresponding to the first DCP monitoring occasion are not within the first DRX active time, the UE may perform monitoring on the first DCP monitoring occasion. All the time domain positions corresponding to the first DCP monitoring occasion include time domain positions of all DCP monitoring occasions included in the first DCP monitoring occasion. In this case, the UE may perform monitoring on all the DCP monitoring occasions included in the first DCP monitoring occasion.

Alternatively, if some time domain positions corresponding to the first DCP monitoring occasion are not within the first DRX active time, the UE may not perform monitoring on a DCP monitoring occasion that is included in the first DCP monitoring occasion and that is within the first DRX active time. However, on a DCP monitoring occasion that is included in the first DCP monitoring occasion and that is not within the first DRX active time, the UE may still perform monitoring. That is, in this case, the UE does not perform monitoring on some DCP monitoring occasions included in the first DCP monitoring occasion, but performs monitoring on remaining DCP monitoring occasions included in the first DCP monitoring occasion. Therefore, in this case, it may also be considered that the UE performs monitoring on the first DCP monitoring occasion. Some time domain positions corresponding to the first DCP monitoring occasion include time domain positions of some DCP monitoring occasions included in the first DCP monitoring occasion. The first DRX active time is a DRX active time corresponding to the first DRX configuration, and the first DRX active time is located on the first group of carriers.

This determining manner is relatively easy to implement for the UE.

In a second determining manner, it is determined based on a DCI size budget (DCI size budget).

For the UE, there is a DCI size budget. To be specific, a maximum quantity of sizes of DCI that can be monitored by the UE is limited. For example, it is specified that a maximum quantity of sizes of DCI that can be monitored by the UE is 4, so that the UE can monitor DCI of a maximum of four sizes, and if there is DCI of a fifth size, the UE cannot perform monitoring. DCP is considered as a DCI of a size. A total quantity of sizes of DCI that need to be monitored by the UE may be configured by the network device for the UE. In this case, the UE may determine, based on a maximum quantity of sizes of DCI that can be monitored and a quantity of sizes of DCI that need to be monitored by the UE, whether the UE needs to monitor the DCP on the first DCP monitoring occasion.

For example, if the DCP is not considered as DCI that needs to be monitored by the UE, if the maximum quantity of sizes of DCI that can be monitored by the UE is greater than the quantity of sizes of DCI that need to be monitored by the UE, the UE may perform monitoring on the first DCP monitoring occasion. In this case, even if the UE monitors the DCP, requirements of the DCI size budget can still be met. However, if the maximum quantity of sizes of DCI that can be monitored by the UE is less than or equal to the quantity of sizes of DCI that need to be monitored by the UE, the UE may not perform monitoring on the first DCP monitoring occasion. In this case, if the UE monitors the DCP, the DCI size budget is exceeded, and monitoring behavior of the UE may be incorrect. For example, if the maximum quantity of sizes of DCI that can be monitored by the UE is 4, the quantity of sizes of DCI that need to be monitored by the UE is 3, and the DCI that needs to be monitored by the UE does not include the DCP, the UE may monitor the DCP on the first DCP monitoring occasion. Alternatively, if the maximum quantity of sizes of DCI that can be monitored by the UE is 4, and the quantity of sizes of DCI that need to be monitored by the UE is 4, the UE does not monitor the DCP on the first DCP monitoring occasion.

Alternatively, if the DCP is considered as DCI that needs to be monitored by the UE, if the maximum quantity of sizes of DCI that can be monitored by the UE is greater than or equal to the quantity of sizes of DCI that need to be monitored by the UE, the UE may perform monitoring on the first DCP monitoring occasion. However, if the maximum quantity of sizes of DCI that can be monitored by the UE is less than the quantity of sizes of DCI that need to be monitored by the UE, the UE may not perform monitoring on the first DCP monitoring occasion. For example, if the maximum quantity of sizes of DCI that can be monitored by the UE is 4, the quantity of sizes of DCI that need to be monitored by the UE is 4, and the DCI that needs to be monitored by the UE includes the DCP, the UE may monitor the DCP on the first DCP monitoring occasion. Alternatively, if the maximum quantity of sizes of DCI that can be monitored by the UE is 4, the quantity of sizes of DCI that need to be monitored by the UE is 5, and the DCI that needs to be monitored by the UE includes the DCP, the UE does not monitor the DCP on the first DCP monitoring occasion.

The DCI size budget is used to determine whether to monitor the first DCP monitoring occasion, so that monitoring behavior of the UE can meet a requirement of the DCI size budget, and monitoring of the UE is more flexible.

In a third determining manner, it is determined based on a time domain position of the first DCP monitoring occasion and a DCI size budget.

For example, the UE determines a maximum quantity of sizes of DCI that can be monitored by the UE and a quantity of sizes of DCI that need to be monitored by the UE. If the maximum quantity of sizes of DCI that can be monitored by the UE is greater than or equal to the quantity of sizes of DCI that need to be monitored by the UE (where the DCP is considered as DCI that needs to be monitored by the UE), the UE determines whether the time domain position of the first DCP monitoring occasion is within the first DRX active time. If the time domain position of the first DCP monitoring occasion is within the first DRX active time, the UE does not monitor the DCP on the first DCP monitoring occasion, or if the time domain position of the first DCP monitoring occasion is not within or partially within the first DRX active time, the UE monitors the DCP on the first DCP monitoring occasion.

Alternatively, if the maximum quantity of sizes of DCI that can be monitored by the UE is less than the quantity of sizes of DCI that need to be monitored by the UE (where the DCP is considered as DCI that needs to be monitored by the UE), the UE may not need to determine the time domain position of the first DCP monitoring occasion, but may determine that the UE does not monitor the DCP on the first DCP monitoring occasion.

For another example, the UE determines whether the time domain position of the first DCP monitoring occasion is within the first DRX active time. If the time domain position of the first DCP monitoring occasion is not within or partially within the first DRX active time, the UE determines a maximum quantity of sizes of DCI that can be monitored by the UE and a quantity of sizes of DCI that need to be monitored by the UE. If the maximum quantity of sizes of DCI that can be monitored by the UE is greater than or equal to the quantity of sizes of DCI that need to be monitored by the UE (where the DCP is considered as the DCI that needs to be monitored by the UE), the UE monitors the DCP on the first DCP monitoring occasion, or if the maximum quantity of sizes of DCI that can be monitored by the UE is less than the quantity of sizes of DCI that need to be monitored by the UE, the UE does not monitor the DCP on the first DCP monitoring occasion.

Alternatively, if the time domain position of the first DCP monitoring occasion is within the first DRX active time, the UE may not need to determine the maximum quantity of sizes of DCI that can be monitored by the UE and the quantity of sizes of DCI that need to be monitored by the UE, but may determine that the UE does not monitor the DCP on the first DCP monitoring occasion.

The third determining manner is equivalent to a combination of the first determining manner and the second determining manner, so that a determining result can be more reasonable.

Which of the foregoing three manners is used by the UE to determine whether to perform monitoring on the first DCP monitoring occasion may be determined by the UE, or may be configured by the network device, or may be specified in a protocol, or the like.

Optionally, in each embodiment of this disclosure, the UE may not have a process of determining whether monitoring needs to be performed on a DCP monitoring occasion. For example, for the embodiment shown in FIG. 5, the UE may not perform S51. For example, when the time domain position of the first DCP monitoring occasion is within the first DRX active time, the UE does not perform monitoring on the first DCP monitoring occasion; or when all time domain positions corresponding to the first DCP monitoring occasion are not within the first DRX active time, the UE performs monitoring on the first DCP monitoring occasion; or when some time domain positions corresponding to the first DCP monitoring occasion are not within the first DRX active time, the UE does not perform monitoring on a DCP monitoring occasion that is included in the first DCP monitoring occasion and that is within the first DRX active time. However, monitoring is performed on a DCP monitoring occasion that is included in the first DCP monitoring occasion and that is not within the first DRX active time. For another example, when the maximum quantity of sizes of DCI that can be monitored by the UE is greater than the quantity of sizes of DCI that need to be monitored by the UE, the UE performs monitoring on the first DCP monitoring occasion. However, when the maximum quantity of sizes of DCI that can be monitored by the UE is less than or equal to the quantity of sizes of DCI that need to be monitored by the UE, the UE does not perform monitoring on the first DCP monitoring occasion. For ease of understanding, an example in which the UE has a determining process is used in each embodiment of this disclosure.

Optionally, according to the foregoing first determining manner, S51 may be replaced with: The UE determines whether the time domain position of the first DCP monitoring occasion is within the first DRX active time.

Alternatively, according to the foregoing second determining manner, S51 may be replaced with: The UE determines whether the maximum quantity of sizes of DCI that can be monitored by the UE is greater than the quantity of sizes of DCI that need to be monitored by the UE.

Alternatively, S51 may be correspondingly replaced according to the foregoing third determining manner.

S52: If the UE determines not to perform monitoring on the first DCP monitoring occasion, the UE wakes up within first DRX on duration associated with the first DCP monitoring occasion, and wakes up or sleeps within second DRX on duration associated with the first DCP monitoring occasion. In other words, if the UE does not perform monitoring on the first DCP monitoring occasion, on the first group of carriers, the UE wakes up within the first DRX on duration associated with the first DCP monitoring occasion, and on the second group of carriers, the UE wakes up or sleeps within the second DRX on duration associated with the first DCP monitoring occasion.

Optionally, if S51 is replaced according to the foregoing first determining manner, S52 may accordingly be replaced with: If the time domain position of the first DCP monitoring occasion is within the first DRX active time, the UE wakes up within the first DRX on duration associated with the first DCP monitoring occasion, and wakes up or sleeps within the second DRX on duration associated with the first DCP monitoring occasion.

Alternatively, if S51 is replaced according to the foregoing second determining manner, S52 may accordingly be replaced with: If the maximum quantity of sizes of DCI that can be monitored by the UE is less than or equal to the quantity of sizes of DCI that the UE needs to monitor, the UE wakes up within the first DRX on duration associated with the first DCP monitoring occasion, and wakes up or sleeps within the second DRX on duration associated with the first DCP monitoring occasion.

Alternatively, if S51 is replaced according to the foregoing third determining manner, S52 may accordingly be replaced.

On the first group of carriers, according to the first DRX configuration, the first DCP monitoring occasion may be associated with one or more DRX cycles. The DRX cycle associated with the first DCP monitoring occasion is later than the first DCP monitoring occasion in time domain. In addition, if the first DCP monitoring occasion is associated with a plurality of DRX cycles, the plurality of DRX cycles may be consecutive or inconsecutive in time domain. In addition, the first DRX on duration corresponds to the first DRX configuration, and the first DRX on duration is located on the first group of carriers. For example, the first DRX on duration may include On Duration in all or some DRX cycles associated with the first DCP monitoring occasion in the first DRX configuration, or the first DRX on duration may include On Duration in all or some DRX cycles associated with the first DCP monitoring occasion on the first group of carriers. If the UE determines not to perform monitoring on the first DCP monitoring occasion, the UE does not perform monitoring on the first DCP monitoring occasion. In this case, to reduce a probability that the UE misses a PDCCH that may be sent by the network device on the first group of carriers, the UE may wake up within the first DRX on duration.

On the second group of carriers, according to the second DRX configuration, the first DCP monitoring occasion may also be associated with one or more DRX cycles. Because the first DCP monitoring occasion is not configured on the second group of carriers, the association is an association in terms of a time domain position. For example, on the second group of carriers, one or more DRX cycles that are later than the first DCP monitoring occasion in time domain may be associated with the first DCP monitoring occasion. In addition, if the first DCP monitoring occasion is associated with a plurality of DRX cycles, the plurality of DRX cycles may be consecutive or inconsecutive in time domain. In addition, the second DRX on duration corresponds to the second DRX configuration, and the second DRX on duration is located on the second group of carriers. The second DRX on duration may include On Duration in all or some DRX cycles associated with the first DCP monitoring occasion in the second DRX configuration, or the second DRX on duration may include On Duration in all or some DRX cycles associated with the first DCP monitoring occasion on the second group of carriers. For example, by default (or specified in a protocol), if the UE determines not to perform monitoring on the first DCP monitoring occasion, the UE may sleep within the second DRX on duration associated with the first DCP monitoring occasion, to reduce power consumption of the UE. Alternatively, by default (or specified in a protocol), if the UE determines not to perform monitoring on the first DCP monitoring occasion, the UE may wake up within the second DRX on duration associated with the first DCP monitoring occasion, to reduce a probability that the UE misses data that may be sent by the network device on the second group of carriers. In this case, behavior of the UE on the second group of carriers is default or specified in a protocol, does not need to be additionally configured by the network device, and does not need to be determined by the UE in another manner, so that implementation of the network device and the UE can be simplified.

Alternatively, that the UE sleeps or wakes up within the second DRX on duration may be indicated by the network device. For example, the network device sends configuration information to the UE. Correspondingly, the UE receives the configuration information from the network device. For example, the configuration information may be sent by using an RRC message, a system message, or another message. The configuration information may be sent on one or more carriers included in the first group of carriers. For example, a primary carrier configured by the network device for the UE belongs to the first group of carriers, and the configuration information may be sent on the primary carrier. Alternatively, the configuration information may be sent on one or more carriers included in the second group of carriers. The configuration information may be configured as follows: When the UE does not perform monitoring on a DCP monitoring occasion, the UE wakes up on the second group of carriers within DRX on duration associated with the DCP monitoring occasion. Alternatively, the configuration information may be configured as follows: When the UE does not perform monitoring on a DCP monitoring occasion, the UE sleeps on the second group of carriers within DRX on duration associated with the DCP monitoring occasion. In this case, the network device may configure, based on a factor such as data transmission and by using the configuration information, the UE to sleep or wake up on the second group of carriers. For example, if the network device schedules, on the second group of carriers, the UE to send data or receive data in a DRX cycle associated with the first DCP monitoring occasion, the network device may indicate the UE to wake up by using the configuration information. If the network device does not schedule, on the second group of carriers, the UE to send data or receive data in a DRX cycle associated with the first DCP monitoring occasion, the network device may indicate the UE to sleep by using the configuration information. In this way, sleep or wake-up of the UE can meet a data transmission requirement.

S53: If the UE determines to perform monitoring on the first DCP monitoring occasion, based on a monitoring status, the UE determines to sleep or wake up on the first group of carriers, and determines to sleep or wake up on the second group of carriers.

Optionally, if S51 is replaced according to the foregoing first determining manner, S53 may accordingly be replaced with: If all or some time domain locations corresponding to the first DCP monitoring occasion are not within the first DRX active time, the UE monitors the DCP on the first DCP monitoring occasion, and based on a monitoring status, determines to sleep or wake up on the first group of carriers and determines to sleep or wake up on the second group of carriers.

Alternatively, if S51 is replaced according to the foregoing second determining manner, S53 may accordingly be replaced with: If the maximum quantity of sizes of DCI that can be monitored by the UE is greater than the quantity of sizes of DCI that needs to be monitored by the UE, the UE monitors the DCP on the first DCP monitoring occasion, and based on a monitoring status, determines to sleep or wake up on the first group of carriers and determines to sleep or wake up on the second group of carriers.

Alternatively, if S51 is replaced according to the foregoing third determining manner, S53 may accordingly be replaced.

Figure 6:
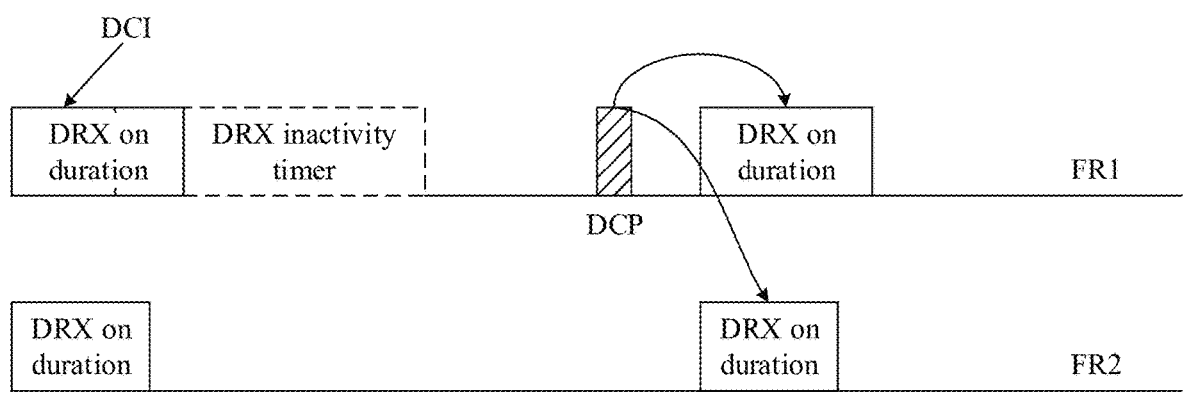
FIG. 6 is a schematic diagram in which behavior of UE on two groups of carriers can be determined by using a monitoring result of the UE on a first DCP monitoring occasion according to an embodiment of this disclosure.

If the UE needs to perform monitoring on the first DCP monitoring occasion, the UE performs monitoring on the first DCP monitoring occasion, and determines, based on a monitoring status of the DCP on the first DCP monitoring occasion, to sleep or wake up on the first group of carriers and the second group of carriers. That is, the monitoring status on the first DCP monitoring occasion by the UE can determine behavior of the UE on the first group of carriers and behavior of the UE on the second group of carriers. For example, refer to FIG. 6. A rectangular box marked with slashes in FIG. 6 represents the first DCP monitoring occasion, no DCP monitoring occasion is configured on FR2, and the monitoring status on the first DCP monitoring occasion by the UE can determine behavior of the UE on the first group of carriers and behavior of the UE on the second group of carriers.

In an embodiment, if the network device sends the DCP, it indicates that the UE wakes up in a DRX cycle associated with the DCP; or if the network device does not send the DCP, it indicates that the UE sleeps in a DRX cycle associated with the DCP. For the UE, if the DCP is monitored and received, the UE wakes up in the DRX cycle associated with the DCP; or if the DCP is not detected, the UE sleeps in the DRX cycle associated with the DCP. If the DCP is implemented in this manner, and if the UE receives the DCP from the network device on the first DCP monitoring occasion, the UE wakes up on the first group of carriers within the first DRX on duration associated with the first DCP monitoring occasion, and the UE wakes up on the second group of carriers within the second DRX on duration associated with the first DCP monitoring occasion. However, if the UE does not receive the DCP from the network device on the first DCP monitoring occasion, the UE sleeps on the first group of carriers within the first DRX on duration associated with the first DCP monitoring occasion, and the UE sleeps on the second group of carriers within the second DRX on duration associated with the first DCP monitoring occasion.

In an embodiment, the DCP includes indication information. If the network device sends the DCP, and the indication information included in the DCP indicates wake-up, it indicates that the UE wakes up in a DRX cycle associated with the DCP. If the network device sends the DCP, and the indication information included in the DCP indicates sleep, it indicates that the UE sleeps in a DRX cycle associated with the DCP. For the UE, if the DCP is monitored and received, and the indication information included in the DCP indicates wake-up, the UE wakes up in the DRX cycle associated with the DCP; or if the DCP is monitored and received, and the indication information included in the DCP indicates sleep, the UE sleeps in the DRX cycle associated with the DCP. If the DCP is implemented in this manner, and if the UE receives the DCP from the network device on the first DCP monitoring occasion, and the indication information included in the DCP indicates wake-up, the UE wakes up on the first group of carriers within the first DRX on duration associated with the first DCP monitoring occasion, and the UE wakes up on the second group of carriers within the second DRX on duration associated with the first DCP monitoring occasion. If the UE receives the DCP from the network device on the first DCP monitoring occasion, and the indication information included in the DCP indicates sleep, the UE sleeps on the first group of carriers within the first DRX on duration associated with the first DCP monitoring occasion, and the UE sleeps on the second group of carriers within the second DRX on duration associated with the first DCP monitoring occasion.

In an embodiment, the DCP includes first indication information and second indication information, the first indication information corresponds to the first group of carriers, or corresponds to the first DRX configuration, and the second indication information corresponds to the second group of carriers, or corresponds to the second DRX configuration. If the network device sends the DCP, and the first indication information included in the DCP indicates wake-up, it indicates that the UE wakes up in a DRX cycle in the first DRX configuration associated with the DCP. If the network device sends the DCP, and the first indication information included in the DCP indicates sleep, it indicates that the UE sleeps in a DRX cycle in the first DRX configuration associated with the DCP. An indication manner of the second indication information is also similar. For the UE, if the DCP is monitored and received, and the first indication information included in the DCP indicates wake-up, the UE wakes up in the DRX cycle in the first DRX configuration associated with the DCP. If the DCP is monitored and received, and the first indication information included in the DCP indicates sleep, the UE sleeps in the DRX cycle in the first DRX configuration associated with the DCP. A manner in which the UE understands the second indication information is also similar. If the DCP is implemented in this manner, and if the UE receives the DCP from the network device on the first DCP monitoring occasion, and the first indication information included in the DCP indicates wake-up, the UE wakes up on the first group of carriers within the first DRX on duration associated with the first DCP monitoring occasion. If the UE receives the DCP from the network device on the first DCP monitoring occasion, and the first indication information included in the DCP indicates sleep, the UE sleeps on the first group of carriers within the first DRX on duration associated with the first DCP monitoring occasion. Similarly, if the UE receives the DCP from the network device on the first DCP monitoring occasion, and the second indication information included in the DCP indicates wake-up, the UE wakes up on the second group of carriers within the second DRX on duration associated with the first DCP monitoring occasion. If the UE receives the DCP from the network device on the first DCP monitoring occasion, and the second indication information included in the DCP indicates sleep, the UE sleeps on the second group of carriers within the second DRX on duration associated with the first DCP monitoring occasion. In this manner, the DCP may separately indicate sleep or wake-up within different DRX on duration by using different indication information. For example, the network device may determine, based on information transmission statuses on two groups of carriers, corresponding indication information to indicate wake-up or sleep, so that sleep or wake-up behavior of the UE better meets a service transmission requirement.

In an embodiment, two groups of carriers respectively have corresponding DCP. For example, the DCP may include identifiers of carrier groups, to distinguish DCP of different carrier groups, or DCP of different carrier groups have different formats. For a group of carriers, if the network device sends DCP corresponding to the group of carriers, and the DCP indicates wake-up, it indicates that the UE wakes up on the group of carriers in a DRX cycle associated with the DCP; or if the network device sends DCP corresponding to the group of carriers, and the DCP indicates sleep, it indicates that the UE sleeps on the group of carriers in a DRX cycle associated with the DCP. If the DCP is implemented in this manner, if the UE receives the DCP from the network device on the first DCP monitoring occasion, and the DCP corresponds to the first group of carriers, and if the DCP indicates wake-up, the UE wakes up on the first group of carriers within the first DRX on duration associated with the first DCP monitoring occasion, or if the DCP indicates sleep, the UE sleeps on the first group of carriers within the first DRX on duration associated with the first DCP monitoring occasion. For the second group of carriers, operation processes of the network device and the UE are the same.

In an embodiment, two groups of carriers respectively have corresponding DCP. For example, the DCP may include identifiers of carrier groups, to distinguish DCP of different carrier groups, or DCP of different carrier groups have different formats. For a group of carriers, if the network device sends DCP corresponding to the group of carriers, it indicates that the UE wakes up on the group of carriers within a DRX cycle associated with the DCP. If the network device does not send DCP corresponding to the group of carriers, it indicates that the UE sleeps on the carrier group in a DRX cycle associated with the DCP. If the DCP is implemented in this manner, and if the UE receives the DCP from the network device on the first DCP monitoring occasion, and the DCP corresponds to the first group of carriers, the UE wakes up on the first group of carriers within the first DRX on duration associated with the first DCP monitoring occasion, or if the UE does not receive the DCP from the network device on the first DCP monitoring occasion, and the DCP corresponds to the first group of carriers, the UE sleeps on the first group of carriers within the first DRX on duration associated with the first DCP monitoring occasion. For the second group of carriers, operation processes of the network device and the UE are the same.

In an embodiment of this disclosure, that the UE sleeps within the first DRX on duration may be implemented in the following manner: The UE neither starts nor restarts a first DRX on duration timer at a start moment of the first DRX on duration. The first DRX on duration timer is configured in the first DRX configuration, and the first DRX on duration timer corresponds to the first group of carriers. If the first DRX on duration timer is not started, the UE does not start the first DRX on duration timer at the start moment of the first DRX on duration, or if the first DRX on duration timer is in a running state, the UE does not restart the first DRX on duration timer at the start moment of the first DRX on duration. In this way, the UE can sleep within the first DRX on duration. An implementation in which the UE sleeps in the second DRX on duration is also similar, for example, is implemented in the following manner: The UE neither starts nor restarts a second DRX on duration timer at a start moment of the second DRX on duration. The second DRX on duration timer is configured in the second DRX configuration, and the second DRX on duration timer corresponds to the second group of carriers.

That the UE wakes up within the first DRX on duration may be implemented in the following manner: The UE starts or restarts the first DRX on duration timer at the start moment of the first DRX on duration. If the first DRX on duration timer is not started, the UE starts the first DRX on duration timer at the start moment of the first DRX on duration, or if the first DRX on duration timer is in a running state, the UE restarts the first DRX on duration timer at the start moment of the first DRX on duration. In this way, the UE may wake up within the first DRX on duration. An implementation in which the UE wakes up within the second DRX on duration is also similar, for example, is implemented in the following manner: The UE starts or restarts the second DRX on duration timer at the start moment of the second DRX on duration. The second DRX on duration timer is configured in the second DRX configuration, and the second DRX on duration timer corresponds to the second group of carriers.

S52 and S53 are two parallel solutions, and the two solutions are not performed simultaneously.

In an embodiment of this disclosure, two DRX configuration technologies can be used in combination with a wake-up signal, and behavior of the terminal device in the case of combination is specified. For example, when the terminal device does not perform monitoring on a DCP monitoring occasion corresponding to the first group of carriers, behavior of the terminal device on the second group of carriers may be specified by default, in a protocol specification, in a network configuration, or the like. When the terminal device performs monitoring on the DCP monitoring occasion corresponding to the first group of carriers, a monitoring status on the DCP monitoring occasion corresponding to the first group of carriers by the terminal device is applicable to both the first group of carriers and the second group of carriers. In this way, the terminal device only needs to monitor the DCP on the first group of carriers, and does not need to monitor the DCP on the second group of carriers. This reduces power consumption of monitoring the DCP by the terminal device, and also increases scheduling flexibility of the network device. A monitoring status on one group of carriers by the terminal device can be applied to two groups of carriers, so that both groups of carriers can use the DCP mechanism, and power consumption of the terminal device on the two groups of carriers can be further reduced. In addition, the network device does not need to configure DCP for the second group of carriers, so that signaling overheads can also be reduced.

Figure 8:
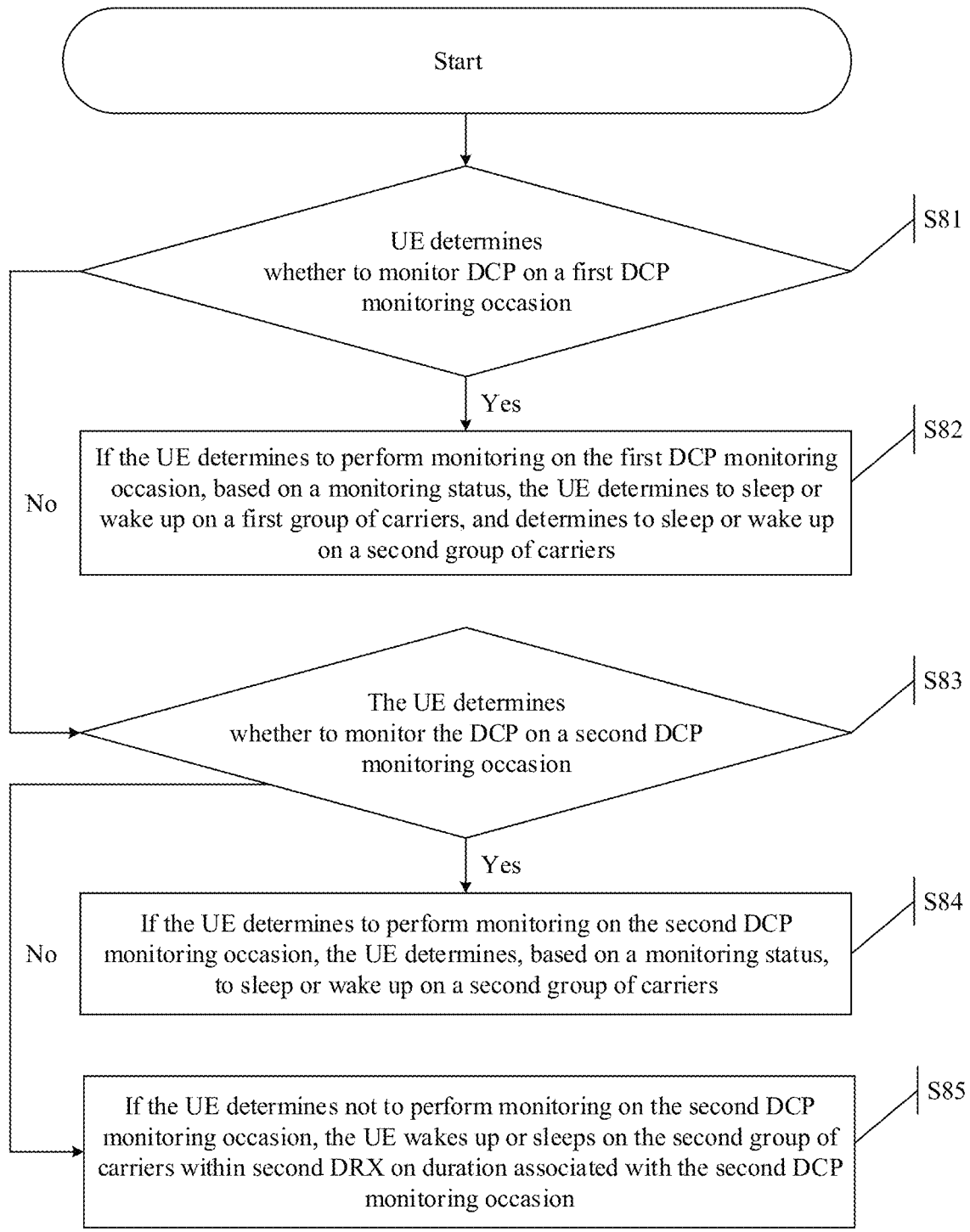
FIG. 8 is a flowchart of a second communication method according to an embodiment of this disclosure.

FIG. 8 is a flowchart of a second communication method according to an embodiment of this disclosure.

S81: UE determines whether to monitor DCP on a first DCP monitoring occasion, or UE determines whether to perform monitoring on a first DCP monitoring occasion.

Optionally, S81 may also be replaced with: The UE determines whether a time domain position of the first DCP monitoring occasion is within a first DRX active time.

Alternatively, S81 may also be replaced with: The UE determines whether a maximum quantity of sizes of DCI that can be monitored by the UE is greater than a quantity of sizes of DCI that need to be monitored by the UE. Alternatively, S81 may be correspondingly replaced according to the third determining manner described in the embodiment shown in FIG. 5.

For more content of S81, for example, how the UE determines whether to perform monitoring on the first DCP monitoring occasion, refer to S51 in the embodiment shown in FIG. 5.

S82: If the UE determines to perform monitoring on the first DCP monitoring occasion, the UE determines, based on a monitoring status, to sleep or wake up on a first group of carriers, and determines to sleep or wake up on a second group of carriers.

Alternatively, if S81 is replaced with that the UE determines whether the time domain position of the first DCP monitoring occasion is within the first DRX active time, S82 may be replaced with: If all or some time domain positions corresponding to the first DCP monitoring occasion are not within the first DRX active time, the UE monitors the DCP on the first DCP monitoring occasion, and based on a monitoring status, determines to sleep or wake up on the first group of carriers and determines to sleep or wake up on the second group of carriers.

Alternatively, if S81 is replaced with that the UE determines whether the maximum quantity of sizes of DCI that can be monitored by the UE is greater than the quantity of sizes of DCI that need to be monitored by the UE, S82 may be replaced with: If the maximum quantity of sizes of DCI that can be monitored by the UE is greater than the quantity of sizes of DCI that need to be monitored by the UE, the UE monitors the DCP on the first DCP monitoring occasion, and based on the monitoring status, determines to sleep or wake up on the first group of carriers and determines to sleep or wake up on the second group of carriers.

Alternatively, if corresponding replacement is performed on S81 according to the third determining manner described in the embodiment shown in FIG. 5, corresponding replacement may also be performed on S82 according to S81.

In an embodiment of this disclosure, the network device may send the DCP on a first carrier, where the first carrier belongs to the first group of carriers. For example, if the network device configures DCP for one or more carriers included in the first group of carriers, the first carrier includes the one or more carriers. For another example, if a primary carrier configured by the network device for the UE belongs to the first group of carriers, the network device may configure the DCP for the primary carrier, and the first carrier is the primary carrier of the UE. The network device may send the DCP on the primary carrier, and does not need to configure the DCP on another carrier, to reduce transmission overheads. If the UE needs to perform monitoring on the first group of carriers, the UE may perform monitoring on all carriers included in the first group of carriers. Alternatively, carriers on which the network device sends the DCP may be preconfigured, and the UE only needs to perform monitoring on these carriers.

The network device may send the DCP on the second carrier, where the second carrier belongs to the second group of carriers. For example, if the network device configures DCP for one or more carriers included in the second group of carriers, the second carrier includes the one or more carriers. If the UE needs to perform monitoring on the second group of carriers, the UE may perform monitoring on all carriers included in the second group of carriers. Alternatively, carriers on which the network device sends the DCP may be preconfigured, and the UE only needs to perform monitoring on these carriers. In other words, in this embodiment of this disclosure, the network device configures the DCP for the first group of carriers, and also configures the DCP for the second group of carriers.

Although DCPs are configured for both the first group of carriers and the second group of carriers, the UE first determines whether to perform monitoring on the first group of carriers. If monitoring can be performed on the first group of carriers, the UE performs monitoring on the first group of carriers, for example, performs monitoring on the first DCP monitoring occasion, and determines to sleep or wake up on the first group of carriers and the second group of carriers according to a monitoring result. In this case, the UE does not need to perform monitoring on the second group of carriers. For example, the UE does not perform monitoring on the second DCP monitoring occasion. The second DCP monitoring occasion is a DCP monitoring occasion configured on the second group of carriers, and the second DRX configuration is applied to the second DCP monitoring occasion. In the second DRX configuration, if there are a plurality of pieces of On Duration, a DCP monitoring occasion may also occur a plurality of times. For example, a DCP monitoring occasion may occur once before each DRX cycle starts. In this case, the second DCP monitoring occasion is, for example, a current monitoring occasion for the UE. For example, the second DCP monitoring occasion is located before On Duration of one DRX cycle in the second DRX configuration starts, or the second DCP monitoring occasion is located before On Duration of one DRX cycle on the second group of carriers starts. When the UE can perform monitoring on the first group of carriers, because the UE does not need to perform monitoring on the second group of carriers, power consumption of the UE caused by monitoring can be reduced.

For more content of S82, for example, how the UE determines to sleep or wake up on the first group of carriers and the second group of carriers according to a monitoring status, refer to S53 in the embodiment shown in FIG. 5.

It should be noted that, for descriptions of content such as the first DRX on duration associated with the first DCP monitoring occasion, refer to S52 in the embodiment shown in FIG. 5. In addition, the time domain position of the first DCP monitoring occasion and the time domain position of the second DCP monitoring occasion may be the same, or the time domain position of the first DCP monitoring occasion may be earlier than the time domain position of the second DCP monitoring occasion. Therefore, refer to S52, in this embodiment of this disclosure, the second DRX on duration associated with the first DCP monitoring occasion in S52 may alternatively be considered as DRX on duration associated with the second DCP monitoring occasion on the second group of carriers.

S83: If the UE determines not to perform monitoring on the first DCP monitoring occasion, the UE determines whether to monitor the DCP on the second DCP monitoring occasion, or determines whether to perform monitoring on the second DCP monitoring occasion.

Alternatively, if S81 is replaced with that the UE determines whether the time domain position of the first DCP monitoring occasion is within the first DRX active time, S83 may be replaced with: If the time domain position of the first DCP monitoring occasion is within the first DRX active time, the UE determines whether to monitor the DCP on the second DCP monitoring occasion, or the UE determines whether to perform monitoring on the second DCP monitoring occasion.

Alternatively, if S81 is replaced with that the UE determines whether the maximum quantity of sizes of DCI that can be monitored by the UE is greater than the quantity of sizes of DCI that need to be monitored by the UE, S83 may be replaced with: If the maximum quantity of sizes of DCI that can be monitored by the UE is less than or equal to the quantity of sizes of DCI that need to be monitored by the UE, the UE determines whether to monitor the DCP on the second DCP monitoring occasion, or determines whether to perform monitoring on the second DCP monitoring occasion.

Alternatively, if corresponding replacement is performed on S81 according to the third determining manner described in the embodiment shown in FIG. 5, corresponding replacement may also be performed on S83 according to S81.

In addition, that the UE determines whether to perform monitoring on the second DCP monitoring occasion in S83 may also be correspondingly replaced. For a specific replacement manner, refer to the description of the replacement manner in S81.

A manner in which the UE determines whether to perform monitoring on the second DCP monitoring occasion is similar to the manner in which the UE determines whether to perform monitoring on the first DCP monitoring occasion. For details, refer to the foregoing description in this embodiment of this disclosure, or refer to S51 in the embodiment shown in FIG. 5.

In addition, if the UE does not perform monitoring on the first DCP monitoring occasion, optionally, the UE may wake up on the first group of carriers within the first DRX on duration, to avoid missing a PDCCH.

S84: If the UE determines to perform monitoring on the second DCP monitoring occasion, the UE determines, based on a monitoring status, to sleep or wake up on the second group of carriers. That the UE determines whether to perform monitoring on the second DCP monitoring occasion in S84 may also be correspondingly replaced. For a specific replacement manner, refer to the description of the replacement manner in S82.

Figure 9:
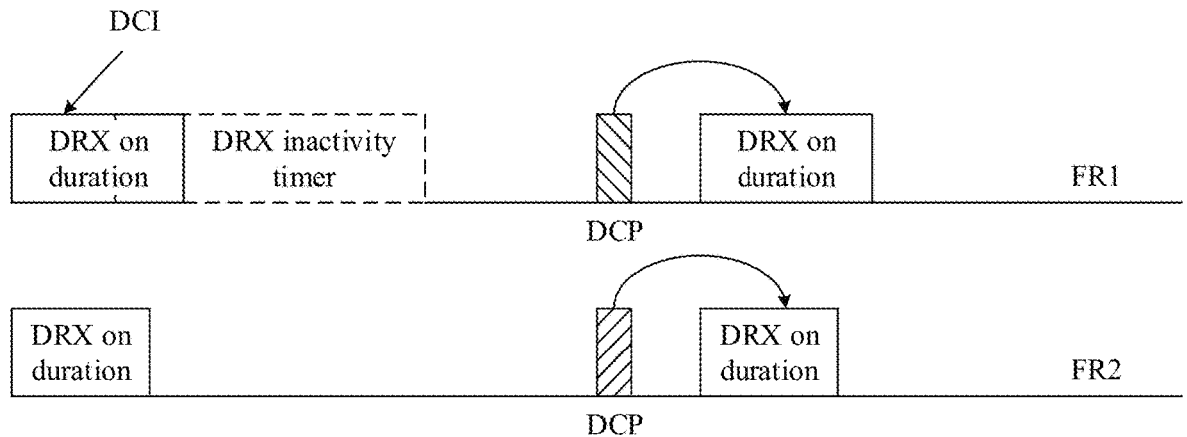
FIG. 9 is a schematic diagram in which behavior of UE on a first group of carriers can be determined by using a monitoring result of the UE on a first DCP monitoring occasion, and behavior of the UE on a second group of carriers can be determined by using a monitoring result of the UE on a second DCP monitoring occasion according to an embodiment of this disclosure.

If the UE determines to perform monitoring on the second DCP monitoring occasion, the UE may perform monitoring on the second DCP monitoring occasion. In this case, a monitoring result on the second DCP monitoring occasion may be used to determine whether the UE sleeps or wakes up on the second group of carriers. For example, refer to FIG. 9, a rectangular box drawn with "\" in FIG. 9 indicates the first DCP monitoring occasion, and a rectangular box drawn with "/" indicates the second DCP monitoring occasion. If the UE can perform monitoring on the first DCP monitoring occasion, the UE may determine, based on a monitoring status on the first DCP monitoring occasion, to sleep or wake up on the first group of carriers, and may determine to sleep or wake up on the second group of carriers. If the UE cannot perform monitoring on the first DCP monitoring occasion, but can perform monitoring on the second DCP monitoring occasion, the UE may determine, based on a monitoring status on the second DCP monitoring occasion, to sleep or wake up on the second group of carriers.

In an embodiment, if the network device sends the DCP, it indicates that the UE wakes up in a DRX cycle associated with the DCP; or if the network device does not send the DCP, it indicates that the UE sleeps in a DRX cycle associated with the DCP. If the UE monitors and receives the DCP, the UE wakes up in the DRX cycle associated with the DCP. If the UE does not monitor and detect the DCP, the UE sleeps in the DRX cycle associated with the DCP. If the DCP is implemented in this manner, and if the UE receives the DCP from the network device on the second DCP monitoring occasion, the UE wakes up on the second group of carriers within the second DRX on duration associated with the second DCP monitoring occasion. However, if the UE does not receive the DCP from the network device on the second DCP monitoring occasion, the UE sleeps on the second group of carriers within the second DRX on duration associated with the second DCP monitoring occasion.

In an embodiment, the DCP includes indication information. If the network device sends the DCP, and the indication information included in the DCP indicates wake-up, it indicates that the UE wakes up in a DRX cycle associated with the DCP. If the network device sends the DCP, and the indication information included in the DCP indicates sleep, it indicates that the UE sleeps in a DRX cycle associated with the DCP. For the UE, if the DCP is monitored and received, and the indication information included in the DCP indicates wake-up, the UE wakes up in the DRX cycle associated with the DCP; or if the DCP is monitored and received, and the indication information included in the DCP indicates sleep, the UE sleeps in the DRX cycle associated with the DCP. If the DCP is implemented in this manner, if the UE receives the DCP from the network device on the second DCP monitoring occasion, and the indication information included in the DCP indicates wake-up, the UE wakes up on the second group of carriers within the second DRX on duration associated with the second DCP monitoring occasion. If the UE receives the DCP from the network device on the second DCP monitoring occasion, and the DCP indicates sleep, the UE sleeps on the second group of carriers within the second DRX on duration associated with the second DCP monitoring occasion.

In the foregoing two implementations, a monitoring result on the second DCP monitoring occasion is not used to determine whether the UE sleeps or wakes up on the first group of carriers.

In an embodiment, the DCP includes third indication information and fourth indication information, the third indication information corresponds to the first group of carriers, or corresponds to the first DRX configuration, and the fourth indication information corresponds to the second group of carriers, or corresponds to the second DRX configuration. If the network device sends the DCP, and the third indication information included in the DCP indicates wake-up, it indicates that the UE wakes up in a DRX cycle in the first DRX configuration associated with the DCP. If the network device sends the DCP, and the third indication information included in the DCP indicates sleep, it indicates that the UE sleeps in a DRX cycle in the first DRX configuration associated with the DCP. An indication manner of the fourth indication information is also similar. For the UE, if the DCP is monitored and received, and the third indication information included in the DCP indicates wake-up, the UE wakes up in the DRX cycle in the first DRX configuration associated with the DCP. If the DCP is monitored and received, and the third indication information included in the DCP indicates sleep, the UE sleeps in the DRX cycle in the first DRX configuration associated with the DCP. A manner in which the UE understands the fourth indication information is also similar. If the DCP is implemented in this manner, a monitoring result on the second DCP monitoring occasion may be used to determine whether the UE sleeps or wakes up on the second group of carriers, or may be used to determine whether the UE sleeps or wakes up on the first group of carriers. For example, if the UE receives the DCP from the network device on the second DCP monitoring occasion, and the third indication information included in the DCP indicates wake-up, the UE wakes up on the first group of carriers within the first DRX on duration associated with the first DCP monitoring occasion (or the second DCP monitoring occasion). If the UE receives the DCP from the network device on the second DCP monitoring occasion, and the third indication information included in the DCP indicates sleep, the UE sleeps on the first group of carriers within the first DRX on duration associated with the first DCP monitoring occasion (or the second DCP monitoring occasion). Similarly, if the UE receives the DCP from the network device on the second DCP monitoring occasion, and the fourth indication information included in the DCP indicates wake-up, the UE wakes up on the second group of carriers within the second DRX on duration associated with the second DCP monitoring occasion. If the UE receives the DCP from the network device on the second DCP monitoring occasion, and the fourth indication information included in the DCP indicates sleep, the UE sleeps on the second group of carriers within the second DRX on duration associated with the second DCP monitoring occasion.

In this manner, the DCP may separately indicate sleep or wake-up within different DRX on duration by using different indication information. For example, the network device may determine, based on information transmission statuses on two groups of carriers, corresponding indication information to indicate wake-up or sleep, so that sleep or wake-up behavior of the UE better meets a service transmission requirement.

In an embodiment, two groups of carriers respectively have corresponding DCPs. For example, the DCP may include identifiers of carrier groups, to distinguish DCPs of different carrier groups, or DCPs of different carrier groups have different formats. For a group of carriers, if the network device sends DCP corresponding to the group of carriers, and the DCP indicates wake-up, it indicates that the UE wakes up on the group of carriers in the DRX cycle associated with the DCP; or if the network device sends DCP corresponding to the group of carriers, and the DCP indicates sleep, it indicates that the UE sleeps on the group of carriers in the DRX cycle associated with the DCP. If the DCP is implemented in this manner, if the UE receives the DCP from the network device on the second DCP monitoring occasion, and the DCP corresponds to the second group of carriers, and if the DCP indicates wake-up, the UE wakes up on the second group of carriers within the second DRX on duration associated with the second DCP monitoring occasion, or if the DCP indicates sleep, the UE sleeps on the second group of carriers within the second DRX on duration associated with the second DCP monitoring occasion.

In an embodiment, two groups of carriers respectively have corresponding DCPs. For example, the DCP may include identifiers of carrier groups, to distinguish DCPs of different carrier groups, or DCPs of different carrier groups have different formats. For a group of carriers, if the network device sends DCP corresponding to the group of carriers, it indicates that the UE wakes up on the group of carriers within a DRX cycle associated with the DCP. If the network device does not send DCP corresponding to the group of carriers, it indicates that the UE sleeps on the carrier group in a DRX cycle associated with the DCP. If the DCP is implemented in this manner, if the UE receives the DCP from the network device on the second DCP monitoring occasion, and the DCP corresponds to the second group of carriers, the UE wakes up on the second group of carriers within the second DRX on duration associated with the second DCP monitoring occasion, or if the UE does not receive the DCP from the network device on the second DCP monitoring occasion, and the DCP corresponds to the second group of carriers, the UE sleeps on the second group of carriers within the second DRX on duration associated with the second DCP monitoring occasion.

S85: If the UE determines not to perform monitoring on the second DCP monitoring occasion, the UE wakes up or sleeps on the second group of carriers within the second DRX on duration associated with the second DCP monitoring occasion. That the UE determines not to perform monitoring on the second DCP monitoring occasion in S85 may also be correspondingly replaced. For a specific replacement manner, refer to the description of the replacement manner in S83.

If the UE determines not to perform monitoring on the second DCP monitoring occasion, the UE does not perform monitoring on the second DCP monitoring occasion. In S85, the UE neither performs monitoring on the first DCP monitoring occasion nor performs monitoring on the second DCP monitoring occasion. In this case, to reduce a probability that the UE misses a PDCCH that may be sent by the network device on the first group of carriers, the UE may wake up on the first group of carriers within the first DRX on duration.

For the second group of carriers, for example, it may be defaulted (or specified in a protocol). If the UE determines not to perform monitoring on the second DCP monitoring occasion (or if the UE determines not to perform monitoring on the first DCP monitoring occasion and not to perform monitoring on the second DCP monitoring occasion), the UE may sleep on the second group of carriers within the second DRX on duration associated with the second DCP monitoring occasion, to reduce power consumption of the UE. Alternatively, it may be defaulted (or specified in a protocol). If the UE determines not to perform monitoring on the second DCP monitoring occasion (or if the UE determines not to perform monitoring on the first DCP monitoring occasion and not to perform monitoring on the second DCP monitoring occasion), the UE may wake up on the second group of carriers within the second DRX on duration associated with the second DCP monitoring occasion, to reduce a probability that the UE misses data that may be sent by the network device on the second group of carriers. In this case, behavior of the UE on the second group of carriers is default or specified in a protocol, does not need to be additionally configured by the network device, and does not need to be determined by the UE in another manner, so that implementation of the network device and the UE can be simplified.

Alternatively, sleep or wake-up of the UE on the second group of carriers within the second DRX on duration may be indicated by the network device. For example, the network device sends configuration information to the UE. Correspondingly, the UE receives the configuration information from the network device. For example, the configuration information may be sent by using an RRC message, a system message, or another message. The configuration information may be sent on one or more carriers included in the first group of carriers. For example, a primary carrier configured by the network device for the UE belongs to the first group of carriers, and the configuration information may be sent on the primary carrier. Alternatively, the configuration information may be sent on one or more carriers included in the second group of carriers. The configuration information may be configured as follows: When the UE does not perform monitoring on a DCP monitoring occasion, the UE wakes up on the second group of carriers within DRX on duration associated with the DCP monitoring occasion. Alternatively, the configuration information may be configured as follows: When the UE does not perform monitoring on a DCP monitoring occasion, the UE sleeps on the second group of carriers within DRX on duration associated with the DCP monitoring occasion. In this case, the network device may configure, based on a factor such as data transmission and by using the configuration information, the UE to sleep or wake up on the second group of carriers. For example, if the network device schedules, on the second group of carriers, the UE to send data or receive data in a DRX cycle associated with the second DCP monitoring occasion, the network device may indicate the UE to wake up by using the configuration information. If the network device does not schedule, on the second group of carriers, the UE to send data or receive data in a DRX cycle associated with the second DCP monitoring occasion, the network device may indicate the UE to sleep by using the configuration information. In this way, sleep or wake-up of the UE can meet a data transmission requirement.

For other content, for example, how to implement sleep of the UE within DRX on duration, or how to implement wake-up of the UE within DRX on duration, refer to related descriptions of the embodiment shown in FIG. 5.

In an embodiment of this disclosure, two DRX configuration technologies can be used in combination with a wake-up signal, and behavior of the terminal device in the case of combination is specified. For example, UE preferentially monitors a first DCP monitoring occasion. If the UE can monitor the first DCP monitoring occasion, the UE does not need to monitor a second DCP monitoring occasion, to reduce power consumption caused when the UE monitors a DCP monitoring occasion. If the UE cannot monitor the first DCP monitoring occasion, the UE may further determine whether the UE can monitor the second DCP monitoring occasion, so that behavior of the UE is performed as indicated by a monitoring result as much as possible, to better meet a requirement of a network device. In this embodiment of this disclosure, the network device may configure the second DCP monitoring occasion for the second group of carriers, so that the network device has stronger control over the behavior of the UE on the second group of carriers, and scheduling flexibility of the network device is also improved.

Figure 10:
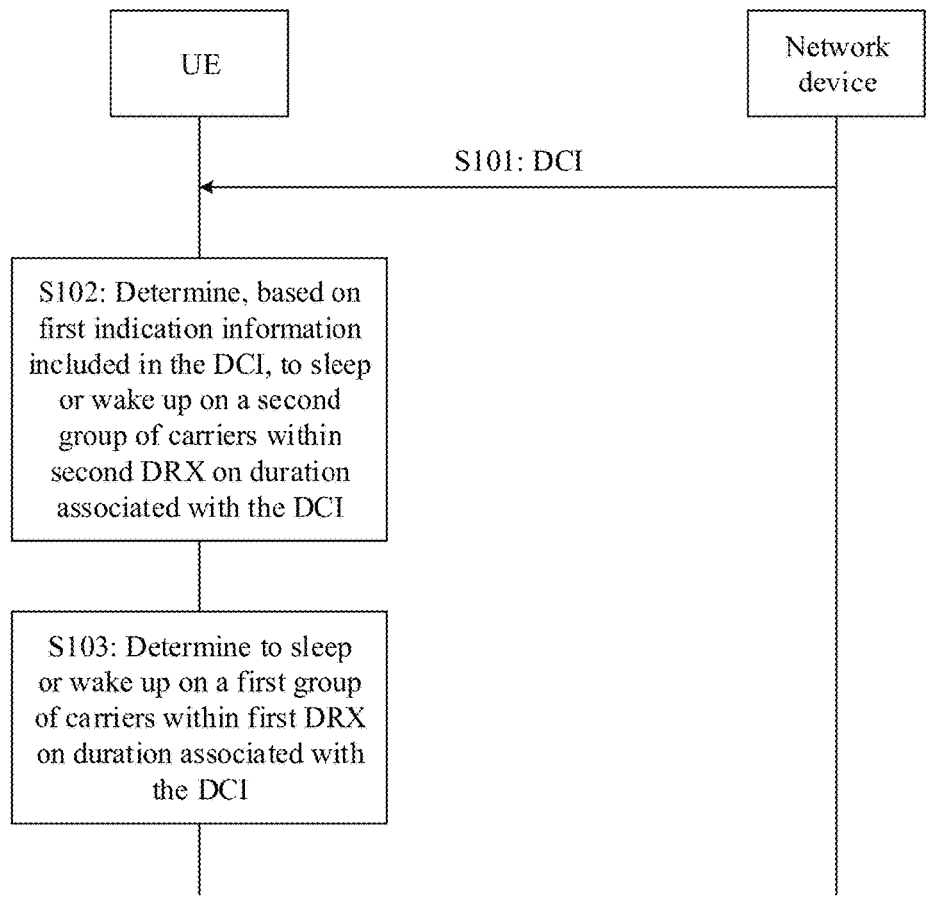
FIG. 10 is a flowchart of a third communication method according to an embodiment of this disclosure.

FIG. 10 is a flowchart of a third communication method according to an embodiment of this disclosure.

S101: A network device sends DCI to UE on a first carrier, and correspondingly, the UE receives, on the first carrier, the DCI from the network device. The first carrier may include one or more carriers, and the first carrier may belong to a first group of carriers or a second group of carriers. A first DRX configuration is applied to the first group of carriers, and a second DRX configuration is applied to the second group of carriers.

DCP is also a type of DCI, and is also limited by a DCI size budget. In this embodiment of this disclosure, the network device does not need to configure DCP for the UE, or the network device does not need to send DCP, but a function of the DCP is implemented by using DCI other than the DCP. A size of the DCP is usually different from a size of other common DCI. According to a DCI size budget of the UE, the DCP occupies one size. This reduces types of DCI that can be received by the UE. However, in this embodiment of this disclosure, the network device does not need to send the DCP, but sends common DCI. In this case, the DCP does not occupy overheads of a DCI size, so that the UE can receive more types of DCI.

Alternatively, in this embodiment of this disclosure, the network device may configure DCP for the UE, for example, the network device configures the DCP for the first group of carriers. However, in some cases, the UE cannot monitor the DCP. For example, due to a limitation of the DCI size budget, the UE determines not to monitor the DCP, or because a corresponding DCP monitoring occasion is within a DRX active time, the UE determines not to monitor the DCP. In these cases, the network device may alternatively send other DCI to implement the function of the DCP. For description of content such as the first group of carriers, the second group of carriers, the first DRX configuration, the second DRX configuration, and the DRX active time, refer to the embodiment shown in FIG. 5 or the embodiment shown in FIG. 8.

Optionally, in this embodiment of this disclosure, no matter whether the network device configures the DCP, or no matter whether the network device sends the DCP, the network device may send DCI with a DCP function on a DCP monitoring occasion. For example, the network device may send the DCI with the DCP function on a first DCP monitoring occasion, and the UE may receive the DCI with the DCP function on the first DCP monitoring occasion. For content about the first DCP monitoring occasion and the like, refer to the description of the embodiment shown in FIG. 5. Alternatively, the network device may not send the DCI with the DCP function on the DCP monitoring occasion, but send the DCI with the DCP function at another time. For example, the network device sends the DCI with the DCP function within On Duration of a DRX cycle.

For example, if the network device configures the DCP, or the network device sends the DCI with the DCP function on the DCP monitoring occasion, the UE may determine whether to monitor the DCP on the first DCP monitoring occasion. If the UE determines to monitor the DCP on the first DCP monitoring occasion, the UE may monitor the DCP on the first DCP monitoring occasion, or monitor the DCI with the DCP function. For a manner in which the UE determines whether to monitor the DCP on the first DCP monitoring occasion, refer to S51 in the embodiment shown in FIG. 5. For example, a first determining manner is determining based on a time domain position of the first DCP monitoring occasion. For example, a second determining manner is determining based on a DCI size budget. For example, a third determining manner is determining based on a time domain position of the first DCP monitoring occasion and a DCI size budget. For this, refer to descriptions of S51 in the embodiment shown in FIG. 5.

If the DCI is used to implement a function of the DCP, optionally, the DCI may indicate, by using a second field included in the DCI, that the DCI is used to implement the function of the DCP. The second field includes, for example, one or more of the following fields: a frequency domain resource assignment (FDRA) field, a modulation and coding scheme (MCS) field, a new data indicator (NDI) field, a redundancy version (RV) field, a hybrid automatic repeat request process number (hybrid automatic repeat request process number), an antenna port, or a demodulation reference signal sequence initialization field. In the DCI, the MCS field occupies 5 bits, the NDI field occupies 1 bit, the RV field occupies 2 bits, the HARQ process number field occupies 4 bits, the antenna port field occupies at least 4 bits, and the DMRS sequence number initialization field occupies 1 bit. For example, the second field is an FDRA field; or the second field is an MCS field; or the second field includes an MCS field and an NDI field; or the second field includes an FDRA field, an MCS field, and an RV field.

If the DCI is used to normally schedule data but is not used to implement a DCP function, a value of the foregoing field included in the DCI is related to scheduled data. For example, a value of an MCS field may indicate an MCS of the scheduled data. However, if the DCI is used to implement the DCP function, a value of the second field may be a first value, and the first value may be specified in a protocol, or may be default, or may be configured by the network device. For example, the first value is all 0s or all 1s. By using this value, the UE can know that current DCI is used to implement the DCP function.

If the value of the second field is the first value, the DCI may further include second indication information, or if the value of the second field is not the first value, the DCI does not include second indication information. For example, the value of the second field is not the first value, but a normal (normal) value. In this case, the DCI is not used to implement the DCP function, but implements a normal function of the DCI, for example, scheduling data, and therefore, the DCI naturally does not need to include the second indication information. Therefore, if the value of the second field is the first value, it may be indicated that the DCI further includes the second indication information. The second indication information may indicate sleep on the second group of carriers within second DRX on duration associated with the DCI, or indicate wake-up on the second group of carriers within second DRX on duration associated with the DCI. On the second group of carriers, according to the second DRX configuration, the DCI used to implement the DCP function may be associated with one or more DRX cycles. If the DCI is configured on the first group of carriers but not on the second group of carriers, the association is an association in a time domain position, for example, one or more DRX cycles later than the DCI in time domain on the second group of carriers can be associated with the DCI. In addition, if the DCI is associated with a plurality of DRX cycles, the plurality of DRX cycles may be consecutive or inconsecutive in time domain. In addition, the second DRX on duration corresponds to the second DRX configuration, and the second DRX on duration is located on the second group of carriers. The second DRX on duration may include On Duration time in all or a part of the DRX cycles associated with the DCI in the second DRX configuration, or the second DRX on duration may include On Duration in all or a part of the DRX cycles associated with the DCI on the second group of carriers.

For example, the second indication information may occupy one or more bits. An example in which the second indication information occupies one bit is used. For example, if a value of the bit is "1", it indicates that wake-up is performed on the second group of carriers within the second DRX on duration associated with the DCI. If the value of the bit is "0", it indicates that sleep is performed on the second group of carriers within the second DRX on duration associated with the DCI. Alternatively, if the second indication information occupies more bits, there may be another indication manner. The second indication information included in the DCI indicates that the UE sleeps or wakes up on the second group of carriers, and the UE does not need to monitor the DCP. This reduces a quantity of sizes of DCI that need to be monitored by the UE, and regulates the sleep or wake-up of the UE on the second group of carriers. In addition, if the network device indicates the UE to sleep or wake up on the second group of carriers, the network device may perform indication based on a service of the UE on the second group of carriers, so that sleep or wake-up behavior of the UE on the second group of carriers better meets a service requirement of the UE.

There are different implementations for the sleep or wake-up of the UE on the first group of carriers, which are described in the following by using examples.

In an embodiment, by default (or specified in a protocol), the UE wakes up on the first group of carriers within first DRX on duration associated with the DCI. If the second indication information indicates that the UE wakes up on the second group of carriers within the second DRX on duration, and the network device needs to schedule, on the first group of carriers, data transmission of the UE on the second group of carriers, the UE cannot receive scheduling information from the network device if the UE sleeps on the first group of carriers within the first DRX on duration, and therefore data transmission cannot be performed on the second group of carriers. Therefore, by default (or specified in a protocol), the UE wakes up on the first group of carriers within the first DRX on duration, to reduce a probability that the UE misses the scheduling information and reduce a service transmission delay. Alternatively, by default (or specified in a protocol), the UE sleeps on the first group of carriers within the first DRX on duration associated with the DCI. In this manner, power consumption of the UE can be reduced. In this manner, the first carrier may belong to the first group of carriers, or may belong to the second group of carriers. In other words, the network device may send the DCI on the first group of carriers, or send the DCI on the second group of carriers.

On the first group of carriers, according to the first DRX configuration, the DCI used to implement the DCP function may be associated with one or more DRX cycles. For example, on the first group of carriers, one or more DRX cycles later than the DCI in time domain may be associated with the DCI. In addition, if the DCI is associated with a plurality of DRX cycles, the plurality of DRX cycles may be consecutive or inconsecutive in time domain. In addition, the first DRX on duration corresponds to the first DRX configuration, and the first DRX on duration is located on the first group of carriers. The first DRX on duration may include On Duration in all or a part of the DRX cycles associated with the DCI in the first DRX configuration, or the first DRX on duration may include On Duration in all or a part of the DRX cycles associated with the DCI on the first group of carriers.

In this case, the DCI needs to include only the second indication information, and does not need to include indication information used to indicate wake-up or sleep on the first group of carriers. This helps reduce signaling overheads.

Figure 11:
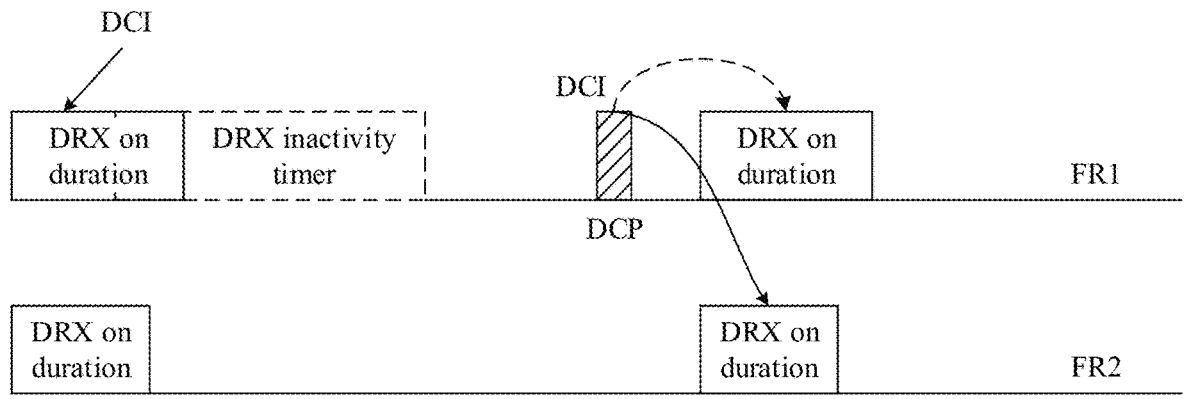
FIG. 11 is a schematic diagram in which DCI received by UE on a first group of carriers can indicate that the UE sleeps or wakes up on two groups of carriers according to an embodiment of this disclosure.

In an embodiment, if the value of the second field is the first value, the DCI may further include first indication information, or if the value of the second field is not the first value, or if the value of the second field is the second value, the DCI does not include the first indication information. The second value may be any value, other than the first value, of the second field. For example, the value of the second field is not the first value, but a normal value. In this case, the DCI is not used to implement the DCP function, but implements a normal function of the DCI, for example, scheduling data, and therefore, the DCI naturally does not need to include the first indication information. Therefore, if the value of the second field is the first value, it may be indicated that the DCI further includes the first indication information. The first indication information may indicate sleep on the first group of carriers within the first DRX on duration associated with the DCI, or indicate wake-up on the first group of carriers within the first DRX on duration associated with the DCI. Refer to FIG. 11. An example in which the DCI is configured on the first group of carriers, the first group of carriers belongs to FR1, and the second group of carriers belongs to FR2 is used. The DCI received by the UE on FR1 can indicate sleep or wake-up of the UE on the second group of carriers, and optionally, can also indicate sleep or wake-up of the UE on the first group of carriers. The dashed arrow represents an optional process. In this manner, the first carrier may belong to the first group of carriers, or may belong to the second group of carriers. In other words, the network device may send the DCI on the first group of carriers, or send the DCI on the second group of carriers.

For example, the first indication information may occupy one or more bits. An example in which the first indication information occupies one bit is used. For example, if a value of the bit is "1", it indicates that wake-up is performed on the first group of carriers within the first DRX on duration associated with the DCI. If the value of the bit is "0", it indicates that sleep is performed on the first group of carriers within the first DRX on duration associated with the DCI. Alternatively, if the first indication information occupies more bits, there may be another indication manner. The first indication information included in the DCI indicates that the UE sleeps or wakes up on the first group of carriers, and the UE does not need to monitor the DCP. This reduces a quantity of sizes of DCI that need to be monitored by the UE, and regulates the sleep or wake-up of the UE on the first group of carriers. In addition, if the network device indicates the UE to sleep or wake up on the first group of carriers, the network device may perform indication based on a service of the UE on the first group of carriers, so that sleep or wake-up behavior of the UE on the first group of carriers better meets a service requirement of the UE.

In an embodiment, the network device separately indicates sleep or wake-up of the two groups of carriers by using the second indication information and the first indication information, so that behavior of the UE is clearer and more meets a service requirement.

In an embodiment, if the DCI includes the second indication information, in addition to indicating the behavior of the UE on the second group of carriers, the second indication information may further indicate the behavior of the UE on the first group of carriers. That is, the second indication information may indicate sleep or wake-up on the second group of carriers within the second DRX on duration associated with the DCI, and indicate sleep or wake-up on the first group of carriers within the first DRX on duration associated with the DCI. Alternatively, the second indication information indicates sleep or wake-up within DRX on duration associated with the DCI. In this manner, the first carrier may belong to the first group of carriers, or may belong to the second group of carriers. In other words, the network device may send the DCI on the first group of carriers, or send the DCI on the second group of carriers.

For example, the second indication information occupies one or more bits. An example in which the second indication information occupies one bit is used. If a value of the bit is "1", it indicates that wake-up is performed on the first group of carriers within the first DRX on duration associated with the DCI, and indicates that wake-up is performed on the second group of carriers within the second DRX on duration associated with the DCI. If the value of the bit is "0", it indicates that sleep is performed on the first group of carriers within the first DRX on duration associated with the DCI, and indicates that sleep is performed on the second group of carriers within the second DRX on duration associated with the DCI. Alternatively, for example, the second indication information occupies two bits, and the two bits respectively indicate the first group of carriers and the second group of carriers. For example, in the two bits, a high-order bit indicates the first group of carriers, and a low-order bit indicates the second group of carriers. If a value of a high-order bit in the two bits is "1", it indicates that wake-up is performed on the first group of carriers within the first DRX on duration associated with the DCI; or if a value of a high-order bit in the two bits is "0", it indicates that sleep is performed on the first group of carriers within the first DRX on duration associated with the DCI. A manner of indicating behavior of the UE on the second group of carriers by a low-order bit in the two bits is also similar.

In this manner, the network device can indicate the behavior of the UE on the first group of carriers and the second group of carriers by using the second indication information, and no more indication information is required. This can reduce signaling overheads and make the behavior of the UE clearer.

In an embodiment, the first carrier may include at least two carriers, and the at least two carriers include both a carrier belonging to the first group of carriers and a carrier belonging to the second group of carriers. For example, the first carrier includes a second carrier and a third carrier, the second carrier belongs to the first group of carriers, and the third carrier belongs to the second group of carriers. In this case, it may be understood that the network device not only sends the DCI on the first group of carriers, but also sends the DCI on the second group of carriers, so that at least two pieces of DCI may also be included. For example, DCI includes first DCI and second DCI, the first DCI is sent on the first carrier, and the second DCI is sent on the second carrier. In this case, the first DCI may indicate the behavior of the UE on the first group of carriers, and the second DCI may indicate the behavior of the UE on the second group of carriers. For example, the first DCI may indicate sleep on the first group of carriers within the first DRX on duration associated with the DCI, or indicate wake-up on the first group of carriers within the first DRX on duration associated with the DCI. The second DCI may indicate sleep on the second group of carriers within the second DRX on duration associated with the DCI, or indicate wake-up on the second group of carriers within the second DRX on duration associated with the DCI. In this case, it may also be considered that the first DCI includes the first indication information, and the second DCI includes the second indication information. In this case, the second DCI may include a second field, and the first DCI may also include a first field. For example, if a value of the second field is a first value, the second DCI may further include the second indication information. If the value of the second field is not the first value, the second DCI does not include the second indication information. If a value of the first field is a third value, the first DCI may further include the first indication information. If the value of the first field is not the third value, the first DCI does not include the first indication information. For description of this implementation, refer to the foregoing description. In addition, for a manner in which the second indication information indicates the behavior of the UE on the second group of carriers and a manner in which the first indication information indicates the behavior of the UE on the first group of carriers, refer to the foregoing description.

In this manner, the network device may separately indicate, by using DCI carried on different carriers, behavior of the UE on different carriers, and the indication is more specific.

S102: The UE determines, based on the second indication information included in the DCI, to sleep or wake up on the second group of carriers within the second DRX on duration associated with the DCI. Alternatively, there may be no determined process. For example, S102 may be replaced with: The UE sleeps or wakes up, based on the second indication information included in the DCI, on the second group of carriers within the second DRX on duration associated with the DCI. Alternatively, based on the description in S101, if the DCI includes the first DCI and the second DCI, S102 may be replaced with: The UE determines, based on the second indication information included in the second DCI, to sleep or wake up on the second group of carriers within the second DRX on duration associated with the second DCI.

If the value of the second field included in the DCI is the first value, the UE determines that the DCI includes the second indication information. In this case, if the second indication information indicates sleep on the second group of carriers within the second DRX on duration associated with the DCI, the UE determines to sleep on the second group of carriers within the second DRX on duration associated with the DCI, and then the UE sleeps on the second group of carriers within the second DRX on duration. Alternatively, if the second indication information indicates wake-up on the second group of carriers within the second DRX on duration associated with the DCI, the UE determines to wake up on the second group of carriers within the second DRX on duration associated with the DCI, and then the UE sleeps on the first group of carriers within the first DRX on duration.

S103: The UE determines to sleep or wake up on the first group of carriers within the first DRX on duration associated with the DCI. Alternatively, there may be no determined process. For example, S103 may be replaced with: The UE sleeps or wakes up on the first group of carriers within the first DRX on duration associated with the DCI. Alternatively, according to the description in S101, if the DCI includes the first DCI and the second DCI, S103 may be replaced with: The UE determines to sleep or wake up on the first group of carriers within the first DRX on duration associated with the first DCI.

If the UE wakes up on the first group of carriers within the first DRX on duration associated with the DCI by default (or specified in a protocol), if the network device does not configure the DCP, the UE wakes up on the first group of carriers within the first DRX on duration; or if the network device configures the DCP, the UE wakes up on the first group of carriers within the first DRX on duration if the UE does not monitor the DCP on the first group of carriers. Alternatively, if the UE sleeps on the first group of carriers within the first DRX on duration associated with the DCI by default (or specified in a protocol), if the network device does not configure the DCP, the UE sleeps on the first group of carriers within the first DRX on duration; or if the network device configures the DCP, the UE wakes up on the first group of carriers within the first DRX on duration if the UE does not monitor the DCP on the first group of carriers. For a case in which the UE does not monitor the DCP on the first group of carriers, refer to the description of the embodiment shown in FIG. 5.

Alternatively, if the DCI further includes the first indication information, and the first indication information indicates wake-up on the first group of carriers within the first DRX on duration associated with the DCI, if the DCI includes the first indication information, the UE sleeps on the first group of carriers within the first DRX on duration; or if the DCI does not include the first indication information, the UE sleeps on the first group of carriers within the first DRX on duration. Alternatively, if the first indication information included in the DCI indicates wake-up on the first group of carriers within the first DRX on duration associated with the DCI, the UE wakes up on the first group of carriers within the first DRX on duration. Alternatively, if the first indication information included in the DCI indicates sleep on the first group of carriers within the first DRX on duration associated with the DCI, the UE sleeps on the first group of carriers within the first DRX on duration.

Alternatively, if the second indication information indicates behavior of the UE on the first group of carriers and behavior of the UE on the second group of carriers, if the second indication information indicates sleep within DRX on duration associated with the DCI, the UE sleeps on the first group of carriers within the first DRX on duration and sleeps on the second group of carriers on the second DRX on duration; or if the second indication information indicates wake-up within the DRX on duration associated with the DCI, the UE wakes up on the first group of carriers within the first DRX on duration, and wakes up on the second group of carriers within the second DRX on duration.

Alternatively, if the DCI includes the first DCI and the second DCI, the first DCI includes the first indication information, the second DCI includes the second indication information, the second indication information indicates the behavior of the UE on the second group of carriers, and the first indication information indicates the behavior of the UE on the first group of carriers. In this case, if the first indication information included in the first DCI indicates wake-up on the first group of carriers within the first DRX on duration associated with the first DCI, the UE wakes up on the first group of carriers within the first DRX on duration. Alternatively, if the first indication information included in the first DCI indicates sleep on the first group of carriers within the first DRX on duration associated with the first DCI, the UE sleeps on the first group of carriers within the first DRX on duration. If the second indication information included in the second DCI indicates wake-up on the second group of carriers within the second DRX on duration associated with the second DCI, the UE wakes up on the second group of carriers within the second DRX on duration. Alternatively, if the second indication information included in the second DCI indicates sleep on the second group of carriers within the second DRX on duration associated with the second DCI, the UE sleeps on the second group of carriers within the second DRX on duration.

For the network device, if no DCP is configured, the network device does not need to send the DCP, and the UE does not need to monitor the DCP. However, if the DCP is configured, for example, the DCP is configured on the first group of carriers, the network device may normally send the DCP on the first group of carriers. In addition, to avoid that the UE sometimes fails to monitor the DCP, the network device also sends DCI that can implement a DCP function. In this case, the UE may determine whether the DCP can be monitored on the first group of carriers. If the UE can monitor the DCP, the UE may determine to sleep or wake up on the first group of carriers according to a monitoring result of the DCP, but does not need to determine to sleep or wake up on the first group of carriers according to a default (or protocol-specified) rule, second indication information, or first indication information. Alternatively, if the UE cannot monitor the DCP, the UE may determine, according to a rule by default (or specified in a protocol) or according to the first indication information, to sleep or wake up on the first group of carriers.

For other content, for example, how to implement sleep of the UE within DRX on duration, or how to implement wake-up of the UE within DRX on duration, refer to related descriptions of the embodiment shown in FIG. 5.

In an embodiment of this disclosure, the two DRX configuration technologies can be used in combination with a wake-up signal. In addition, in this embodiment of this disclosure, DCP does not need to be configured, but a function of the DCP is implemented by using common DCI, and therefore, a quantity of sizes of DCI that need to be monitored by UE is reduced, or UE can monitor more DCI sizes, which also simplifies implementation of the network device and the UE. In addition, the network device may indicate, by using corresponding indication information, the UE to wake up or sleep on a carrier group. This improves flexibility of an indication manner, better meets a service transmission requirement of the UE, and also increases scheduling flexibility of the network device. In addition, in this embodiment of this disclosure, it is also avoided that the UE wakes up on the second group of carriers within the second DRX on duration in a default manner, so that power consumption of the UE can be reduced.

The embodiment shown in any one of FIG. 5, FIG. 8, or FIG. 10 mainly considers a problem of combining two DRX configurations with a wake-up signal. However, it can be learned from the foregoing description that cross-carrier scheduling and two DRX configurations are not used in combination currently. In this case, the following further provides a fourth communication method, so that cross-carrier scheduling and two DRX configurations are combined for use, to further reduce power consumption of the UE.

Figure 12:
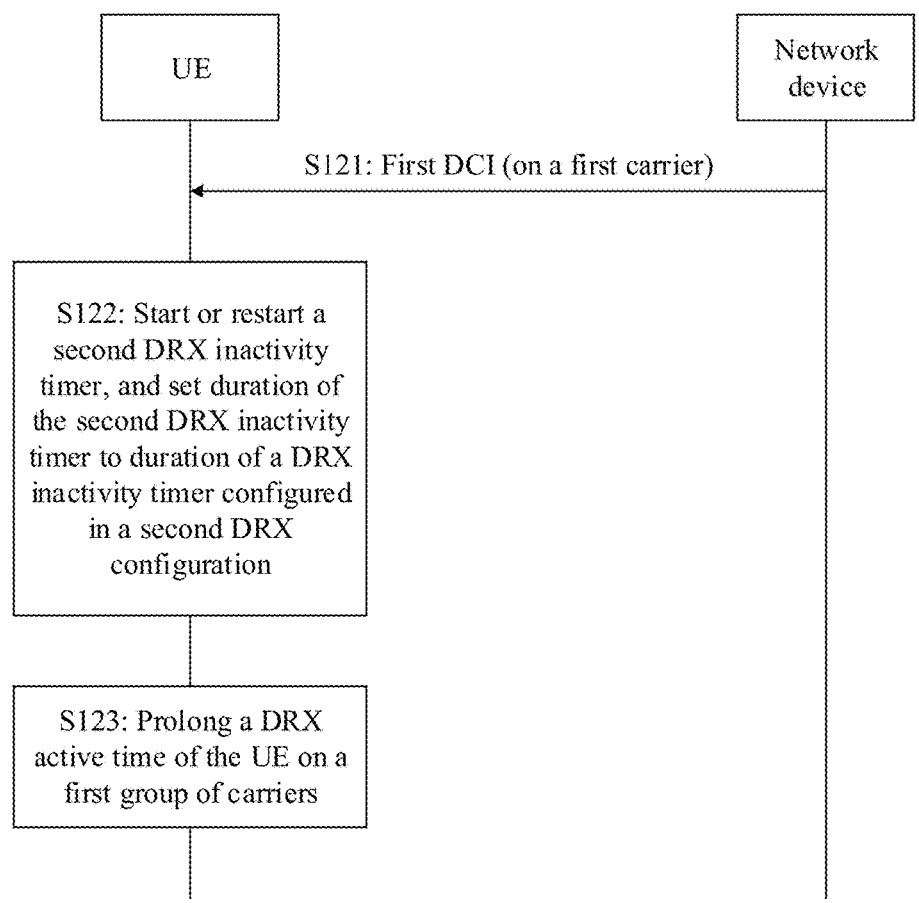
FIG. 12 is a flowchart of a fourth communication method according to an embodiment of this disclosure.

FIG. 12 is a flowchart of the method.

S121: A network device sends second DCI on a first carrier, and correspondingly, UE receives, on the first carrier, the second DCI from the network device.

The first carrier belongs to a first group of carriers, the first group of carriers includes one or more carriers configured for the UE, and the first carrier is, for example, a part or all of carriers included in the first group of carriers. For example, if a primary carrier configured by the network device for the UE belongs to the first group of carriers, the first carrier may be the primary carrier of the UE, and the network device may send the second DCI on the primary carrier.

The second DCI may be used to schedule data on a second group of carriers. For example, the second DCI schedules newly transmitted data, or the second DCI may indicate new transmission of downlink data, or the second DCI may indicate new transmission of uplink data. The second DCI may schedule the UE to receive data or send data on the second group of carriers, that is, the second DCI implements cross-carrier scheduling. For descriptions of concepts such as the first group of carriers and the second group of carriers, refer to the embodiment shown in any one of FIG. 5, FIG. 8, or FIG. 10.

S122: The UE starts or restarts a second DRX inactivity timer, and sets duration of the second DRX inactivity timer to duration of a DRX inactivity timer configured in a second DRX configuration.

Because the second DCI schedules data on the second group of carriers, data may be transmitted on the second group of carriers subsequently. Therefore, a DRX active time of the UE on the second group of carriers needs to be prolonged, to ensure that the UE can receive data or send data on the second group of carriers. In addition, it can be further ensured that the UE performs corresponding behavior within the DRX active time, for example, sending a periodic uplink sounding reference signal (sounding reference signal, SRS), or reporting channel status information (channel status information, CSI) by using a PUCCH, or reporting half-period channel status information (channel status information, CSI) by using a PUSCH.

To prolong the DRX active time of the UE on the second group of carriers, an implementation is starting or restarting the second DRX inactive timer. For example, the UE may start or restart the second DRX inactivity timer on a first time domain symbol after receiving of the second DCI is completed. In the first time domain symbol after receiving of the second DCI is completed, if the second DRX inactivity timer does not run, the UE starts the second DRX inactivity timer; or in the first time domain symbol after receiving of the second DCI is completed, if the second DRX inactivity timer is in a running state, the UE restarts the second DRX inactivity timer.

The second DRX configuration is applied to the second group of carriers, and a DRX cycle, a DRX inactivity timer, a DRX retransmission timer, and the like may be configured in the second DRX configuration. The second DRX inactivity timer corresponds to the second group of carriers, or corresponds to the second DRX configuration. It may be understood that the DRX inactivity timer configured in the second DRX configuration is the second DRX inactivity timer. In S122, the UE may set duration of the second inactivity timer to original duration of the second DRX inactivity timer, namely, duration of the DRX inactivity timer configured in the second DRX configuration. By starting or restarting the second DRX inactivity timer, the DRX active time of the UE on the second group of carriers is prolonged, so that the UE can receive data or send data on the second group of carriers.

The UE starts or restarts the second DRX inactivity timer in an implementation: The UE starts or restarts the second DRX inactivity timer by default (or specified in a protocol) after receiving the second DCI. In this manner, the network device does not need to perform additional notification, and signaling overheads can be reduced.

Alternatively, the UE starts or restarts the second DRX inactivity timer in another implementation of indicating by the network device. For example, the second DCI may include second indication information, and the second indication information may indicate to start or restart the second DRX inactivity timer. In this case, there may be two cases. In a case, if the second DCI includes the second indication information, indicating to start or restart the second DRX inactivity timer, the UE starts or restarts the second DRX inactivity timer. If the second DCI does not include the second indication information, indicating not to start or restart the second DRX inactivity timer, the UE neither starts nor restarts the second DRX inactivity timer. In this case, the second DCI may include the second indication information or may not include the second indication information, so that signaling overheads of the second DCI can be reduced. Alternatively, in another case, if the second indication information included in the second DCI indicates to start or restart the second DRX inactivity timer, the UE starts or restarts the second DRX inactivity timer. If the second indication information included in the second DCI indicates not to start or restart the second DRX inactivity timer, the UE neither starts nor restarts the second DRX inactivity timer. An indication is performed by using the second DCI, so that the UE is more aware of behavior of the UE.

The second indication information may be carried by using an existing field in the second DCI. For example, if the existing field included in the second DCI has a reserved (reserved) bit, the second indication information may be carried by using the reserved bit. Alternatively, one or more bits may be added to the second DCI to carry the second indication information.

S123: The UE prolongs a DRX active time of the UE on the first group of carriers.

Because there is data transmission on the second group of carriers, and the second DCI is used for cross-carrier scheduling, the network device may subsequently schedule the data on the second group of carriers in a cross-carrier scheduling manner. In addition, the network device may schedule, on the first group of carriers, data on the first group of carriers. Therefore, the DRX active time of the UE on the first group of carriers can be prolonged to receive DCI used for scheduling data.

There may be different implementations for the UE to prolong the DRX active time of the UE on the first group of carriers, which are described in the following by using examples.

1. Manner 1: The DRX Active Time of the UE on the First Group of Carriers is Prolonged By Using a First DRX Inactivity Timer.

A first DRX configuration is applied to the first group of carriers, and a DRX cycle, a DRX inactivity timer, a DRX retransmission timer, and the like may be configured in the first DRX configuration. The first DRX inactivity timer corresponds to the first group of carriers, or corresponds to the first DRX configuration. It may be understood that the DRX inactivity timer configured in the first DRX configuration is the first DRX inactivity timer. In this case, in S123, the UE may start or restart the first DRX inactivity timer. In this manner, the DRX active time of the UE on the first group of carriers may be prolonged, so that the UE can receive DCI on the first group of carriers.

The UE further needs to set duration of the first DRX inactivity timer. In an optional implementation, the UE may set the duration of the first DRX inactivity timer to original duration of the first DRX inactivity timer, namely, duration of the DRX inactivity timer configured in the first DRX configuration. This setting manner is relatively simple, and is also a setting that can be easily implemented by the UE.

Figure 13:
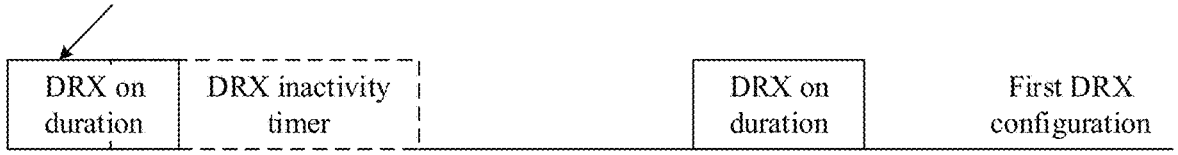
FIG. 13 is a schematic diagram in which duration of a first DRX inactivity timer is greater than duration of a second DRX inactivity timer according to an embodiment of this disclosure.
Figure 13:

For example, a frequency of the first group of carriers belongs to FR1, and a frequency of the second group of carriers belongs to FR2. Because power consumption of the UE is relatively high when the UE works on FR2, the UE may work more on the first group of carriers. Therefore, the duration of the DRX inactivity timer configured in the first DRX configuration may be relatively long. If the duration of the first DRX inactivity timer is set to the duration of the DRX inactivity timer configured in the first DRX configuration, the DRX active time of the UE on the first group of carriers may be prolonged excessively. For example, the network device may no longer schedule data on the second group of carriers, and the UE may have entered a DRX non-active time on the second group of carriers, but the UE is still in the DRX active time on the first group of carriers. This may increase power consumption of the UE on the first group of carriers. Refer to FIG. 13. A running time of the first DRX inactivity timer corresponding to FR1 is longer than a running time of the second DRX inactivity timer corresponding to FR2. After the second DRX inactivity timer stops running, the UE is still in the DRX active time on FR1. In this case, there is a solution. The network device may send first signaling, and the first signaling may indicate the UE to stop the first DRX inactivity timer. After receiving the first signaling, the UE may stop running the first DRX inactivity timer. The first signaling is, for example, DCI or radio resource control (radio resource control, RRC) signaling. However, this consumes additional signaling.

Figure 14:
FIG. 14 is a schematic diagram in which duration of a first DRX inactivity timer is set to duration of a DRX inactivity timer configured in a second DRX configuration according to an embodiment of this disclosure.
Figure 14:

To resolve the foregoing problem, in another optional implementation, when the UE needs to set the duration of the first DRX inactivity timer, for example, when starting the first DRX inactivity timer, or before starting the first DRX inactivity timer, the UE does not sets the duration of the first DRX inactivity timer to the duration of the DRX inactivity timer configured in the first DRX configuration, but sets the duration of the first DRX inactivity timer to the duration of the DRX inactivity timer configured in the second DRX configuration. That the UE sets the duration of the first DRX inactivity timer to the duration of the DRX inactivity timer configured in the second DRX configuration may also be understood as: The UE sets the duration of the first DRX inactivity timer to the duration of the second DRX inactivity timer. If this manner is used, the duration of the DRX active time of the UE on the first group of carriers may be consistent with the duration of the DRX active time of the UE on the second group of carriers. The UE can receive, on the first group of carriers, the DCI used for scheduling the data on the second group of carriers, and does not consume excessive power due to excessively long DRX active time on the first group of carriers. Refer to FIG. 14. A running time of the first DRX inactivity timer corresponding to FR1 is the same as a running time of the second DRX inactivity timer corresponding to FR2.

Duration to which the UE sets the duration of the first DRX inactivity timer may be set by default, or may be specified in a protocol. Alternatively, the UE may determine, according to a corresponding situation, duration to which the duration of the first DRX inactivity timer is set. For example, if the UE receives the first DCI on the first group of carriers before starting or restarting the first DRX inactivity timer, and the first DCI is used to schedule the UE to receive data or send data on the first group of carriers, the UE may set the duration of the first DRX inactivity timer to the duration of the DRX inactivity timer configured in the first DRX configuration, to meet a requirement of the UE for receiving data or sending data on the first group of carriers. The scheduling requirement of receiving, by the UE, data corresponding to the first group of carriers on the first group of carriers can also be met.

Consider a problem: Before the UE starts or restarts the first DRX inactivity timer, if the first DRX inactivity timer is in a running state, and if remaining duration of the first DRX inactivity timer is longer than the duration of the DRX inactivity timer configured in the second DRX configuration, if the UE restarts the first DRX inactivity timer, the duration of the first DRX inactivity timer is changed to be long or short, which increasing processing complexity of the UE. Therefore, in an optional implementation, the UE does not need to start or restart the first DRX inactivity timer in any case, but may first determine whether to start or restart the first DRX inactivity timer. For example, before the UE starts or restarts the first DRX inactivity timer, if the first DRX inactivity timer is in a running state, the UE may determine a value relationship between the remaining duration of the first DRX inactivity timer and the duration of the DRX inactivity timer configured in the second DRX configuration. If the remaining duration of the first DRX inactivity timer is shorter than the duration of the DRX inactivity timer configured in the second DRX configuration, the UE may set the duration of the first DRX inactivity timer to the duration of the DRX inactivity timer configured in the second DRX configuration. Alternatively, if the remaining duration of the first DRX inactivity timer is longer than or equal to the duration of the DRX inactivity timer configured in the second DRX configuration, the UE may not need to restart the first DRX inactivity timer. In this case, although the UE does not restart the first DRX inactivity timer, because the first DRX inactivity timer is in a running state, and the remaining duration of the first DRX inactivity timer is greater than or equal to the duration of the DRX inactivity timer configured in the second DRX configuration, it indicates that a DRX active time of the UE on the first group of carriers does not need to be additionally prolonged, but a requirement can be met.

Whether the UE needs to start the first DRX inactivity timer may be specified by default, or may be specified in a protocol. For example, it is specified in the protocol that if the UE receives, on the first group of carriers, DCI used to schedule data on the second group of carriers, the UE starts the first DRX inactivity timer. Alternatively, whether the UE needs to start the first DRX inactivity timer may be configured by the network device. For example, the second DCI may include the first indication information, and the first indication information may indicate to start or restart the first DRX inactivity timer. In this case, there may be two cases. In one case, if the second DCI includes the first indication information, indicating to start or restart the first DRX inactivity timer, the UE starts or restarts the first DRX inactivity timer. If the second DCI does not include the first indication information, indicating not to start or restart the first DRX inactivity timer, the UE neither starts nor restarts the first DRX inactivity timer. In this case, the second DCI may include the first indication information or may not include the first indication information, so that signaling overheads of the second DCI can be reduced. Alternatively, in another case, if the first indication information included in the second DCI indicates to start or restart the first DRX inactivity timer, the UE starts or restarts the first DRX inactivity timer. If the first indication information included in the second DCI indicates not to start or restart the first DRX inactivity timer, the UE neither starts nor restarts the first DRX inactivity timer. An indication is performed by using the second DCI, so that the UE is more aware of behavior of the UE.

In an embodiment, if the second DCI includes the first indication information, in addition to indicating the UE to start or restart the first DRX inactivity timer, the first indication information may further indicate how to set the duration of the first DRX inactivity timer. For example, the first indication information may indicate to set timing duration of the first DRX inactivity timer to the duration of the DRX inactivity timer configured in the first DRX configuration, or indicate to set timing duration of the first DRX inactivity timer to the duration of the DRX inactivity timer configured in the second DRX configuration. In this case, the UE may set the duration of the first DRX inactivity timer based on the first indication information. Alternatively, the second DCI may indicate, by using other information, how to set the duration of the first DRX inactivity timer. For example, the second DCI may further include third indication information. The third indication information may indicate to set the timing duration of the first DRX inactivity timer to the duration of the DRX inactivity timer configured in the first DRX configuration, or indicate to set the timing duration of the first DRX inactivity timer to the duration of the DRX inactivity timer configured in the second DRX configuration. A manner of setting the duration of the first DRX inactivity timer is indicated by using corresponding indication information, so that the UE does not need to determine, by itself, how to set the duration of the first DRX inactivity timer. This simplifies implementation of the UE.

2. Manner 2: The UE Prolongs the DRX Active Time of the UE on the First Group of Carriers.

In manner 2, the first DRX inactivity timer does not need to be used. Because the UE knows an end moment of the second DRX inactivity timer, or the UE knows an end moment of the DRX active time of the UE on the second group of carriers, the UE may prolong the DRX active time of the UE on the first group of carriers, for example, prolong the end moment of the DRX active time of the UE on the first group of carriers to be the same as the end moment of the DRX active time of the UE on the second group of carriers. If this manner is used, the duration of the DRX active time of the UE on the first group of carriers is consistent with the duration of the DRX active time of the UE on the second group of carriers. The UE can receive, on the first group of carriers, the DCI used for scheduling the data on the second group of carriers, and does not consume excessive power due to excessively long DRX active time on the first group of carriers. In addition, in this manner, a first DRX inactivity timer does not need to be used, thereby reducing power consumption caused when the UE maintains the first DRX inactivity timer.

Figure 15:
FIG. 15 is a schematic diagram of prolonging a DRX active time of UE on a first group of carriers according to an embodiment of this disclosure.
Figure 15:

Refer to FIG. 15. The UE prolongs the DRX active time of the UE on the first group of carriers (the dashed box in FIG. 15 represents prolonged time), so that a running time of the first DRX inactivity timer corresponding to FR1 is the same as a running time of the second DRX inactivity timer corresponding to FR2. It may be understood that, in this embodiment of this disclosure, the DRX active time on the first group of carriers (that is, the DRX active time in the first DRX configuration) is defined as a union set of the DRX active time corresponding to the first DRX configuration on the first group of carriers and the DRX active time corresponding to the second DRX configuration on the second group of carriers.

S122 and S123 may be performed simultaneously, or S122 may be performed before S123, or S122 may be performed after S123.

In this embodiment of this disclosure, the two DRX configuration technologies can be used in combination with a cross-carrier scheduling technology. When cross-carrier scheduling is implemented, UE can receive, on the first group of carriers, DCI that is from a network device and that is used to schedule data on the second group of carriers. In addition, the UE can also receive data or send data on the second group of carriers, so that the cross-carrier scheduling technology can be implemented under the background of the two DRX configuration technologies. In addition, in this embodiment of this disclosure, duration of a first DRX inactivity timer corresponding to the first group of carriers may be set to different duration based on different cases, so that the duration of the first DRX inactivity timer better meets a current service transmission requirement, and power consumption of the UE is further reduced.

For example, if the UE (for example, a smartphone, a smart watch, or a smart band) has an energy-saving requirement, the UE may send energy-saving capability information or an energy-saving indication to the network device. The energy-saving capability information indicates that the UE supports a first solution, and the energy-saving indication is used to indicate that the UE has an energy-saving requirement, or indicate that the UE requests to apply the first solution. Alternatively, if the UE requests to apply the first solution in which energy saving can be implemented, the UE may send the energy-saving capability information or the energy-saving indication to the network device. The first solution is a solution provided in the embodiment shown in any one of FIG. 5, FIG. 8, FIG. 10, or FIG. 12. After the network device receives the energy-saving capability information or the energy-saving indication from the UE, if the network device has configured the first DRX configuration, the second DRX configuration, and DCP (or DCI) for the UE, the network device determines that the UE applies the first solution. Optionally, the network device may send energy-saving permission information or configuration information related to the first solution to the UE, to indicate that the UE is allowed to save energy, or indicate that the UE is allowed to apply the first solution. After receiving the energy-saving permission information or the configuration information related to the first solution from the network device, the UE can apply the first solution. Alternatively, after the network device receives the energy-saving capability information or the energy-saving indication from the UE, if the network device configures only the first DRX configuration for the UE, the network device may send the second DRX configuration to the UE. After receiving the second DRX configuration, the UE can apply the first solution. After the first solution is applied to the UE, power consumption can be further reduced, that is, consumed battery power can be reduced, and standby time of the UE can be prolonged.

In addition, the following three rules are introduced.

Rule 1: A time length of the first DRX active time is greater than or equal to a time length of the second DRX active time.

Optionally, the first group of carriers corresponds to the first DRX active time, and the first DRX active time includes, for example, all or a part of the DRX active time of the UE on the first group of carriers in the first DRX configuration. The second group of carriers corresponds to the second DRX active time, and the second DRX active time includes, for example, all or a part of the DRX active time of the UE on the second group of carriers in the second DRX configuration. Considering that the network device may schedule, on the first group of carriers, the UE to receive data or send data on the second group of carriers, the UE needs to receive, on the first group of carriers, scheduling information corresponding to the second group of carriers. The scheduling information is, for example, carried in DCI that is sent by using a PDCCH. In this case, if the time length of the first DRX active time is less than the time length of the second DRX active time, a case may occur: The UE enters a sleep state on the first group of carriers. However, the network device sends, on the first group of carriers, the DCI used to schedule data transmission on the second group of carriers. In this case, the UE cannot receive the DCI because of sleep. As a result, the UE cannot transmit data on the second group of carriers. To reduce a probability that this case occurs, in this embodiment of this disclosure, the time length of the first DRX active time is greater than or equal to the time length of the second DRX active time. In addition, the first DRX active time can cover the second DRX active time in time domain. For example, the second DRX active time is located within the first DRX active time in time domain, or the second DRX active time overlaps the first DRX active time in time domain, so that the UE can receive the scheduling information from the network device on the first group of carriers.

The time length of the first DRX active time is greater than or equal to the time length of the second DRX active time. For example, in an implementation, duration of all or some timers configured in the first DRX configuration is greater than or equal to duration of corresponding timers configured in the second DRX configuration. For example, duration of a first DRX on duration timer is set to be greater than or equal to duration of a second DRX on duration timer. The first DRX on duration timer is configured in the first DRX configuration, and the second DRX on duration timer is configured in the second DRX configuration. For another example, duration of a first DRX on duration timer is set to be greater than or equal to duration a second DRX on duration timer, and duration of the first DRX inactivity timer is set to be greater than or equal to duration of the second DRX inactivity timer. The first DRX inactivity timer is configured in the first DRX configuration, and the second DRX inactivity timer is configured in the second DRX configuration. For another example, duration of a first DRX on duration timer is set to be greater than or equal to duration of a second DRX on duration timer, duration of the first DRX inactivity timer is set to be greater than or equal to duration of the second DRX inactivity timer, and duration of a first DRX retransmission timer is set to be greater than or equal to duration of a second DRX retransmission timer. The first DRX retransmission timer is configured in the first DRX configuration, and the second DRX retransmission timer is configured in the second DRX configuration.

Rule 1 may be specified in a protocol, or may be default, or may be configured by a network device.

Rule 2: DCI on a first group of carriers is configured to schedule data transmission on a second group of carriers, but DCI on the second group of carriers is not configured to schedule data transmission on the first group of carriers.

A frequency in a second frequency range is greater than a frequency in a first frequency range. For example, a frequency of the second group of carriers belongs to FR2, and a frequency of the first group of carriers belongs to FR1. Because a frequency of FR2 is greater than a frequency of FR1, power consumption of the UE is higher when the UE works on a carrier of FR2. Therefore, optionally, in this embodiment of this disclosure, if cross-carrier scheduling is configured, the second group of carriers may be scheduled by using the first group of carriers, that is, DCI on the first group of carriers is configured to schedule data transmission on the second group of carriers, and DCI on the second group of carriers is not configured to schedule data transmission on the first group of carriers. In this way, the UE can complete data transmission on the second group of carriers only by monitoring the DCI on the first group of carriers, and does not need to monitor the DCI on the second group of carriers, thereby reducing power consumption of the UE. Rule 2 may be specified in a protocol, or may be default, or may be configured by a network device.

Rule 3: Time for data transmission on a first group of carriers that is scheduled on a second group of carriers is within a DRX active time of UE on the second group of carriers.

Figure 7:
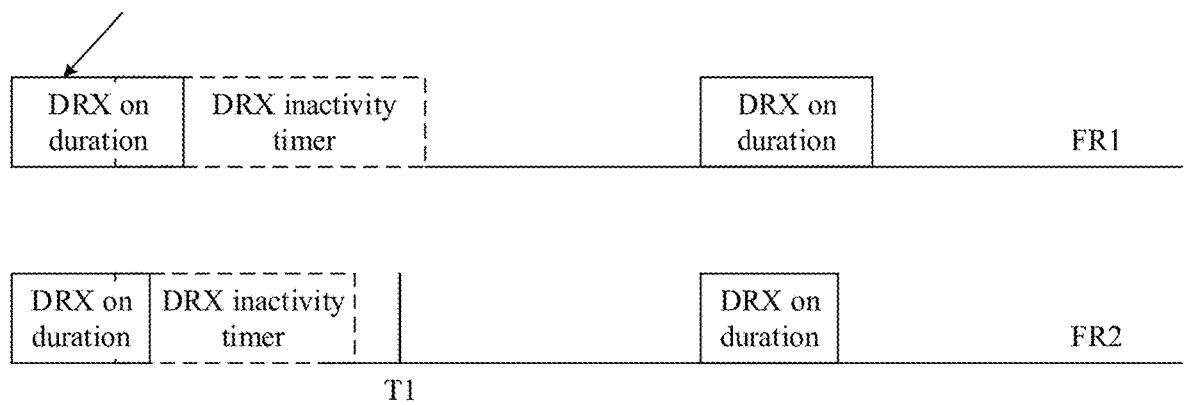
FIG. 7 is a schematic diagram in which a network device performs cross-carrier scheduling according to an embodiment of this disclosure.

If cross-carrier scheduling is supported, there may be another case. For example, if the DCI on the first group of carriers is configured to schedule data transmission on the second group of carriers, time for data transmission on the second group of carriers that is scheduled by using DCI sent by the network device on the first group of carriers may be within a DRX non-active time of the UE on the second group of carriers. For example, refer to FIG. 7. The network device sends DCI on a carrier of FR1, and the DCI is used to schedule data transmission on a carrier of FR2. The UE receives the DCI on the first group of carriers within On Duration in a DRX cycle, and time for data transmission scheduled by using the DCI is, for example, time T1 in FIG. 7. In the time T1, a DRX inactivity timer of the UE on the second group of carriers expires. Therefore, T1 is within a DRX inactivity time of the UE on the second group of carriers. In this case, the UE also needs to receive a PUSCH or PDSCH within the DRX non-active time. This causes extra power consumption to the UE. Therefore, optionally, in this embodiment of this disclosure, it is specified that the time for data transmission on the second carrier that is scheduled by the network device on the first carrier group needs to be within a DRX active time of the UE on the second carrier group. In this way, the UE does not need to receive the PUSCH or the PDSCH in the DRX non-active time on the second carrier group, but may enter a sleep state, to reduce power consumption. Rule 3 may be specified in a protocol, or may be default, or may be configured by a network device.

The foregoing three rules may be applied in combination with the embodiment shown in FIG. 5, or may be applied in combination with the embodiment shown in FIG. 8, or may be applied in combination with the embodiment shown in FIG. 10, or may be applied in combination with the embodiment shown in FIG. 12. Alternatively, the foregoing three rules may be applied independently, and are not combined with any one of the foregoing method embodiments. In addition, when applied independently, one or more of the foregoing rules may be applied, that is, any two or three of the foregoing three rules may be applied in combination, or the foregoing three rules may not be combined, but are separately independently applied. For example, rule 1 may be applied but rule 2 and rule 3 are not applied; or rule 2 may be applied but rule 1 and rule 3 are not applied; or rule 3 may be applied but rule 1 and rule 2 are not applied; or rule 1 and rule 2 may be applied but rule 3 is not applied; or rule 1 and rule 3 may be applied but rule 2 is not applied; or rule 2 and rule 3 may be applied but rule 1 is not applied; or rule 1, rule 2, and rule 3 may be applied.

With reference to the accompanying drawings, the following describes apparatuses configured to implement the foregoing methods in embodiments of this disclosure. Therefore, all the foregoing content may be used in the following embodiments. Repeated content is not described again.

Figure 16:
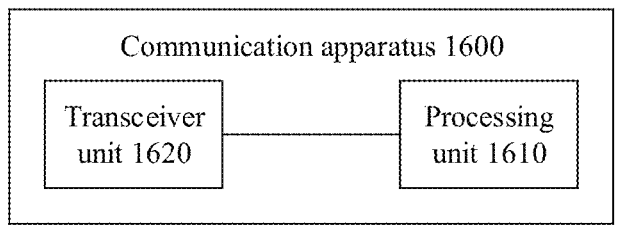
FIG. 16 is a schematic block diagram of a communication apparatus according to an embodiment of this disclosure.

FIG. 16 is a schematic block diagram of a communication apparatus 1600 according to an embodiment of this disclosure. For example, the communication apparatus 1600 is, for example, a terminal device or a network device. For example, the communication apparatus 1600 can implement functions of the UE in the embodiment shown in FIG. 5, the embodiment shown in FIG. 8, the embodiment shown in FIG. 10, or the embodiment shown in FIG. 12. Alternatively, the communication apparatus 1600 can implement functions of the network device in the embodiment shown in FIG. 10.

The communication apparatus 1600 includes a transceiver unit 1620 and a processing unit 1610. Optionally, the communication apparatus 1600 may further include a storage unit. The storage unit can communicate with the processing unit 1610, which is not shown in FIG. 16. Alternatively, the communication apparatus 1600 may not include a storage unit, or the storage unit may be located outside the communication apparatus 1600. For example, the communication apparatus 1600 may be UE, or may be a chip applied to UE, or another combined device or component that has functions of UE, or the like. Alternatively, the communication apparatus 1600 may be a network device, or may be a chip applied to a network device, or another combined device or component that has functions of a network device, or the like. When the communication apparatus 1600 is the UE or the network device, the processing unit 1610 may include a processor, for example, a baseband processor. The baseband processor may include one or more central processing units (CPUs). The transceiver unit 1620 may be a transceiver, and the transceiver may include an antenna, a radio frequency circuit, and the like. The transceiver may include a transmitter and a receiver. The transceiver may implement functions of the transmitter and the receiver. Alternatively, the transmitter and the receiver may be two function modules separately deployed. However, in this embodiment of this disclosure, the two function modules are collectively referred to as the transceiver. When the communication apparatus 1600 is a component having the functions of the UE or the network device, the transceiver unit 1620 may be a radio frequency unit, and the processing unit 1610 may be a processor, for example, a baseband processor. When the communication apparatus 1600 is a chip system, the transceiver unit 1620 may be an input/output interface of a chip (for example, a baseband chip), and the processing unit 1610 may be a processor of the chip system, and may include one or more central processing units. It should be understood that the processing unit 1610 in this embodiment of this disclosure may be implemented by a processor or a processor-related circuit component, and the transceiver unit 1620 may be implemented by a transceiver or a transceiver-related circuit component.

In an embodiment, when the communication apparatus 1600 is configured to implement the functions of the UE in the embodiment shown in FIG. 5, the processing unit 1610 may be configured to perform all operations other than receiving and sending operations performed by the UE in the embodiment shown in FIG. 5, for example, S51 to S53, and/or other processes used to support the technology described in this specification. The transceiver unit 1620 may be configured to perform all receiving operations and sending operations performed by the UE in the embodiment shown in FIG. 5, for example, an operation of monitoring DCP, and/or other processes used to support the technology described in this specification.

In an embodiment, when the communication apparatus 1600 is configured to implement the functions of the UE in the embodiment shown in FIG. 8, the processing unit 1610 may be configured to perform all operations other than receiving and sending operations performed by the UE in the embodiment shown in FIG. 8, for example, S81 to S85, and/or other processes used to support the technology described in this specification. The transceiver unit 1620 may be configured to perform all receiving operations and sending operations performed by the UE in the embodiment shown in FIG. 8, for example, an operation of monitoring DCP, and/or other processes used to support the technology described in this specification.

In an embodiment, when the communication apparatus 1600 is configured to implement the functions of the UE in the embodiment shown in FIG. 10, the processing unit 1610 may be configured to perform all operations other than receiving and sending operations performed by the UE in the embodiment shown in FIG. 10, for example, S102 to S103, and/or other processes used to support the technology described in this specification. The transceiver unit 1620 may be configured to perform all receiving operations and sending operations performed by the UE in the embodiment shown in FIG. 10, for example, S101, and/or other processes used to support the technology described in this specification.

In an embodiment, when the communication apparatus 1600 is configured to implement the functions of the network device in the embodiment shown in FIG. 10, the processing unit 1610 may be configured to perform all operations other than receiving and sending operations performed by the network device in the embodiment shown in FIG. 10, and/or other processes used to support the technology described in this specification. The transceiver unit 1620 may be configured to perform all receiving operations and sending operations performed by the network device in the embodiment shown in FIG. 10, for example, S101, and/or other processes used to support the technology described in this specification.

In an embodiment, when the communication apparatus 1600 is configured to implement the functions of the UE in the embodiment shown in FIG. 12, the processing unit 1610 may be configured to perform all operations other than receiving and sending operations performed by the UE in the embodiment shown in FIG. 12, for example, S122 and S123, and/or other processes used to support the technology described in this specification. The transceiver unit 1620 may be configured to perform all receiving operations and sending operations performed by the UE in the embodiment shown in FIG. 12, for example, S121, and/or other processes used to support the technology described in this specification.

In addition, the transceiver unit 1620 may be a function module, and the function module can complete both a sending operation and a receiving operation. For example, the transceiver unit 1620 may be configured to perform all sending operations and receiving operations performed by the terminal device or the network device (for example, a core network device or an access network device) in the embodiment shown in FIG. 5, the embodiment shown in FIG. 8, the embodiment shown in FIG. 10, or the embodiment shown in FIG. 12. For example, when the receiving operation is performed, it may be considered that the transceiver unit 1620 is a receiving unit, and when the sending operation is performed, it may be considered that the transceiver unit 1620 is a sending unit. Alternatively, the transceiver unit 1620 may be two function modules. The transceiver unit 1620 may be considered as a general term of the two function modules. The two function modules include a receiving unit and a sending unit. The sending unit is configured to complete a sending operation. For example, the sending unit may be configured to perform all sending operations performed by the terminal device or the network device in the embodiment shown in FIG. 5, the embodiment shown in FIG. 8, the embodiment shown in FIG. 10, or the embodiment shown in FIG. 12. The receiving unit is configured to complete a receiving operation. For example, the receiving unit may be configured to perform all receiving operations performed by the terminal device or the network device in the embodiment shown in FIG. 5, the embodiment shown in FIG. 8, the embodiment shown in FIG. 10, or the embodiment shown in FIG. 12.

For functions that can be implemented by the processing unit 1610 and the transceiver unit 1620, refer to descriptions of operations performed by the terminal device in the embodiment shown in FIG. 5, the embodiment shown in FIG. 8, the embodiment shown in FIG. 10, or the embodiment shown in FIG. 12, or refer to descriptions of operations performed by the network device (for example, an access network device or a core network device) in the embodiment shown in FIG. 5, the embodiment shown in FIG. 8, the embodiment shown in FIG. 10, or the embodiment shown in FIG. 12. Details are not described again.

An embodiment of this disclosure further provides a communication apparatus. The communication apparatus may be a terminal device, or may be a circuit. The communication apparatus may be configured to perform the actions performed by the terminal device in the foregoing method embodiments.

Figure 17:
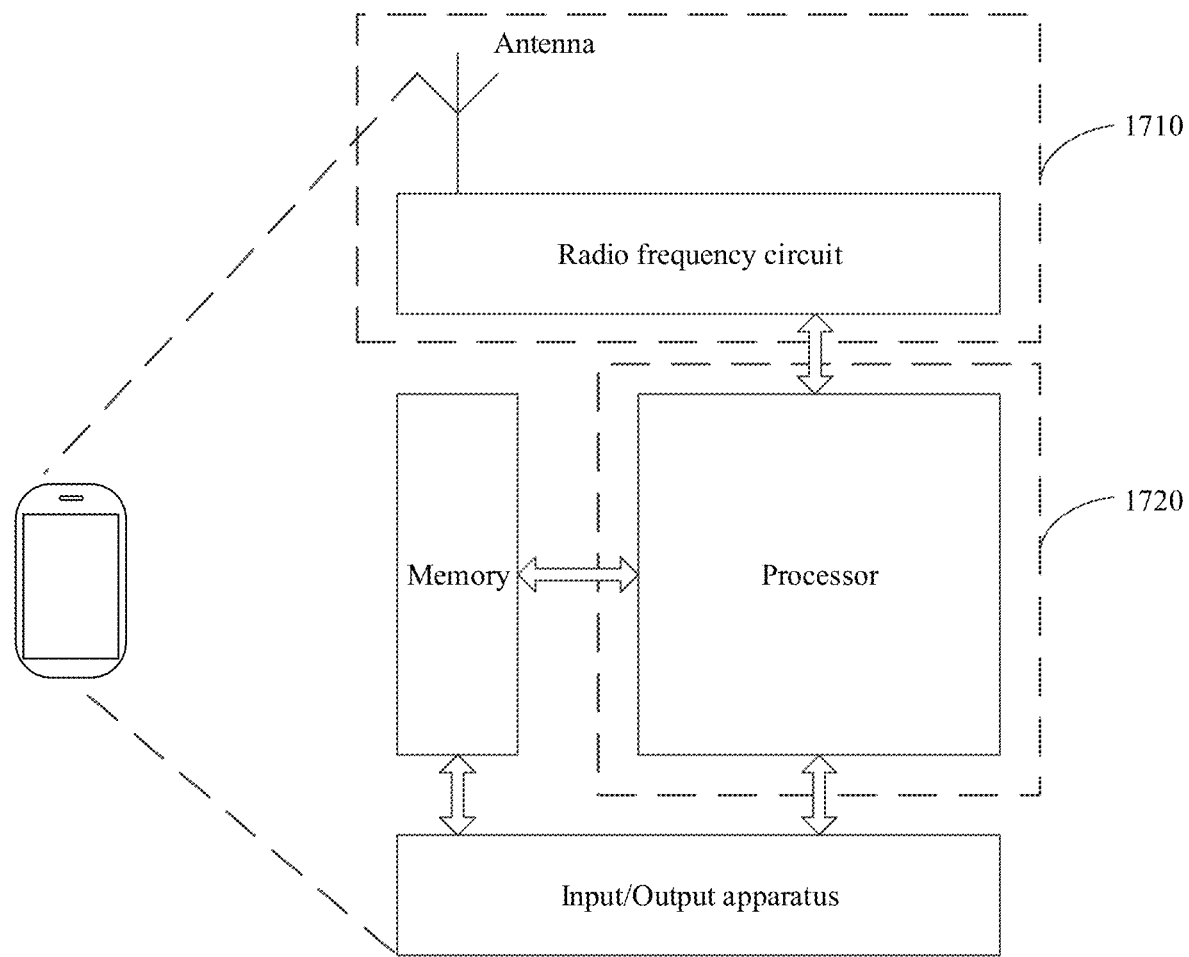
FIG. 17 is a schematic block diagram of another communication apparatus according to an embodiment of this disclosure.

When the communication apparatus is a terminal device, FIG. 17 is a simplified schematic diagram of a structure of the terminal device. For ease of understanding and illustration, an example in which the terminal device is a mobile phone is used in FIG. 17. As shown in FIG. 17, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, and a keyboard, is mainly configured to: receive data entered by a user, and output data to the user. It should be noted that some types of terminal devices may have no input/output apparatus.

When data needs to be sent, after performing baseband processing on the to-be-sent data, the processor outputs a baseband signal to the radio frequency circuit. After performing radio frequency processing on the baseband signal, the radio frequency circuit sends a radio frequency signal to the outside in a form of an electromagnetic wave by using the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 17 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this disclosure.

In an embodiment of this disclosure, the antenna and the radio frequency circuit that have receiving and sending functions may be considered as a transceiver unit of the terminal device (where the transceiver unit may be one function unit, and the function unit can implement a sending function and a receiving function; or the transceiver unit may include two function units: a receiving unit that can implement a receiving function and a sending unit that can implement a sending function), and the processor that has a processing function may be considered as a processing unit of the terminal device. As shown in FIG. 17, the terminal device includes a transceiver unit 1710 and a processing unit 1720. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1710 and that is configured to implement the receiving function may be considered as a receiving unit, and a component that is in the transceiver unit 1710 and that is configured to implement the sending function may be considered as a sending unit. In other words, the transceiver unit 1710 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 1710 is configured to perform a sending operation and a receiving operation on a terminal device side in the embodiment shown in FIG. 5, the embodiment shown in FIG. 8, the embodiment shown in FIG. 10, or the embodiment shown in FIG. 12, and the processing unit 1720 is configured to perform other operations other than the receiving operation and the sending operation on the terminal device side in the embodiment shown in FIG. 5, the embodiment shown in FIG. 8, the embodiment shown in FIG. 10, or the embodiment shown in FIG. 12.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

It should be understood that the processor mentioned in embodiments of this disclosure may be a CPU, or may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor, or the like.

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another proper type.

It should be understood that sequence numbers of the foregoing processes do not mean execution sequences in various embodiments of this disclosure. The execution sequences of the processes should be determined according to functions and internal logic of the processes, and should not be construed as any limitation on the implementation processes of embodiments of this disclosure.

A person of ordinary skill in the art may be aware that units and algorithm operations in the examples described with reference to the embodiments disclosed in this specification can be implemented by electronic hardware or a combination of computer software and electronic hardware. Whether functions are performed in a hardware or software manner depends on particular applications and design constraint conditions of the technical solutions. A person skilled in the art may use different methods to implement the described functions for each particular application, but it should not be considered that the implementation goes beyond the scope of this disclosure.

In the several embodiments provided in this disclosure, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected according to an actual requirement to achieve the objectives of the solutions of embodiments.

In addition, function units in the embodiments of this disclosure may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this disclosure essentially, or the part contributing to the conventional technology, or some of the technical solutions may be implemented in the form of a software product. The computer software product is stored in a storage medium and includes several instructions for instructing a computer device (which may be a personal computer, a server, or a network device) to perform all or some of the operations of the methods described in the embodiments of this disclosure. The foregoing computer-readable storage medium may be any usable medium that can be accessed by a computer. For example, the computer-readable medium may include but is not limited to: a random access memory (RAM), a read-only memory (ROM), a programmable read-only memory (PROM), an erasable programmable read-only memory (EPROM), an electrically erasable programmable read-only memory (EEPROM), a compact disc read-only memory (CD-ROM), a universal serial bus flash disk, a removable hard disk, another compact disc storage medium, another magnetic disk storage medium, another magnetic storage device, or any other medium that can be used to carry or store expected program code in a form of an instruction or a data structure and that can be accessed by a computer. In addition, through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), or a direct rambus dynamic random access memory (DR RAM).

The foregoing descriptions are merely specific implementations of this disclosure, but are not intended to limit the protection scope of embodiments of this disclosure. Any variation or replacement readily figured out by a person skilled in the art within the technical scope disclosed in embodiments of this disclosure shall fall within the protection scope of embodiments of this disclosure. Therefore, the protection scope of embodiments of this disclosure shall be subject to the protection scope of the claims.

What is claimed is:

1. A communication method, comprising:
   determining, by a terminal device, whether to monitor downlink control information with cyclic redundancy check scrambled by a power saving radio network temporary identity (DCP) on a first DCP monitoring occasion; and
   in response to determining not to monitor the DCP on the first DCP monitoring occasion, waking up, by the terminal device, on a first group of carriers within first discontinuous reception (DRX) on duration associated with the first DCP monitoring occasion, and waking up or sleeping, by the terminal device, on a second group of carriers within second DRX on duration associated with the first DCP monitoring occasion, wherein the first group of carriers comprises one or more carriers configured for the terminal device, the first DRX on duration corresponds to a first DRX configuration applied to the first group of carriers, the second group of carriers comprises one or more carriers configured for the terminal device, and the second DRX on duration corresponds to a second DRX configuration applied to the second group of carriers, wherein the terminal device receives configuration information from a network device that the terminal device uses to configure that, when the terminal device does not perform monitoring on the first DCP monitoring occasion, the terminal device wakes up or sleeps within the second DRX on duration associated with the first DCP monitoring occasion.

2. The method of claim 1, wherein the first DCP monitoring occasion is configured on the first group of carriers.

3. The method of claim 1, wherein the first DRX on duration is located after the first DCP monitoring occasion in time domain.

4. The method of claim 1, wherein determining whether to monitor DCP on the first DCP monitoring occasion comprises:
   when a time domain position of the first DCP monitoring occasion is within a first DRX active time, determining not to monitor the DCP on the first DCP monitoring occasion; or when a time domain position of the first DCP monitoring occasion is not or is partially within a first DRX active time, determining to monitor the DCP on the first DCP monitoring occasion, wherein the first DRX active time corresponds to the first DRX configuration; or
   when a maximum quantity of sizes of downlink control information (DCI) that can be monitored is greater than or equal to a quantity of sizes of DCI that need to be monitored by the terminal device, determining to monitor the DCP on the first DCP monitoring occasion; or when a maximum quantity of sizes of DCI that can be monitored is less than a quantity of sizes of DCI that need to be monitored by the terminal device, determining not to monitor the DCP on the first DCP monitoring occasion; or
   when a time domain position of the first DCP monitoring occasion is within a first DRX active time, and a maximum quantity of sizes of DCI that can be monitored is greater than or equal to a quantity of sizes of DCI that need to be monitored by the terminal device, determining to monitor the DCP on the first DCP monitoring occasion; or when a time domain position of the first DCP monitoring occasion is within a first DRX active time, and a maximum quantity of sizes of DCI that can be monitored is less than a quantity of sizes of DCI that need to be monitored by the terminal device, determining not to monitor the DCP on the first DCP monitoring occasion, wherein the first DRX active time corresponds to the first DRX configuration.

5. The method of claim 1, wherein the method further comprises:
   when the terminal device determines to monitor the DCP on the first DCP monitoring occasion, monitoring, by the terminal device, the DCP on the first DCP monitoring occasion; and
   sleeping or waking up, by the terminal device, on the first group of carriers within the first DRX on duration and sleeping or waking up on the second group of carriers within the second DRX on duration based on a monitoring status of the DCP.

6. The method of claim 5, wherein sleeping on the first group of carriers within the first DRX on duration and sleeping on the second group of carriers within the second DRX on duration based on the monitoring status of the DCP comprises:
   when the terminal device receives first DCP from the network device on the first DCP monitoring occasion, and the first DCP indicates sleep, sleeping on the first group of carriers within the first DRX on duration, and sleeping, by the terminal device, on the second group of carriers within the second DRX on duration; or when the terminal device does not receive DCP from the network device on the first DCP monitoring occasion, sleeping on the first group of carriers within the first DRX on duration, and sleeping on the second group of carriers within the second DRX on duration.

7. The method of claim 5, wherein waking up on the first group of carriers within the first DRX on duration and waking up on the second group of carriers within the second DRX on duration based on the monitoring status of the DCP comprises:

when the terminal device receives first DCP from the network device on the first DCP monitoring occasion, and the first DCP indicates wake-up, waking up on the first group of carriers within the first DRX on duration, and waking up on the second group of carriers within the second DRX on duration; or when the terminal device receives a first DCP from the network device on the first DCP monitoring occasion, waking up on the first group of carriers within the first DRX on duration, and waking up on the second group of carriers within the second DRX on duration.

8. The method of claim 5, wherein the sleeping or waking up on the first group of carriers within the first DRX on duration and sleeping or waking up on the second group of carriers within the second DRX on duration based on the monitoring status of the DCP comprises:

receiving, on the first DCP monitoring occasion, first DCP from the network device, wherein the first DCP comprises first indication information and second indication information; and when the first indication information indicates a wake-up and the second indication information indicates the wake-up, waking up on the first group of carriers within the first DRX on duration, and waking up on the second group of carriers within the second DRX on duration; or when the first indication information indicates sleep and the second indication information indicates sleep, sleeping on the first group of carriers within the first DRX on duration, and sleeping on the second group of carriers within the second DRX on duration; or when the first indication information indicates a wake-up and the second indication information indicates sleep, waking up on the first group of carriers within the first DRX on duration, and sleeping on the second group of carriers within the second DRX on duration; or when the first indication information indicates sleep and the second indication information indicates a wake-up, sleeping on the first group of carriers within the first DRX on duration, and waking up on the second group of carriers within the second DRX on duration.

9. A communication method, comprising:

in response to determining not to monitor downlink control information with cyclic redundancy check scrambled by a power saving radio network temporary identity (DCP) on a first DCP monitoring occasion configured on a first group of carriers, determining, by a terminal device, whether to monitor the DCP on a second DCP monitoring occasion configured on a second group of carriers, wherein the first group of carriers comprises one or more carriers configured for the terminal device, a first discontinuous reception (DRX) configuration is applied to the first group of carriers, the second group of carriers comprises one or more carriers configured for the terminal device, and a second DRX configuration is applied to the second group of carriers, wherein the terminal device receives configuration information from a network device that the terminal device uses to configure that, when the terminal device does not perform monitoring on the first DCP monitoring occasion, the terminal device wakes up or sleeps within the second DRX on duration associated with the first DCP monitoring occasion; and in response to determining to monitor the DCP on the second DCP monitoring occasion, monitoring, by the terminal device, the DCP on the second DCP monitoring occasion, and sleeping or waking up on the second group of carriers based on a monitoring status of the DCP within second DRX on duration associated with the second DCP monitoring occasion, wherein the second DRX on duration corresponds to the second DRX configuration.

10. The method of claim 9, wherein determining whether to monitor the DCP on the second DCP monitoring occasion comprises:

when a time domain position of the second DCP monitoring occasion is within a second DRX active time, determining not to monitor the DCP on the second DCP monitoring occasion;

or when a time domain position of the second DCP monitoring occasion is not or is partially within a second DRX active time, determining to monitor the DCP on the first DCP monitoring occasion, wherein the second DRX active time corresponds to the second DRX configuration; or when a maximum quantity of sizes of downlink control information (DCI) that can be monitored is greater than or equal to the quantity of sizes of DCI that need to be monitored by the terminal device, determining to monitor the DCP on the second DCP monitoring occasion; or when the maximum quantity of sizes of DCI that can be monitored is less than the quantity of sizes of DCI that need to be monitored by the terminal device, determining not to monitor the DCP on the second DCP monitoring occasion; or when a time domain position of the second DCP monitoring occasion is within a second DRX active time, and a maximum quantity of sizes of DCI that can be monitored is greater than or equal to the quantity of sizes of DCI that need to be monitored by the terminal device, determining to monitor the DCP on the second DCP monitoring occasion; or when a time domain position of the second DCP monitoring occasion is within a second DRX active time, and the maximum quantity of sizes of DCI that can be monitored is less than the quantity of sizes of DCI that need to be monitored by the terminal device, determining not to monitor the DCP on the second DCP monitoring occasion.

11. A terminal device, comprising:

a processor;

a memory coupled to the processor and stores instructions, which when executed by the processor, cause the terminal device to:

determine whether to monitor downlink control information with cyclic redundancy check scrambled by a power saving radio network temporary identity (DCP) on a first DCP monitoring occasion; and in response to determining not to monitor the DCP on the first DCP monitoring occasion, wake up on a first group of carriers within first discontinuous reception (DRX) on duration associated with the first DCP monitoring occasion, and waking up or sleeping on a second group of carriers within second DRX on duration associated with the first DCP monitoring occasion, wherein the first group of carriers comprises one or more carriers configured for the terminal device, the first DRX on duration corresponds to a first DRX configuration applied to the first group of carriers, the second group of carriers comprises one or more carriers configured for the terminal device, and the second DRX on duration corresponds to a second DRX configuration applied to the second group of carriers, wherein the terminal device receives configuration information from a network device that the terminal device uses to configure that, when the terminal device does not perform monitoring on the first DCP monitoring occasion, the terminal device wakes up or sleeps within the second DRX on duration associated with the first DCP monitoring occasion.

12. The terminal device of claim 11, wherein the first DCP monitoring occasion is configured on the first group of carriers.

13. The terminal device of claim 11, wherein the first DRX on duration is located after the first DCP monitoring occasion in time domain.

14. The terminal device of claim 11, wherein the determining whether to monitor DCP on the first DCP monitoring occasion comprises:
when a time domain position of the first DCP monitoring occasion is within a first DRX active time, determining not to monitor the DCP on the first DCP monitoring occasion; or when a time domain position of the first DCP monitoring occasion is not or is partially within a first DRX active time, determining to monitor the DCP on the first DCP monitoring occasion, wherein the first DRX active time corresponds to the first DRX configuration; or
when a maximum quantity of sizes of downlink control information (DCI) that can be monitored is greater than or equal to a quantity of sizes of DCI that need to be monitored by the terminal device, determining to monitor the DCP on the first DCP monitoring occasion; or when a maximum quantity of sizes of DCI that can be monitored is less than a quantity of sizes of DCI that need to be monitored by the terminal device, determining not to monitor the DCP on the first DCP monitoring occasion; or
when a time domain position of the first DCP monitoring occasion is within a first DRX active time, and a maximum quantity of sizes of DCI that can be monitored is greater than or equal to a quantity of sizes of DCI that need to be monitored by the terminal device, determining to monitor the DCP on the first DCP monitoring occasion; or when a time domain position of the first DCP monitoring occasion is within a first DRX active time, and a maximum quantity of sizes of DCI that can be monitored is less than a quantity of sizes of DCI that need to be monitored by the terminal device, determining not to monitor the DCP on the first DCP monitoring occasion, wherein the first DRX active time corresponds to the first DRX configuration.

15. A non transitory computer-readable storage medium comprising instructions, which when executed by a terminal device, cause the terminal device to:
determine whether to monitor downlink control information with cyclic redundancy check scrambled by a power saving radio network temporary identity (DCP) on a first DCP monitoring occasion; and
in response to determining not to monitor the DCP on the first DCP monitoring occasion, wake up on a first group of carriers within first discontinuous reception (DRX) on duration associated with the first DCP monitoring occasion, and waking up or sleeping on a second group of carriers within second DRX on duration associated with the first DCP monitoring occasion, wherein the first group of carriers comprises one or more carriers configured for the terminal device, the first DRX on duration corresponds to a first DRX configuration applied to the first group of carriers, the second group of carriers comprises one or more carriers configured for the terminal device, and the second DRX on duration corresponds to a second DRX configuration applied to the second group of carriers, wherein the terminal device receives configuration information from a network device that the terminal device uses to configure that, when the terminal device does not perform monitoring on the first DCP monitoring occasion, the terminal device wakes up or sleeps within the second DRX on duration associated with the first DCP monitoring occasion.

16. The non transitory computer-readable storage medium of claim 15, wherein the first DCP monitoring occasion is configured on the first group of carriers.

17. The non-transitory computer-readable storage medium of claim 15, wherein the first DRX on duration is located after the first DCP monitoring occasion in time domain.

18. The non-transitory computer-readable storage medium of claim 15, wherein the determining whether to monitor DCP on the first DCP monitoring occasion comprises:
when a time domain position of the first DCP monitoring occasion is within a first DRX active time, determining not to monitor the DCP on the first DCP monitoring occasion; or when a time domain position of the first DCP monitoring occasion is not or is partially within a first DRX active time, determining to monitor the DCP on the first DCP monitoring occasion, wherein the first DRX active time corresponds to the first DRX configuration; or
when a maximum quantity of sizes of downlink control information DCI that can be monitored is greater than or equal to a quantity of sizes of DCI that need to be monitored by the terminal device, determining to monitor the DCP on the first DCP monitoring occasion; or when a maximum quantity of sizes of DCI that can be monitored is less than a quantity of sizes of DCI that need to be monitored by the terminal device, determining not to monitor the DCP on the first DCP monitoring occasion; or
when a time domain position of the first DCP monitoring occasion is within a first DRX active time, and a maximum quantity of sizes of DCI that can be monitored is greater than or equal to a quantity of sizes of DCI that need to be monitored by the terminal device, determining to monitor the DCP on the first DCP monitoring occasion; or when a time domain position of the first DCP monitoring occasion is within a first DRX active time, and a maximum quantity of sizes of DCI that can be monitored is less than a quantity of sizes of DCI that need to be monitored by the terminal device, determining not to monitor the DCP on the first DCP monitoring occasion, wherein the first DRX active time corresponds to the first DRX configuration.

* * * * *